US010775680B2

(12) United States Patent
Irie

(10) Patent No.: US 10,775,680 B2
(45) Date of Patent: Sep. 15, 2020

(54) IMAGING DEVICE AND METHOD OF CONTROLLING IMAGING DEVICE

(71) Applicant: FUJIFILM Corporation, Tokyo (JP)

(72) Inventor: Fuminori Irie, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/572,959

(22) Filed: Sep. 17, 2019

(65) Prior Publication Data

US 2020/0012172 A1 Jan. 9, 2020

Related U.S. Application Data

(63) Continuation of application No. PCT/JP2018/012026, filed on Mar. 26, 2018.

(30) Foreign Application Priority Data

Mar. 30, 2017 (JP) ................. 2017-068557

(51) Int. Cl.
*G03B 7/093* (2006.01)
*G03B 9/18* (2006.01)
(Continued)

(52) U.S. Cl.
CPC ............. *G03B 7/093* (2013.01); *G03B 9/18* (2013.01); *G03B 17/18* (2013.01); *H04N 5/2254* (2013.01); *H04N 5/2353* (2013.01)

(58) Field of Classification Search
None
See application file for complete search history.

(56) References Cited

U.S. PATENT DOCUMENTS

2009/0041447 A1    2/2009  Kim et al.
2012/0249860 A1   10/2012  Nakai
(Continued)

FOREIGN PATENT DOCUMENTS

JP    2011-13540 A    1/2011
JP    2012-215795 A   11/2012
(Continued)

OTHER PUBLICATIONS

International Preliminary Report on Patentability and Written Opinion of the International Searching Authority for International Application No. PCT/JP2018/012026, dated Oct. 10, 2019, with English translation.
(Continued)

*Primary Examiner* — William B Perkey
(74) *Attorney, Agent, or Firm* — Birch, Stewart, Kolasch & Birch, LLP

(57) ABSTRACT

There are provided an imaging device and a method of controlling the imaging device that can shorten the blackout period of a live view image in a case where a front curtain and a rear curtain are moved to continuously take static images. In a case where continuous shooting is performed, a focal-plane shutter is shifted to a normally open state to allow a live view image to be displayed during the continuous shooting. A front curtain-electromagnet and a rear curtain-electromagnet are excited to prevent the rotational movement of a second front curtain-drive lever and a second rear curtain-drive lever in a first direction after the focal-plane shutter is shifted to the normally open state; first curtain travel preparation for causing the second front curtain-drive lever and the rear curtain-drive lever to be moved to non-charge positions from charge positions is performed to release the prevention of the travel of the front curtain in a closing direction, which is performed by the front curtain-
(Continued)

locking lever, from a point of time later than a point of time when the first curtain travel preparation is to be started; and second curtain travel preparation for causing the front curtain to travel in the closing direction to fully close an exposure aperture portion is performed.

18 Claims, 23 Drawing Sheets

(51) Int. Cl.
*H04N 5/225* (2006.01)
*H04N 5/235* (2006.01)
*G03B 17/18* (2006.01)

(56) References Cited

U.S. PATENT DOCUMENTS

| 2012/0274835 | A1 | 11/2012 | Ogino et al. | |
|---|---|---|---|---|
| 2015/0229817 | A1* | 8/2015 | Nishimura | G03B 9/66 |
| | | | | 348/367 |
| 2015/0256751 | A1* | 9/2015 | Aono | H04N 5/2353 |
| | | | | 348/220.1 |
| 2016/0373656 | A1 | 12/2016 | Ikeda | |
| 2018/0152612 | A1* | 5/2018 | Kudo | H04N 5/2352 |
| 2020/0012172 | A1* | 1/2020 | Irie | G03B 7/093 |

FOREIGN PATENT DOCUMENTS

| JP | 2017-15903 A | 1/2017 |
|---|---|---|
| WO | WO 2011/064980 A1 | 6/2011 |
| WO | WO 2015/146004 A1 | 10/2015 |

OTHER PUBLICATIONS

International Search Report for International Application No. PCT/JP2018/012026, dated Jun. 19, 2018, with English translation.

* cited by examiner

IMAGING DEVICE AND METHOD OF CONTROLLING IMAGING DEVICE

CROSS-REFERENCE TO RELATED APPLICATIONS

The present application is a Continuation of PCT International Application No. PCT/JP2018/012026 filed on Mar. 26, 2018 claiming priority under 35 U.S.C. § 119(a) to Japanese Patent Application No. 2017-068557 filed on Mar. 30, 2017. Each of the above applications is hereby expressly incorporated by reference, in its entirety, into the present application.

BACKGROUND OF THE INVENTION

1. Field of the Invention

The present invention relates to an imaging device and a method of controlling the imaging device, and more particularly, to an imaging device on which a focal-plane shutter is mounted and which has a continuous shooting mode and a method of controlling the imaging device.

2. Description of the Related Art

A focal-plane shutter, which can switch a normally closed operation and a normally open operation, is known as this type of focal-plane shutter (JP2011-013540A).

The focal-plane shutter, which can switch the normally open operation and the normally closed operation, is provided with a drive member, which drives a front curtain and is divided into a first drive member for charge and a second drive member connected to the front curtain, and an inhibiting member that prevents the movement of the second drive member (an operation for closing the front curtain) at the time of the charge operation of the first drive member. Since an operation for closing the front curtain is prevented by the inhibiting member at the time of the normally open operation, the focal-plane shutter can be held in an open state even after the completion of charge. Accordingly, a live view image is allowed to be taken and displayed (JP2011-013540A).

Further, a shutter device disclosed in JP2011-013540A has a function to hold both a front curtain and a rear curtain, which are fully opened by a normally open operation, in a charge state, a function to perform control (control using an electronic front curtain) to cause an electronic control circuit to discharge electric charges, which are accumulated in an imaging element, to every line of the imaging element to start exposure without operating the front curtain at the time of the taking of a static image, and a function to close the rear curtain to end the exposure.

In the case of live view-normal imaging where the front curtain and the rear curtain are caused to travel to take a static image (FIG. 13A) in a shutter device shown in FIGS. 13A to 14 of JP2011-013540A, in a case where a shutter release button is pressed, current is supplied to a front curtain solenoid and a rear curtain solenoid and the movement of a front curtain drive pin and a rear curtain drive pin (the front curtain and the rear curtain) is electromagnetically fixed and the mechanical fixing of the front curtain drive pin and the rear curtain drive pin performed by a charge mechanism is released. Then, the supply of current to the front curtain solenoid is stopped, the front curtain is opened through the front curtain drive pin biased by a spring, the supply of current to the rear curtain solenoid is stopped after a time corresponding to an exposure period, and the rear curtain is closed through the rear curtain drive pin biased by a spring. As a result, an imaging operation is completed.

On the other hand, in the case of live view-electronic front-curtain imaging (FIGS. 13B and 14), only the rear curtain is charged by the charge mechanism, the front curtain is held in an open state, and current is supplied to the rear curtain solenoid and the movement of the rear curtain drive pin (rear curtain) is electromagnetically fixed and the mechanical fixing of the rear curtain drive pin performed by the charge mechanism is released in a case where the shutter release button is pressed. Then, exposure is started by the control of the electronic front curtain, the supply of current to the rear curtain solenoid is stopped after a time corresponding to an exposure period, and the rear curtain is closed through the rear curtain drive pin biased by a spring. As a result, an imaging operation is completed.

SUMMARY OF THE INVENTION

In the case of the live view-normal imaging, the shutter device disclosed in JP2011-013540A supplies current to the front curtain solenoid to electromagnetically fix the movement of the front curtain drive pin and releases the mechanical locking of the front curtain. Then, the shutter device supplies current to the rear curtain solenoid to electromagnetically fix the movement of the rear curtain drive pin and releases the mechanical locking of the rear curtain (FIG. 13A of JP2011-013540A). For this reason, there is a problem that the blackout of a live view image occurs in a period required to release the locking of the front curtain and a period required to release the locking of the rear curtain.

On the other hand, since a shutter of the shutter device disclosed in JP2011-013540A is always opened in the case of the live view-electronic front-curtain imaging, a live view image can be displayed until the exposure of a static image is started by the control of the electronic front curtain. Accordingly, there are advantages that the blackout period of a live view image can be shortened and high-speed continuous shooting can also be performed.

However, there are demerits, such as the defect of blurriness and an increase in the unevenness of exposure on a surface, in the case of the live view-electronic front-curtain imaging in comparison with normal imaging where the front curtain and the rear curtain are caused to travel to take a static image.

The invention has been made in consideration of the above-mentioned circumstances, and an object of the invention is to provide an imaging device and a method of controlling the imaging device that can shorten the blackout period of a live view image in a case where a front curtain and a rear curtain are caused to travel to continuously take static images (continuous shooting).

In order to achieve the object, according to an aspect of the invention, there is provided an imaging device comprising a focal-plane shutter, an imaging element, and a control unit that controls the focal-plane shutter and the imaging element. The focal-plane shutter includes: a first front curtain-drive member that causes a front curtain to travel in an opening direction by movement thereof in a first direction to fully open an exposure aperture portion and causes the front curtain to travel in a closing direction by movement thereof in a second direction opposite to the first direction to fully close the exposure aperture portion; a second front curtain-drive member that is biased in the first direction by a front curtain-travel spring and moves the first front curtain-drive member in the first direction while being in contact with the first front curtain-drive member; a return spring that biases the front curtain in the closing direction by a biasing force smaller than a biasing force of the front curtain-travel spring; a rear curtain-drive member that is biased in the first direction by a rear curtain-travel spring, causes a rear curtain to travel in a closing direction by movement thereof in the first direction to fully close the exposure aperture portion, and causes the rear curtain to travel in an opening direction by movement thereof in the second direction to fully open the exposure aperture portion; a charge member that moves the second front curtain-drive member and the rear curtain-drive member in the second direction against the biasing forces of the front curtain-travel spring and the rear curtain-travel spring to move the second front curtain-drive member and the rear curtain-drive member to charge positions on a movement end side in the second direction; a lock mechanism that holds the second front curtain-drive member and the rear curtain-drive member at the charge positions in a case where the second front curtain-drive member and the rear curtain-drive member are positioned at the charge positions; a front curtain-locking member that prevents travel of the front curtain in the closing direction in a case where the front curtain is fully opened; and a front curtain-electromagnetic actuator and a rear curtain-electromagnetic actuator that directly or indirectly prevent the movement of the second front curtain-drive member and the movement of the rear curtain-drive member in the first direction, which are caused by the front curtain-travel spring and the rear curtain-travel spring, through the supply of current in a case where the second front curtain-drive member and the rear curtain-drive member are positioned at the charge positions. In a case where second and later static images in a continuous shooting mode are to be taken, the control unit performs: normally open control that causes the second front curtain-drive member and the rear curtain-drive member to be moved to the charge positions by the charge member in a state where the travel of the front curtain in the closing direction is prevented by the front curtain-locking member after the reading of an image signal corresponding to the static image from the imaging element ends, and holds the second front curtain-drive member and the rear curtain-drive member at the charge positions by the lock mechanism to make the focal-plane shutter be in a normally open state where the exposure aperture portion is fully opened; first curtain travel preparation that excites the front curtain-electromagnetic actuator and the rear curtain-electromagnetic actuator to prevent the rotational movement of the second front curtain-drive member and the rear curtain-drive member in the first direction and releases the holding of the second front curtain-drive member and the rear curtain-drive member at the charge positions performed by the lock mechanism after the shift of the focal-plane shutter to the normally open state; second curtain travel preparation that is performed from a point of time later than a point of time when the first curtain travel preparation is to be started, releases the prevention of the travel of the front curtain in the closing direction performed by the front curtain-locking member, and causes the front curtain to travel in the closing direction by a biasing force of the return spring to fully close the exposure aperture portion; and exposure control that demagnetizes the front curtain-electromagnetic actuator after completion of the second curtain travel preparation, causes the front curtain to travel in the opening direction through the second front curtain-drive member by the biasing force of the front curtain-travel spring to start exposure, demagnetizes the rear curtain-electromagnetic actuator after a lapse of an exposure time corresponding to a shutter speed, and causes the rear curtain to travel in the closing direction through the rear curtain-drive member by the biasing force of the rear curtain-travel spring to perform exposure corresponding to the static image. The image signal is read from the imaging element in a period until the exposure aperture portion is closed by the second curtain travel preparation after the exposure aperture portion is opened by the shift of the focal-plane shutter to the normally open state, and a live view image is allowed to be displayed during a continuous shooting-repetition period until a point of time when exposure of the next static image is started from a point of time when exposure of each of the static images continuously taken in the continuous shooting mode is started.

According to the aspect of the invention, in a case where second and later static images in a continuous shooting mode are to be taken, the second front curtain-drive member and the rear curtain-drive member are moved to the charge positions by the charge member in a state where the travel of the front curtain in the closing direction is prevented by the front curtain-locking member after the reading of an image signal corresponding to the static image from the imaging element ends, and the second front curtain-drive member and the rear curtain-drive member are held at the charge positions by the lock mechanism to shift the focal-plane shutter to a normally open state where the exposure aperture portion is fully opened. Accordingly, a live view image can be displayed during continuous shooting. First curtain travel preparation, which excites the front curtain-electromagnetic actuator and the rear curtain-electromagnetic actuator to prevent the rotational movement of the second front curtain-drive member and the rear curtain-drive member in the first direction and releases the holding of the second front curtain-drive member and the rear curtain-drive member at the charge positions performed by the lock mechanism after the shift of the focal-plane shutter to the normally open state, is performed; and second curtain travel preparation that is performed from a point of time later than a point of time when the first curtain travel preparation is to be started, releases the prevention of the travel of the front curtain in the closing direction performed by the front curtain-locking member, and causes the front curtain to travel in the closing direction by a biasing force of the return spring to fully close the exposure aperture portion, is performed. Since a time required for the first curtain travel preparation is longer than a time required for the second curtain travel preparation, the first curtain travel preparation is started first and the second curtain travel preparation is then started.

In a case where the second curtain travel preparation is started, the front curtain travels in the closing direction, and the exposure aperture portion is closed, a live view image cannot be taken. Accordingly, it is preferable that the second curtain travel preparation is started from a point of time as late as possible. Since the first curtain travel preparation does not hinder a live view image to be taken, the first curtain travel preparation is preferably completed at the latest before the front curtain-electromagnetic actuator is demagnetized and the front curtain is caused to travel in the opening direction to start exposure. However, since a time required for the first curtain travel preparation is longer than a time required for the second curtain travel preparation, the first curtain travel preparation is started from a point of time earlier than the second curtain travel preparation.

Then, the front curtain-electromagnetic actuator is demagnetized after the completion of the second curtain travel preparation, the front curtain is caused to travel in the opening direction to start exposure, the rear curtain-electromagnetic actuator is demagnetized after a lapse of an exposure time corresponding to a shutter speed, and the rear curtain is caused to travel in the closing direction to perform exposure corresponding to the static image. As described above, a live view image can be displayed during a continuous shooting-repetition period until a point of time when exposure of the next static image is started from a point of time when exposure of each of the static images continuously taken in the continuous shooting mode is started. Particularly, the second curtain travel preparation is more delayed than the first curtain travel preparation during the continuous shooting-repetition period. Accordingly, a period where a live view image is not displayed (the blackout period of a live view image) during continuous shooting can be shortened.

According to another aspect of the invention, in the imaging device, it is preferable that the image signal for the display of the live view image read from the imaging element during the continuous shooting-repetition period in the continuous shooting mode includes an image signal for distance measurement, the imaging device further comprises a distance measuring unit acquiring the image signal for distance measurement from the imaging element and calculating distance measurement information on the basis of the acquired image signal for distance measurement, and the control unit performs the first curtain travel preparation during exposure of the image signal for distance measurement. Accordingly, since the first curtain travel preparation can be early completed, a continuous shooting speed can be improved. The first curtain travel preparation does not necessarily need to be completed during the exposure of the image signal for distance measurement, and a part of the exposure period of the image signal for distance measurement and a part of the operation period of the first curtain travel preparation may overlap with each other.

According to another aspect of the invention, in the imaging device, it is preferable that the image signal for the display of the live view image read from the imaging element during the continuous shooting-repetition period in the continuous shooting mode includes an image signal for distance measurement to be exposed for distance measurement, the imaging device further comprises a distance measuring unit acquiring the image signal for distance measurement from the imaging element and calculating distance measurement information on the basis of the acquired image signal for distance measurement, and the control unit performs the first curtain travel preparation after the completion of exposure of the image signal for distance measurement. In a case where the first curtain travel preparation is performed in the exposure period of the image signal for distance measurement, there is a concern that distance measurement accuracy may not be ensured due to vibration generated during the first curtain travel preparation. However, since the first curtain travel preparation is performed after the exposure period of the image signal for distance measurement, vibration is not generated during the exposure of the image signal for distance measurement. Accordingly, distance measurement accuracy can be ensured.

According to another aspect of the invention, in the imaging device, it is preferable that the image signal for the display of the live view image read from the imaging element during the continuous shooting mode includes an image signal for distance measurement to be exposed for distance measurement, and the imaging device further comprises a distance measuring unit acquiring the image signal for distance measurement from the imaging element after the completion of the first curtain travel preparation and calculating distance measurement information on the basis of the acquired image signal for distance measurement. According to this aspect, a time until a point of time when the exposure of a static image is to be started from a point of time when the distance measurement information is acquired can be shortened. Accordingly, since the movement of a subject from a focusing position can be reduced, a focusing state can be maintained. Further, since the image signal for distance measurement is acquired from the imaging element after the completion of the first curtain travel preparation, vibration is not generated during the exposure of the image signal for distance measurement as described above. Accordingly, distance measurement accuracy can be ensured.

According to another aspect of the invention, in the imaging device, it is preferable that the image signal for the display of the live view image read from the imaging element during the continuous shooting-repetition period in the continuous shooting mode includes image signals for distance measurement of a plurality of frames to be exposed for distance measurement, the imaging device further comprises a distance measuring unit acquiring the image signal for distance measurement from the imaging element, calculating distance measurement information on the basis of the acquired image signal for distance measurement, and acquiring the image signals for distance measurement of the plurality of frames in a time-series order until distance measurement information exceeding a reliability-determination value is acquired, and the control unit performs the second curtain travel preparation in a case where the distance measuring unit acquires the distance measurement information exceeding the reliability-determination value. Since the acquisition of the image signal for distance measurement is performed until distance measurement information exceeding the reliability-determination value is acquired, distance measurement accuracy can be ensured. Accordingly, continuous shooting having high accuracy in focusing can be performed. The number of the plurality of frames obtained until the distance measurement information exceeding the reliability-determination value is acquired may be limited, and priority may be given to the taking of a static image or a determination threshold value of the reliability-determination value may be changed in a case where distance measurement information exceeding the reliability-determination value cannot be acquired within the limited number of frames.

According to another aspect of the invention, in the imaging device, it is preferable that the image signal for the display of the live view image read from the imaging element during the continuous shooting-repetition period in the continuous shooting mode includes an image signal for distance measurement to be exposed for distance measurement; the imaging device further comprises a distance measuring unit acquiring the image signal for distance measurement from the imaging element and calculating distance measurement information on the basis of the acquired image signal for distance measurement and a lens drive time-calculating unit calculating a lens drive time required for driving of a focus lens on the basis of the calculated distance measurement information; and the control unit compares the calculated lens drive time with a time required for the second curtain travel preparation, calculates an imaging timing when the exposure control of the static image is to be started on the basis of the lens drive time in a case where the lens drive time is equal to or longer than the time required for the second curtain travel preparation, and starts the second curtain travel preparation at a time ahead of the calculated imaging timing by the time required for the second curtain travel preparation. In a case where the calculated lens drive time is equal to or longer than the time required for the second curtain travel preparation, the lens drive time becomes dominant time in determining an imaging timing. Accordingly, the second curtain travel preparation is started at a time ahead of the imaging timing, which is determined on the basis of the lens drive time, (a point of time when the driving of the lens is completed) by a predetermined time (the time required for the second curtain travel preparation). Therefore, a continuous shooting speed can be more improved than that in a case where the second curtain travel preparation is started after the completion of the driving of the lens.

According to another aspect of the invention, in the imaging device, it is preferable that the image signal for the display of the live view image read from the imaging element during the continuous shooting-repetition period in the continuous shooting mode includes an image signal for distance measurement to be exposed for distance measurement; the imaging device further comprises a distance measuring unit acquiring the image signal for distance measurement from the imaging element and calculating distance measurement information on the basis of the acquired image signal for distance measurement, and a lens drive time-calculating unit calculating a lens drive time required for driving of a focus lens on the basis of the calculated distance measurement information; and the control unit compares the calculated lens drive time with a time required for the second curtain travel preparation, calculates an imaging timing when the exposure control of the static image is to be started on the basis of the time required for the second curtain travel preparation in a case where the time required for the second curtain travel preparation is equal to or longer than the lens drive time, and starts the second curtain travel preparation at a time ahead of the calculated imaging timing by the time required for the second curtain travel preparation. In a case where the calculated time required for the second curtain travel preparation is equal to or longer than the lens drive time, the time required for the second curtain travel preparation becomes dominant time in determining an imaging timing. Accordingly, the second curtain travel preparation is started at a time ahead of the imaging timing, which is determined on the basis of the time required for the second curtain travel preparation, by a predetermined time (the time required for the second curtain travel preparation). Therefore, a continuous shooting speed can be more improved than that in a case where the second curtain travel preparation is started after the completion of the driving of the lens.

According to another aspect of the invention, in the imaging device, it is preferable that, in a case where the control unit receives an input of an instruction to end continuous shooting in the continuous shooting mode before the start of the second curtain travel preparation after the start of the first curtain travel preparation, the control unit causes the second front curtain-drive member and the rear curtain-drive member to be moved to the charge positions by the charge member and holds the second front curtain-drive member and the rear curtain-drive member at the charge positions by the lock mechanism in a state where the excitation of the front curtain-electromagnetic actuator and the rear curtain-electromagnetic actuator is maintained, and then demagnetizes the excited front curtain-electromagnetic actuator and the excited rear curtain-electromagnetic actuator. In a case where the input of an instruction to end continuous shooting in the continuous shooting mode is received before the start of the second curtain travel preparation, it is possible to make the focal-plane shutter to return to the normally open state without closing the exposure aperture portion due to drive and the like caused by the charge member. Therefore, it is possible to make the blackout of a live view image not occur after the input of an instruction to end continuous shooting is received.

According to another aspect of the invention, it is preferable that the imaging device further comprises a voltage control unit controlling curtain-holding excitation voltage to be supplied to the front curtain-electromagnetic actuator and the rear curtain-electromagnetic actuator, and the voltage control unit makes the curtain-holding excitation voltage, which is used in the continuous shooting mode, be higher than normal voltage used as curtain-holding excitation voltage in a normal imaging mode where a single static image is to be taken. In a case where the second curtain travel preparation, which releases the prevention of the travel of the front curtain in the closing direction performed by the front curtain-locking member and causes the front curtain to travel in the closing direction by a biasing force of the return spring to fully close the exposure aperture portion, is performed, the first front curtain-drive member, which causes the front curtain to travel in the closing direction, collides with the second front curtain-drive member that is electromagnetically held by the front curtain-electromagnetic actuator. There is a case where the holding position of the second front curtain-drive member electromagnetically held by the front curtain-electromagnetic actuator is shifted from a normal holding position due to this collision. In this case, exposure accuracy deteriorates. Accordingly, the curtain-holding excitation voltage, which is used in the continuous shooting mode, is made higher than normal voltage, which is used as the curtain-holding excitation voltage in the normal imaging mode where a single static image is to be taken, to increase the holding electromagnetic force of the second front curtain-drive member so that the holding position of the second front curtain-drive member is not changed even though the first front curtain-drive member collides.

According to another aspect of the invention, in the imaging device, it is preferable that the voltage control unit lowers the curtain-holding excitation voltage, which has been made high, to the normal voltage before the start of the exposure control after the completion of the second curtain travel preparation.

In a case where the travel of the curtain using demagnetization is performed from a state where the curtain-holding excitation voltage is higher than the normal voltage, curtain travel characteristics may be changed from those in a case where the second front curtain-drive member is held using the curtain-holding excitation voltage. As a result, exposure accuracy deteriorates. Accordingly, since the curtain-holding excitation voltage, which has been made high, is lowered to the normal voltage before the start of the exposure control after the completion of the second curtain travel preparation, exposure accuracy can be improved and electric power consumption can be reduced.

According to another aspect of the invention, there is provided a method of controlling an imaging device including a focal-plane shutter, an imaging element, and a control unit controlling the focal-plane shutter and the imaging element. The focal-plane shutter includes a first front curtain-drive member that causes a front curtain to travel in an opening direction by movement thereof in a first direction to fully open an exposure aperture portion and causes the front curtain to travel in a closing direction by movement thereof in a second direction opposite to the first direction to fully close the exposure aperture portion, a second front curtain-drive member that is biased in the first direction by a front curtain-travel spring and moves the first front curtain-drive member in the first direction while being in contact with the first front curtain-drive member, a return spring that biases the front curtain in the closing direction by a biasing force smaller than a biasing force of the front curtain-travel spring, a rear curtain-drive member that is biased in the first direction by a rear curtain-travel spring, causes a rear curtain to travel in a closing direction by movement thereof in the first direction to fully close the exposure aperture portion, and causes the rear curtain to travel in an opening direction by movement thereof in the second direction to fully open the exposure aperture portion, a charge member that moves the second front curtain-drive member and the rear curtain-drive member in the second direction against the biasing forces of the front curtain-travel spring and the rear curtain-travel spring to move the second front curtain-drive member and the rear curtain-drive member to charge positions on a movement end side in the second direction, a lock mechanism that holds the second front curtain-drive member and the rear curtain-drive member at the charge positions in a case where the second front curtain-drive member and the rear curtain-drive member are positioned at the charge positions, a front curtain-locking member that prevents travel of the front curtain in the closing direction in a case where the front curtain is fully opened, and a front curtain-electromagnetic actuator and a rear curtain-electromagnetic actuator that directly or indirectly prevent the movement of the second front curtain-drive member and the movement of the rear curtain-drive member in the first direction, which are caused by the front curtain-travel spring and the rear curtain-travel spring, through the supply of current in a case where the second front curtain-drive member and the rear curtain-drive member are positioned at the charge positions. The method comprises: a first step of causing the front curtain-locking member to be moved by the control unit to prevent the travel of the front curtain in the closing direction; a second step of causing the second front curtain-drive member and the rear curtain-drive member to be moved to the charge positions by the charge member in a state where the travel of the front curtain in the closing direction is prevented and holding the second front curtain-drive member and the rear curtain-drive member at the charge positions by the lock mechanism to fully open the exposure aperture portion; a third step of exciting the front curtain-electromagnetic actuator and the rear curtain-electromagnetic actuator to prevent the rotational movement of the second front curtain-drive member and the rear curtain-drive member in the first direction after the exposure aperture portion is fully opened by the second step; a fourth step of releasing the holding of the second front curtain-drive member and the rear curtain-drive member at the charge positions, which is performed by the lock mechanism, by the control unit after the movement of the second front curtain-drive member and the rear curtain-drive member is prevented by the third step; a fifth step of being performed from a point of time later than a point of time when the processing of the fourth step is to be started, releasing the prevention of the travel of the front curtain in the closing direction performed by the front curtain-locking member, and causing the front curtain to travel in the closing direction by a biasing force of the return spring to fully close the exposure aperture portion; a sixth step of demagnetizing the front curtain-electromagnetic actuator after the exposure aperture portion is fully closed, causing the front curtain to travel in the opening direction through the second front curtain-drive member by the biasing force of the front curtain-travel spring to start exposure, demagnetizing the rear curtain-electromagnetic actuator after a lapse of an exposure time corresponding to a shutter speed, and causing the rear curtain to travel in the closing direction through the rear curtain-drive member by the biasing force of the rear curtain-travel spring to perform exposure corresponding to a static image; and a seventh step of reading an image signal corresponding to the static image from the imaging element after completion of the exposure. The processing of the first to seventh steps is repeated to take second and later static images in a continuous shooting mode. The image signal is read from the imaging element in a period until the exposure aperture portion is closed by the fifth step after the exposure aperture portion is opened by the second step, and a live view image is allowed to be displayed during a continuous shooting-repetition period until a point of time when exposure of the next static image is started from a point of time when exposure of each of the static images continuously taken in the continuous shooting mode is started.

According to another aspect of the invention, in the method of controlling the imaging device, it is preferable that the image signal for the display of the live view image read from the imaging element during the continuous shooting-repetition period in the continuous shooting mode includes an image signal for distance measurement, the image signal for distance measurement is acquired from the imaging element, distance measurement information is calculated on the basis of the acquired image signal for distance measurement, and the processing of the fourth step is performed during exposure of the image signal for distance measurement.

According to another aspect of the invention, in the method of controlling the imaging device, it is preferable that the image signal for the display of the live view image read from the imaging element during the continuous shooting-repetition period in the continuous shooting mode includes an image signal for distance measurement that is to be exposed for distance measurement, the image signal for distance measurement is acquired from the imaging element, distance measurement information is calculated on the basis of the acquired image signal for distance measurement, and the processing of the fourth step is performed after completion of exposure of the image signal for distance measurement.

According to another aspect of the invention, in the method of controlling the imaging device, it is preferable that the image signal for the display of the live view image read from the imaging element during the continuous shooting-repetition period in the continuous shooting mode includes an image signal for distance measurement that is to be exposed for distance measurement, the image signal for distance measurement is acquired from the imaging element after completion of the processing of the fourth step, and distance measurement information is calculated on the basis of the acquired image signal for distance measurement.

According to another aspect of the invention, in the method of controlling the imaging device, it is preferable that the image signal for the display of the live view image read from the imaging element during the continuous shooting-repetition period in the continuous shooting mode includes image signals for distance measurement of a plurality of frames that are to be exposed for distance measurement, the image signals for distance measurement of the plurality of frames are acquired in a time-series order until distance measurement information exceeding a reliability-determination value is acquired in a case where the image signal for distance measurement is to be acquired from the imaging element and distance measurement information is to be acquired on the basis of the acquired image signal for distance measurement, and the processing of the fifth step is started in a case where the distance measurement information exceeding the reliability-determination value is acquired.

According to another aspect of the invention, in the method of controlling the imaging device, it is preferable that the image signal for the display of the live view image read from the imaging element during the continuous shooting-repetition period in the continuous shooting mode includes an image signal for distance measurement that is to be exposed for distance measurement; the method further comprises a step of acquiring the image signal for distance measurement from the imaging element and calculating distance measurement information on the basis of the acquired image signal for distance measurement and a step of calculating a lens drive time required for driving of a focus lens on the basis of the calculated distance measurement information; and the calculated lens drive time is compared with a time required for the processing of the fifth step, an imaging timing when the exposure control of the static image is to be started is calculated on the basis of the lens drive time in a case where the lens drive time is equal to or longer than the time required for the processing of the fifth step, and the processing of the fifth step is started at a time ahead of the calculated imaging timing by the time required for the processing of the fifth step.

According to another aspect of the invention, in the method of controlling the imaging device, it is preferable that the image signal for the display of the live view image read from the imaging element during the continuous shooting-repetition period in the continuous shooting mode includes an image signal for distance measurement that is to be exposed for distance measurement; the method further comprises a step of acquiring the image signal for distance measurement from the imaging element and calculating distance measurement information on the basis of the acquired image signal for distance measurement and a step of calculating a lens drive time required for driving of a focus lens on the basis of the calculated distance measurement information; and the calculated lens drive time is compared with a time required for the processing of the fifth step, an imaging timing when the exposure control of the static image is to be started is calculated on the basis of the time required for processing of the fifth step in a case where the time required for the processing of the fifth step is equal to or longer than the lens drive time, and the processing of the fifth step is started at a time ahead of the calculated imaging timing by the time required for the processing of the fifth step.

According to another aspect of the invention, in the method of controlling the imaging device, it is preferable that, in a case where an input of an instruction to end continuous shooting in the continuous shooting mode is received before the start of the processing of the fifth step after the start of the processing of the fourth step, the second front curtain-drive member and the rear curtain-drive member are moved to the charge positions by the charge member and are held at the charge positions by the lock mechanism in a state where the excitation of the front curtain-electromagnetic actuator and the rear curtain-electromagnetic actuator is maintained, and the excited front curtain-electromagnetic actuator and the excited rear curtain-electromagnetic actuator are demagnetized.

According to the invention, a live view image can be displayed using a focal-plane shutter that can perform a normally open operation, and a period where an exposure aperture portion is closed in a curtain travel preparation period where a front curtain and a rear curtain are shifted to a state where the front curtain and the rear curtain can travel from a normally open state is shortened in a case where the front curtain and the rear curtain are caused to travel to continuously take static images (continuous shooting). Accordingly, a period where the blackout of a live view image occurs during continuous shooting can be shortened.

DESCRIPTION OF THE PREFERRED EMBODIMENTS

Preferred embodiments of an imaging device and a method of controlling the imaging device according to the the embodiment of the invention will be described below with reference to accompanying drawings.

<Appearance of Imaging Device>

Figure 1:
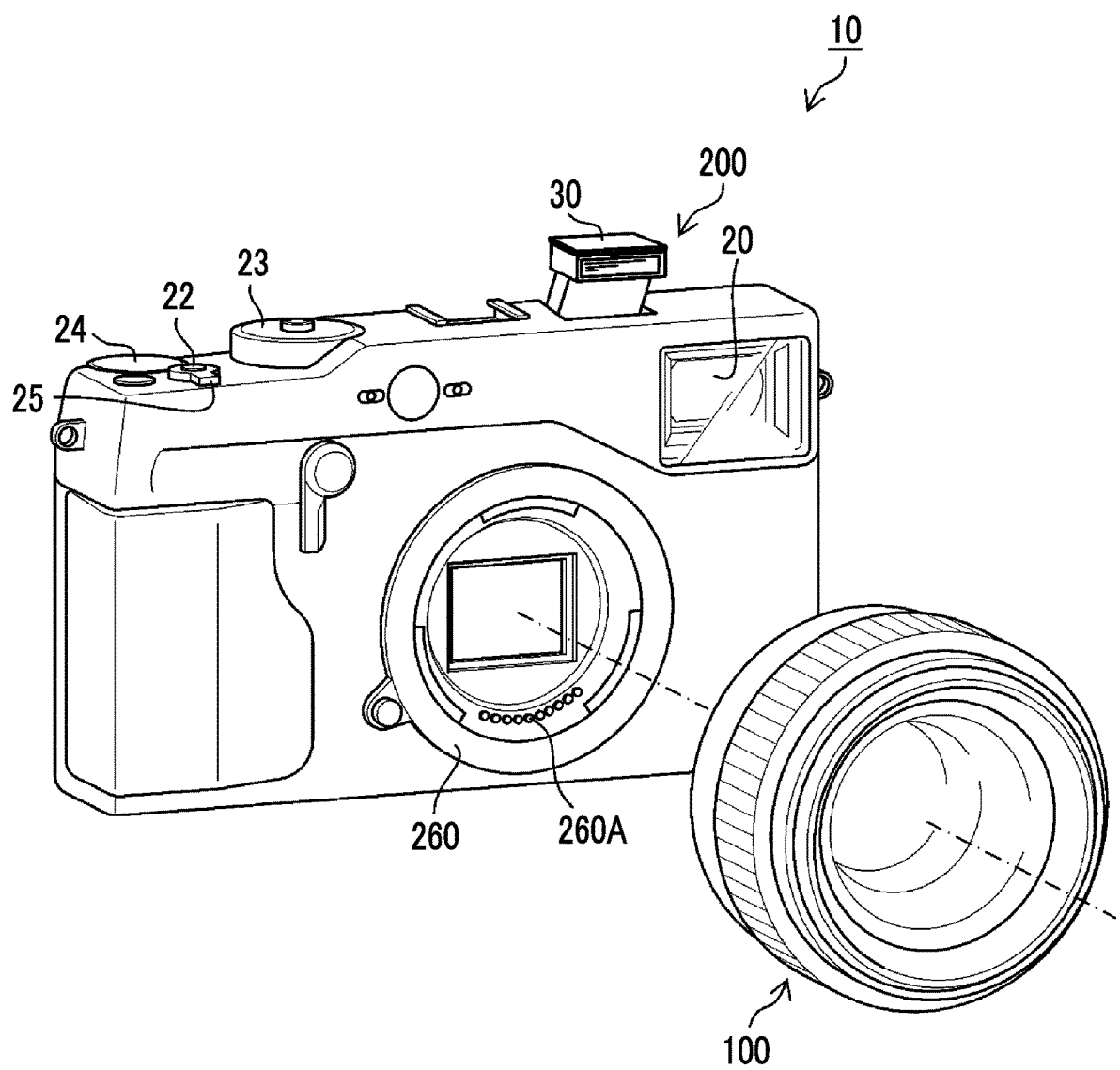
FIG. 1 is a perspective view of a camera system according to the invention that is viewed obliquely from the front side.
Figure 2:
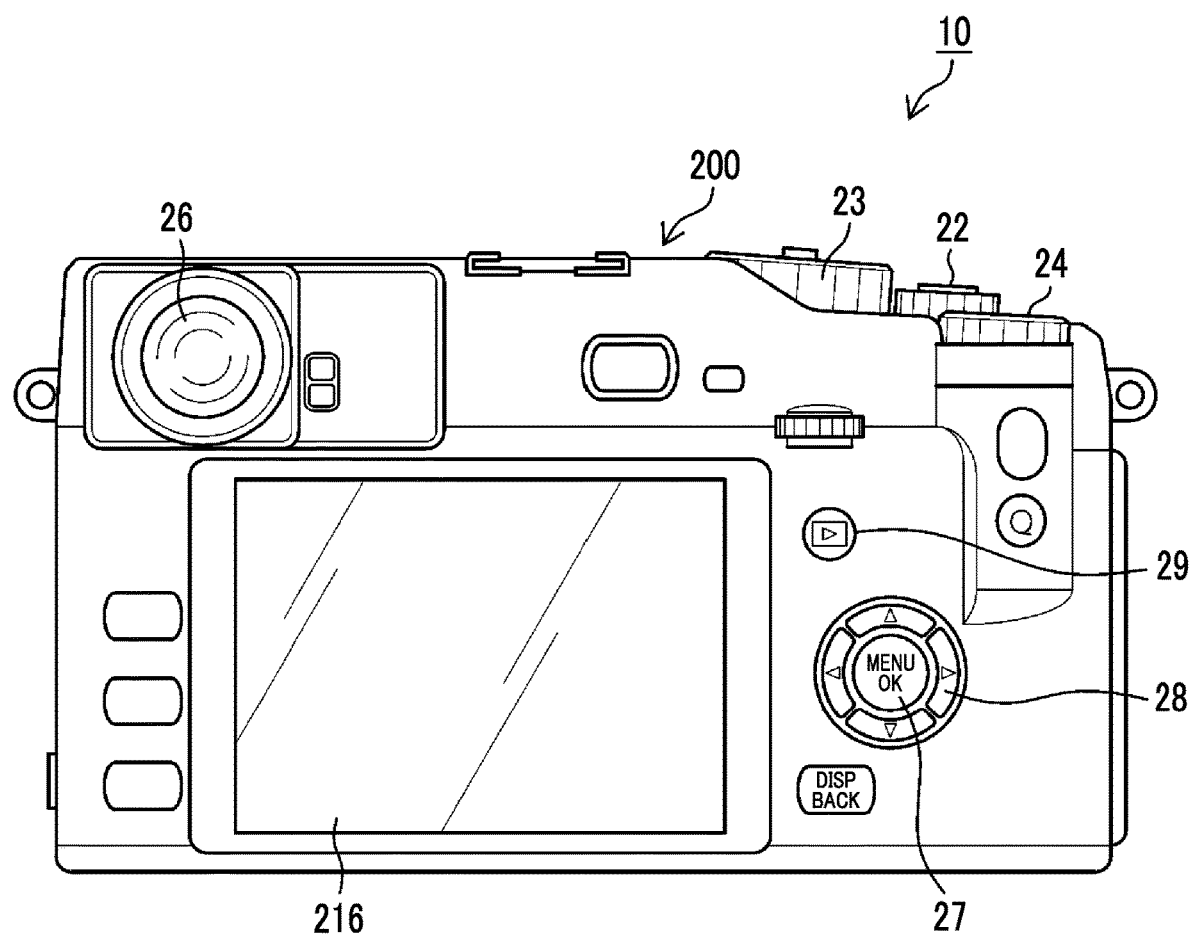
FIG. 2 is a back view of a camera body.

FIG. 1 is a perspective view of an imaging device that is viewed obliquely from the front side, and FIG. 2 is a back view of the imaging device.

As shown in FIG. 1, an imaging device 10 is a mirrorless digital single-lens camera including an interchangeable lens 100 and a camera body 200 to and from which the interchangeable lens 100 is attachable and detachable.

In FIG. 1, a body mount 260 on which the interchangeable lens 100 is to be mounted, a finder window 20 of an optical finder, and the like are provided on the front surface of the camera body 200, and a shutter release switch 22, a shutter speed dial 23, an exposure correction dial 24, a power lever 25, and a built-in flash 30 are mainly provided on the upper surface of the camera body 200.

As shown in FIG. 2, a monitor 216 formed of a liquid crystal display or the like, an eyepiece part 26 of the optical finder, a MENU/OK key 27, a cross key 28, a play button 29, and the like are mainly provided on the back surface of the camera body 200.

The monitor 216 functions as a display unit that displays various menu screens in addition to displaying a live view image in an imaging mode and playing back and displaying a taken image in a playback mode. The MENU/OK key 27 is an operation key having both a function as a menu button for giving a command to display a menu on the screen of the monitor 216 and a function as an OK button for giving a command to determine and perform selected contents and the like. The cross key 28 is an operation part that is used to input instructions in four directions of an upward direction, a downward direction, a left direction, and a right direction, and functions as a button that is used to select an item from the menu screen or is used to give an instruction to select various setting items from each menu. Further, an upper key and a lower key of the cross key 28 function as zoom switches at the time of imaging or play-zoom switches in the playback mode, and a left key and a right key thereof function as frame advance (fast-forward and rewind) buttons in the playback mode. Furthermore, the MENU/OK key 27, the cross key 28, and the menu screens displayed on the monitor 216 can be used to set various imaging modes including a continuous shooting mode where static images are to be continuously taken in addition to a normal imaging mode where a single static image is to be taken. A continuous shooting speed (for example, about 8 frames/sec, about 3 frames/sec) can be set in a case where the continuous shooting mode is set.

The play button 29 is a button that is used to switch a mode to the playback mode where taken and recorded static images or videos are to be displayed on the monitor 216.

<Internal Configuration of Imaging Device>

Figure 3:
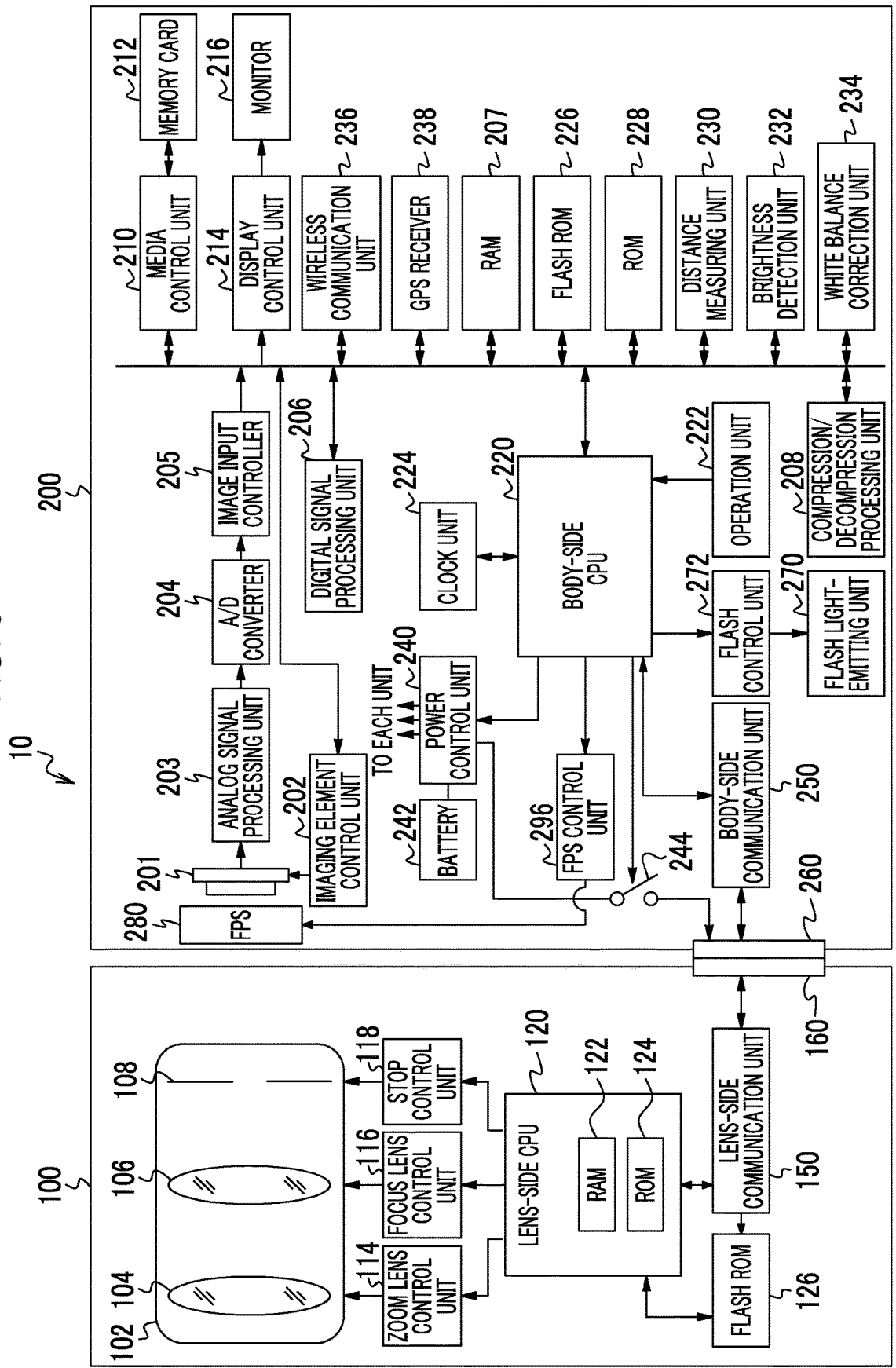
FIG. 3 is a block diagram showing an embodiment of the internal configuration of the camera system.

FIG. 3 is a block diagram showing an embodiment of the internal configuration of the imaging device 10.

[Interchangeable Lens]

The interchangeable lens 100 of the imaging device 10 is manufactured according to the communication standards of the camera body 200, and is an interchangeable lens that can communicate with the camera body 200 as described later. The interchangeable lens 100 comprises an imaging optical system 102, a zoom lens control unit 114, a focus lens control unit 116, a stop control unit 118, a lens-side central processing unit (CPU) 120 (lens-side control unit), a flash read only memory (ROM) 126, a lens-side communication unit 150, and a lens mount 160.

The imaging optical system 102 includes a plurality of optical members including a zoom lens 104, a focus lens 106, and a stop 108. The zoom lens control unit 114 controls the zoom position of the zoom lens 104 according to a command from the lens-side CPU 120. The focus lens control unit 116 controls the focus position of the focus lens 106 according to a command from the lens-side CPU 120. The stop control unit 118 controls the stop 108 (the area of an aperture) according to a command from the lens-side CPU 120.

The lens-side CPU 120 generally controls the interchangeable lens 100, and a ROM 124 and a RAM 122 are built in the lens-side CPU 120.

The flash ROM 126 is a non-volatile memory that stores a program and the like downloaded from the camera body 200.

The lens-side CPU 120 generally controls each part of the interchangeable lens 100 according to a control program stored in the ROM 124 or the flash ROM 126 while using the RAM (Random Access Memory) 122 as a work area.

The lens-side communication unit 150 communicates with the camera body 200 through a plurality of signal terminals (lens-side signal terminals) provided on the lens mount 160 in a state where the lens mount 160 is mounted on the body mount 260 of the camera body 200. That is, the lens-side communication unit 150 transmits and receives a request signal and a response signal to and from (performs two-way communication with) a body-side communication unit 250 of the camera body 200, which is connected to the lens-side communication unit 150 through the lens mount 160 and the body mount 260, according to a command from the lens-side CPU 120.

Further, the interchangeable lens 100 comprises a detection unit (not shown) that detects the lens information of the respective optical members of the imaging optical system 102 (the zoom information of the zoom lens 104, the focus position information of the focus lens 106, and stop information). Here, the zoom information is information representing a zoom position, a zoom magnification, a focal length, and the like; and the stop information is information representing a stop value (F-Number), the aperture diameter of the stop 108, and the like. In this example, an F-Number will be used as the stop information hereinafter.

It is preferable that the lens-side CPU 120 stores various kinds of detected lens information in the RAM 122 to meet a request for lens information transmitted from the camera body 200. Further, the lens information of each optical member is detected in a case where there is a request for the lens information transmitted from the camera body 200, is detected in a case where the optical member is driven, or is detected at regular intervals (an interval sufficiently shorter than the frame interval of a video); and detection results can be stored.

[Camera Body]

The camera body 200 of the imaging device 10 comprises an imaging element (imaging unit) 201, an imaging element control unit 202, an analog signal processing unit 203, an analog/digital (A/D) converter 204, an image input controller 205, a digital signal processing unit 206, a RAM 207, a compression/decompression processing unit 208, a media control unit 210, a memory card 212, a display control unit 214, a monitor 216, a body-side CPU 220, an operation unit 222, a clock unit 224, a flash ROM 226, a ROM 228, a distance measuring unit 230, a brightness detection unit 232, a white balance correction unit 234, a wireless communication unit 236, a global positioning system (GPS) receiver 238, a power control unit 240, a battery 242, a body-side communication unit 250, a body mount 260, a flash light-emitting unit 270 and a flash control unit 272 of the built-in flash 30 (FIG. 1), a focal-plane shutter (FPS) 280, and an FPS control unit 296.

The imaging element 201 is formed of a complementary metal-oxide semiconductor (CMOS) color image sensor. The imaging element 201 is not limited to a CMOS color image sensor, and may be an XY address color image sensor or a charge coupled device (CCD) color image sensor.

The imaging element 201 includes a plurality of pixels that are arranged in the form of a matrix so as to have a predetermined pattern array (a Bayer array, an X-Trans (registered trademark) array, a honeycomb array, or the like), and each pixel includes a microlens, a red (R), green (G), or blue (B) color filter, and a photoelectric conversion element (a photodiode or the like).

The optical image of a subject, which is formed on the light-receiving surface of the imaging element 201 by the imaging optical system 102 of the interchangeable lens 100, is converted into electrical signals by the imaging element 201. That is, each pixel of the imaging element 201 accumulates electric charges corresponding to the amount of light to be incident, and an electrical signal corresponding to the amount of electric charges accumulated in each pixel is read from the imaging element 201 as an image signal.

The imaging element control unit 202 controls the reading of the image signals from the imaging element 201 according to the command of the body-side CPU 220. Further, the imaging element control unit 202 has a function as an electronic shutter that simultaneously discharges (simultaneously resets) the electric charges accumulated in the respective pixels of the imaging element 201 to start exposure according to an electronic shutter control signal from the body-side CPU 220.

The analog signal processing unit 203 performs various kinds of analog signal processing according to analog image signals that are obtained from the imaging of a subject performed by the imaging element 201. The analog signal processing unit 203 includes a sampling hold circuit, a color separation circuit, an automatic gain control (AGC) circuit, and the like. The AGC circuit functions as a sensitivity adjuster adjusting sensitivity (ISO sensitivity (ISO: International Organization for Standardization)) at the time of imaging, and adjusts the gain of an amplifier amplifying an image signal to be input to make the signal level of the image signal be in an appropriate range. The A/D converter 204 converts an analog image signal, which is output from the analog signal processing unit 203, into a digital image signal.

Image data (mosaic image data) for each of the RGB pixels, which are output through the imaging element 201, the analog signal processing unit 203, and the A/D converter 204 at the time of taking of a static image or a video, are input to the RAM 207 from the image input controller 205, and are temporarily stored in the RAM 207. In a case where the imaging element 201 is a CMOS imaging element, the analog signal processing unit 203 and the A/D converter 204 are often built in the imaging element 201.

The digital signal processing unit 206 performs various kinds of digital signal processing on the image data stored in the RAM 207. The digital signal processing unit 206 of this example appropriately reads the image data stored in the RAM 207; performs digital signal processing, such as offset processing, gain-control processing including sensitivity correction, gamma correction processing, demosaic processing (also referred to as demosaicing processing or synchronization processing), and RGB/YCrCb conversion processing, on the read image data; and stores the image data, which have been subjected to the digital signal processing, in the RAM 207 again. The demosaic processing is processing for calculating information about all RGB colors for each pixel from a mosaic image including RGB colors in the case of an imaging element including, for example, color filters having the three RGB colors, and generates synchronized image data of three RGB surfaces from mosaic data (point-sequence RGB data).

The RGB/YCrCb conversion processing is processing for converting the synchronized RGB data into luminance data (Y) and color difference data (Cr and Cb).

The compression/decompression processing unit 208 performs compression processing on the luminance data Y and the color difference data Cb and Cr, which are temporarily stored in the RAM 207 and are not compressed, at the time of recording of a static image or a video. The compression/decompression processing unit 208 compresses a static image in, for example, joint photographic coding experts group (JPEG) format and compresses a video in, for example, H.264 format. Image data, which are compressed by the compression/decompression processing unit 208, are recorded in the memory card 212 through the media control unit 210. Further, the compression/decompression processing unit 208 performs decompression processing on the compressed image data that are obtained from the memory card 212 through the media control unit 210 in the playback mode, and generates uncompressed image data.

The media control unit 210 performs control to record the image data, which are compressed by the compression/decompression processing unit 208, in the memory card 212. Further, the media control unit 210 performs control to read the compressed image data from the memory card 212.

The display control unit 214 performs control to cause the monitor 216 to display the uncompressed image data that are stored in the RAM 207. The monitor 216 is formed of, for example, a display device, such as a liquid crystal display device or an organic electroluminescence device.

In a case where the monitor 216 is to be caused to display a live view image, digital image signals continuously generated by the digital signal processing unit 206 are temporarily stored in the RAM 207. The display control unit 214 converts the digital image signals temporarily stored in the RAM 207 into a signal format for display, and sequentially outputs the converted digital image signals to the monitor 216. Accordingly, since an image to be taken is displayed on the monitor 216 in real time, the monitor 216 can be used as an electronic view finder.

The shutter release switch 22 is operation means that is used to input an instruction to start imaging, and is formed of a two-stage stroke switch that has a so-called "half press" stroke and a so-called "full press" stroke.

In an imaging mode for a static image, the shutter release switch 22 is half pressed to output an S1-on signal and the shutter release switch 22 is further pressed from the half-pressed state and is fully pressed to output an S2-on signal. In a case where an S1-on signal is output, the body-side CPU 220 performs imaging preparation processing, such as autofocus (AF) control and auto exposure (AE) control. In a case where an S2-on signal is output, the body-side CPU 220 performs imaging processing and recording processing for a static image. It goes without saying that the AF control and the AE control are automatically performed in a case where an auto mode is set by the operation unit 222 and the AF control and the AE control are not performed in a case where a manual mode is set.

Further, in a case where the shutter release switch 22 is fully pressed to output an S2-on signal in an imaging mode for a video, the camera body 200 is made to be in a video recording mode where the recording of a video is to be started and performs image processing and recording processing for a video. Then, in a case where the shutter release switch 22 is fully pressed again and an S2-on signal is output, the camera body 200 is made to be in a standby state and temporarily stops the recording processing for a video.

The shutter release switch 22 is not limited to the form of a two-stage stroke switch that has a "half press" stroke and a "full press" stroke. The shutter release switch 22 may output an S1-on signal and an S2-on signal by a single operation, or individual switches may be provided to output an S1-on signal and an S2-on signal, respectively.

Furthermore, in a form where an operation instruction is to be given by a touch panel or the like, an area corresponding to an operation instruction displayed on the screen of the touch panel may be touched as operation means to output the operation instruction. As long as an instruction to perform the imaging preparation processing or the imaging processing is given, the form of the operation means is not limited thereto.

A static image or a video, which is obtained from imaging, is compressed by the compression/decompression processing unit 208; compressed image data are converted into an image file to which required additional information, such as the date and time of imaging, GPS information, and imaging conditions (an F-Number, a shutter speed, ISO sensitivity, and the like), are added; and the image file is then stored in the memory card 212 through the media control unit 210.

The body-side CPU 220 generally controls the operation of the entire camera body 200, the driving of the optical members of the interchangeable lens 100, and the like and controls the respective parts of the camera body 200 and the interchangeable lens 100 on the basis of inputs from the operation unit 222, which includes the shutter release switch 22, and the like.

The clock unit 224 functions as a timer and measures time on the basis of a command from the body-side CPU 220. Further, the clock unit 224 functions as a calendar and measures the current date and time.

The flash ROM 226 is a non-volatile memory where data can be read and written, and stores setting information.

A camera control program to be executed by the body-side CPU 220, information about the defects of the imaging element 201, and various parameters and tables used for image processing and the like are stored in the ROM 228. The body-side CPU 220 controls the respective parts of the camera body 200 and the interchangeable lens 100 according to the camera control program stored in the ROM 228 while using the RAM 207 as a work area.

The distance measuring unit 230 calculates a numerical value, which is required for the AF control, on the basis of the digital image signals. For example, in the case of phase-difference AF, the distance measuring unit 230 detects a phase difference corresponding to a distance to a subject on the basis of the pixel values of phase difference-detection pixels provided in the imaging element 201 (phase difference-detection pixels provided in an AF area of the imaging element 201), and calculates a distance (defocus distance) between the focus position of the imaging optical system 102 and the imaging surface of the imaging element 201 on the basis of the detected phase difference. The calculated defocus distance or the lens moving distance of the focus lens 106, which is required to reduce the defocus distance to zero, is the numerical value required for the AF control, and the body-side CPU 220 causes the focus lens 106 to be moved to a position where the defocus distance is zero (that is, a position where a phase difference is minimum) at the time of the AF control.

AF is not limited to phase-difference AF and may be, for example, contrast AF. In the case of contrast AF, high-frequency components are extracted from G signals of G pixels (pixels including G color filters) provided in an AF area and an integrated value (focus evaluation value) of the absolute values of the extracted high-frequency components is calculated. The calculated focus evaluation value is a numerical value required for the AF control, and the body-side CPU 220 causes the focus lens 106 to be moved to a position where the focus evaluation value is maximum (that is, a position where contrast is maximum) at the time of the AF control.

The brightness detection unit 232 is a part that detects the brightness of a subject (subject luminance), and calculates a numerical value (EV value (exposure value)) that corresponds to subject luminance and is required for the AE control. The body-side CPU 220 determines an F-Number, a shutter speed, and ISO sensitivity from a predetermined program diagram on the basis of the EV value that is obtained from the brightness detection unit 232 at the time of the AE control.

The white balance correction unit 234 calculates white balance gains (WB) Gr, Gg, and Gb of the respective color data of RGB data (R data, G data, and B data), and multiplies the R data, the G data, and the B data by the calculated WB gains Gr, Gg, and Gb, respectively, to perform white balance correction. Here, a method including specifying the type of a light source illuminating a subject on the basis of the brightness (EV value) of the subject, the color temperature of ambient light, and the like, and reading a WB gain corresponding to the specified type of a light source from a storage unit in which WB gains suitable for the types of light sources are stored in advance is considered as a method of calculating the WB gains Gr, Gg, and Gb; but other publicly known methods of obtaining WB gains Gr, Gg, and Gb using at least an EV value may be considered.

The wireless communication unit 236 is a part that performs near field communication corresponding to standards, such as Wireless Fidelity (Wi-Fi) (registered trademark) and Bluetooth (registered trademark), and transmits and receives necessary information to and from digital gadgets (portable terminals, such as a smartphone) positioned therearound.

The GPS receiver 238 receives GPS signals, which are transmitted from a plurality of GPS satellites, according to an instruction of the body-side CPU 220, performs position arithmetic processing based on the plurality of received GPS signals, and acquires GPS information that includes the latitude, the longitude, and the altitude of the camera body 200. The acquired GPS information can be recorded in the header of an image file as additional information that represents a position where the taken image is taken.

The power control unit 240 supplies power supply voltage, which is supplied from the battery 242, to each part of the camera body 200 according to the command of the body-side CPU 220. Further, the power control unit 240 supplies power supply voltage, which is supplied from the battery 242, to each part of the interchangeable lens 100 through the body mount 260 and the lens mount 160 according to the command of the body-side CPU 220.

A lens power switch 244 performs the switching of ON and OFF of the power supply voltage, which is supplied to the interchangeable lens 100 through the body mount 260 and the lens mount 160 according to the command of the body-side CPU 220, and the switching of the level of the power supply voltage.

The body-side communication unit 250 transmits and receives a request signal and a response signal to and from (performs two-way communication with) the lens-side communication unit 150 of the of the interchangeable lens 100, which is connected to the body-side communication unit 250 through the body mount 260 and the lens mount 160, according to the command of the body-side CPU 220. Since the body mount 260 is provided with a plurality of terminals 260A as shown in FIG. 1, the plurality of terminals 260A (FIG. 1) of the body mount 260 and the plurality of terminals (not shown) of the lens mount 160 are electrically connected to each other in a case where the interchangeable lens 100 is mounted on the camera body 200 (the lens mount 160 and the body mount 260 are connected to each other). Accordingly, two-way communication can be performed between the body-side communication unit 250 and the lens-side communication unit 150.

The built-in flash 30 (FIG. 1) is, for example, a Through The Lens (TTL) automatic dimming flash, and includes the flash light-emitting unit 270 and the flash control unit 272.

The flash control unit 272 has a function to adjust the amount (guide number) of flash light that is emitted from the flash light-emitting unit 270. That is, the flash control unit 272 causes the flash light-emitting unit 270 to emit flash light in synchronization with a flash imaging instruction from the body-side CPU 220, starts the photometry of reflected light (including ambient light) that is incident through the imaging optical system 102 of the interchangeable lens 100, and stops the emission of the flash light from the flash light-emitting unit 270 in a case where a photometric value reaches a standard exposure value.

[Focal-Plane Shutter]

The focal-plane shutter (FPS) 280 forms the mechanical shutter of the imaging device 10, and is disposed right in front of the imaging element 201. Further, the focal-plane shutter 280 is a focal-plane shutter that can keep an exposure aperture portion in an open state (a focal-plane shutter that can switch a normally open operation and a normally closed operation) in the charge state of the focal-plane shutter 280 as described later.

Figure 4:
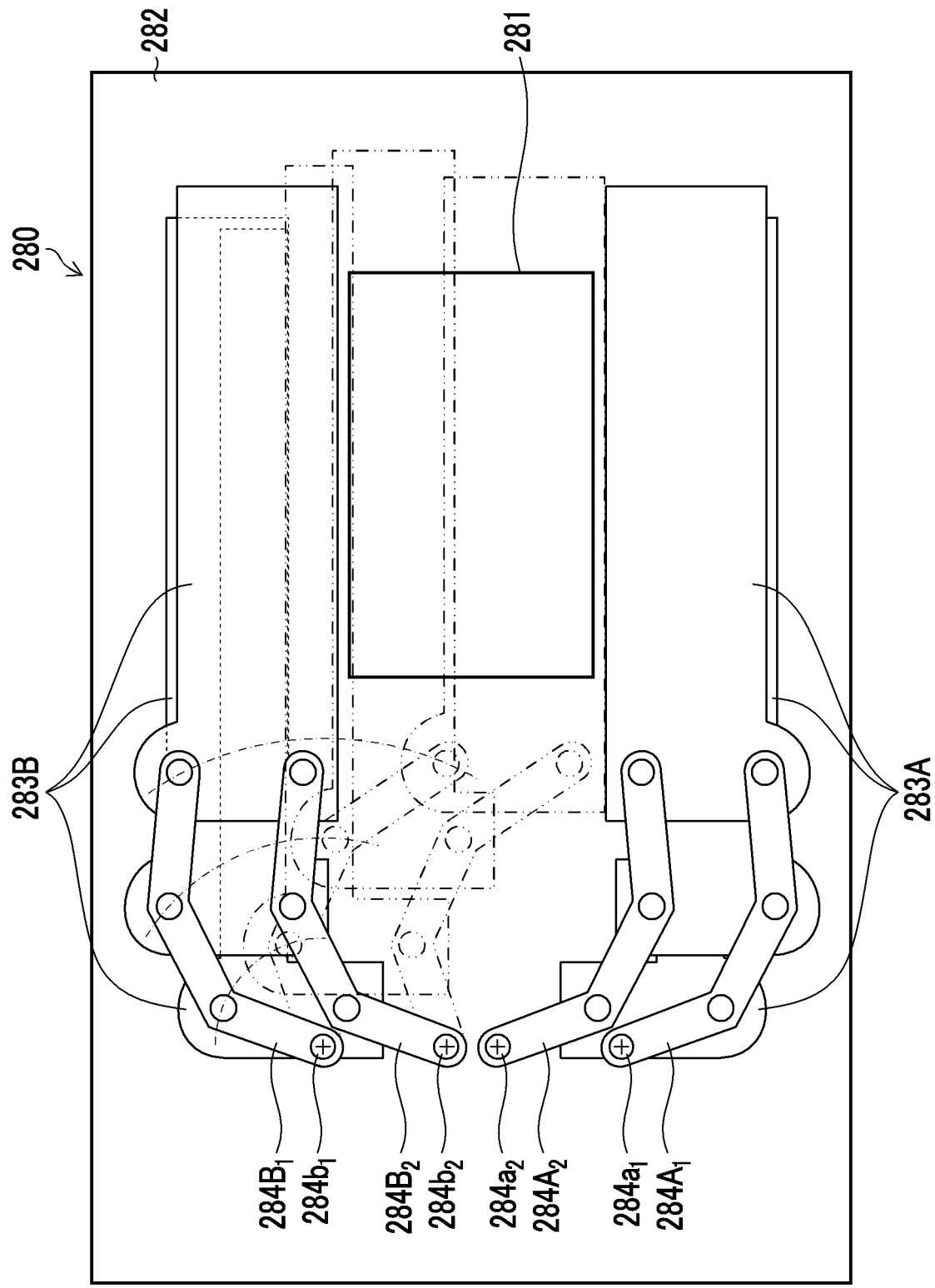
FIG. 4 is a front view showing the schematic structure of a square focal-plane shutter.
Figure 5:
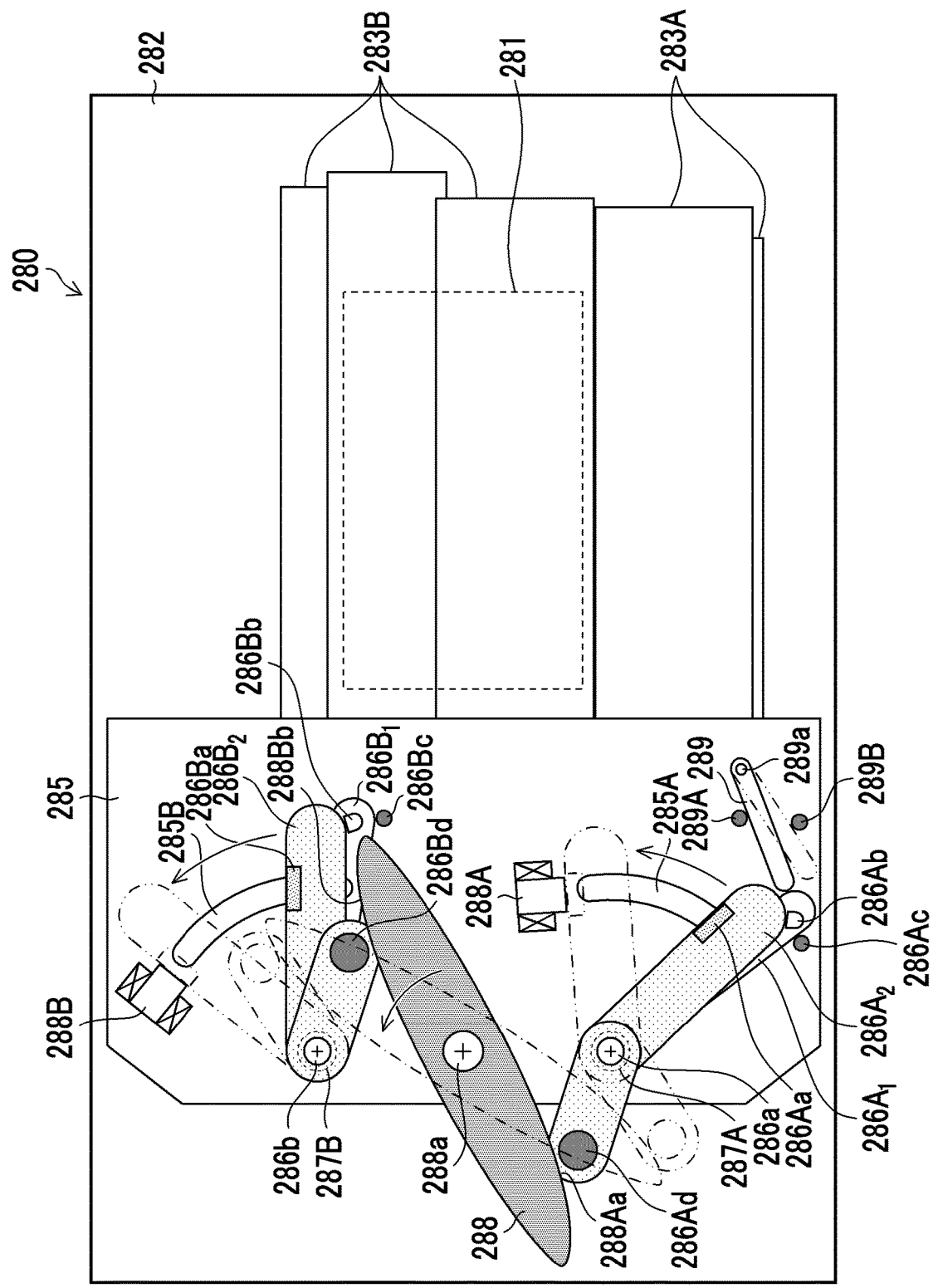
FIG. 5 is another front view showing the schematic structure of the square focal-plane shutter.

FIGS. 4 and 5 are front views showing the schematic structure of the square focal-plane shutter 280.

FIG. 4 mainly shows a front curtain 283A and a rear curtain 283B each of which is formed of a plurality of (in this example, three) shutter blades, front curtain-drive arms 284A$_1$ and 284A$_2$, and rear curtain-drive arms 284B$_1$ and 284B$_2$. FIG. 4 shows a state where each of the front and rear curtains 283A and 283B is opened (fully opened). Further, a two-dot chain line shown in FIG. 4 shows a state where an exposure aperture portion 281 is fully closed by the rear curtain 283B.

The front curtain-drive arms 284A$_1$ and 284A$_2$ and the rear curtain-drive arms 284B$_1$ and 284B$_2$ are provided on a shutter base plate 282, in which the exposure aperture portion 281 is formed, so as to be movable rotationally by support shafts 284a$_1$, 284a2, 284b1, and 284b$_2$, respectively; the front curtain 283A formed of three shutter blades is provided on the front curtain-drive arms 284A$_1$ and 284A$_2$; and the rear curtain 283B formed of three shutter blade is provided on the rear curtain-drive arms 284B$_1$ and 284B$_2$ likewise.

The front curtain-drive arms 284A$_1$ and 284A$_2$ and the respective shutter blades of the front curtain 283A form a parallel link mechanism, and the respective shutter blades of the front curtain 283A open and close the exposure aperture portion 281 during the rotational movement of the front curtain-drive arms 284A$_1$ and 284A$_2$ while maintaining a state where the respective shutter blades of the front curtain 283A are parallel to each other. In FIG. 4, the front curtain 283A travels in an opening direction (first direction) in a case where the front curtain-drive arms 284A$_1$ and 284A$_2$ are rotationally moved in a clockwise direction, and the front curtain 283A travels in a closing direction (second direction) in a case where the front curtain-drive arms 284A$_1$ and 284A$_2$ are rotationally moved in a counterclockwise direction.

Likewise, the rear curtain-drive arms 284B$_1$ and 284B$_2$ and the respective shutter blades of the rear curtain 283B form a parallel link mechanism, and the respective shutter blades of the rear curtain 283B open and close the exposure aperture portion 281 during the rotational movement of the rear curtain-drive arms 284B$_1$ and 284B$_2$ while maintaining a state where the respective shutter blades of the rear curtain 283B are parallel to each other. In FIG. 4, the rear curtain 283B travels in a closing direction (first direction) in a case where the rear curtain-drive arms 284B$_1$ and 284B$_2$ are rotationally moved in the clockwise direction, and the rear curtain 283B travels in an opening direction (second direction) in a case where the rear curtain-drive arms 284B$_1$ and 284B$_2$ are rotationally moved in the counterclockwise direction. The opening direction (first direction) of the front curtain 283A and the opening direction (second direction) of the rear curtain 283B are directions opposite to each other.

FIG. 5 mainly shows a drive mechanism that drives the front curtain 283A (front curtain-drive arm 284A$_1$) and the rear curtain 283B (rear curtain-drive arm 284B$_1$).

In FIG. 5, a bed plate 285 is disposed on the shutter base plate 282 with a predetermined interval between the shutter base plate 282 and itself; and a first front curtain-drive lever 286A$_1$ and a second front curtain-drive lever 286A$_2$ functioning as a first front curtain-drive member and a second front curtain-drive member, a first rear curtain-drive lever 286B$_1$ and a second rear curtain-drive lever 286B$_2$ functioning as rear curtain-drive members, a charge member 288, a front curtain-electromagnet 288A and a rear curtain-electromagnet 288B functioning as a front curtain-electromagnetic actuator and a rear curtain-electromagnetic actuator, and a front curtain-locking lever 289 functioning as a front curtain-locking member are provided on the bed plate 285.

The first front curtain-drive lever 286A$_1$ and the second front curtain-drive lever 286A$_2$ are provided so as to be rotationally movable by a support shaft 286a coaxial with the support shaft 284a$_1$ of the front curtain-drive arm 284A$_1$.

Further, since a front curtain-travel spring 287A and a return spring (not shown) into which a coil portion of a torsion coil spring is inserted are provided on the support shaft 286a, the second front curtain-drive lever 286A$_2$ is biased in a clockwise direction in FIG. 5 (the first direction in which the front curtain 283A is opened) by the front curtain-travel spring 287A and the first front curtain-drive lever 286A$_1$ is biased in a counterclockwise direction by the return spring.

The second front curtain-drive lever 286A$_2$ is provided with a magnetic piece 286Aa that is to be attracted and held by the front curtain-electromagnet 288A, the first front curtain-drive lever 286A$_1$ is provided with a contact pin 286Ab with which the distal end portion of the second front curtain-drive lever 286A$_2$ is to be in contact, and the bed plate 285 is provided with a stopper 286Ac with which the first front curtain-drive lever 286A$_1$ is to be in contact.

Here, in a case where the biasing force of the return spring is smaller than the biasing force of the front curtain-travel spring 287A, the second front curtain-drive lever 286A$_2$ is not attracted and held by the front curtain-electromagnet 288A, and a rotational driving force is not transmitted from the charge member 288 in the counterclockwise direction (a state shown in FIG. 5), the first front curtain-drive lever 286A$_1$ and the second front curtain-drive lever 286A$_2$ are moved to a rotational movement end (movement end) in the clockwise direction by the biasing force of the front curtain-travel spring 287A.

Further, the first front curtain-drive lever 286A$_1$ is provided with a drive pin 286Ae (FIG. 8) that is connected to the front curtain-drive arm 284A$_1$ through a long hole 285A formed in the bed plate 285, and the front curtain 283A can be opened and closed by the drive pin 286Ae and the front curtain-drive arm 284A$_1$ in a case where the first front curtain-drive lever 286A$_1$ is rotationally moved. Since the first front curtain-drive lever 286A$_1$ is moved to the rotational movement end in the clockwise direction in the state shown in FIG. 5, the front curtain 283A is in a fully open state.

Likewise, the first rear curtain-drive lever 286B$_1$ and the second rear curtain-drive lever 286B$_2$ are provided so as to be rotationally movable by a support shaft 286b coaxial with the support shaft 284b1 of the rear curtain-drive arm 284B$_1$.

Further, since a rear curtain-travel spring 287B and a return spring (not shown) into which a coil portion of a torsion coil spring is inserted are provided on the support shaft 286b, the second rear curtain-drive lever 286B$_2$ is biased in the clockwise direction in FIG. 5 (the first direction in which the rear curtain 283B is closed) by the rear curtain-travel spring 287B and the first rear curtain-drive lever 286B$_1$ is biased in the counterclockwise direction by the return spring.

The second rear curtain-drive lever 286B$_2$ is provided with a magnetic piece 286Ba that is to be attracted and held by the rear curtain-electromagnet 288B, the first rear curtain-drive lever 286B$_1$ is provided with a contact pin 286Bb with which the distal end portion of the second rear curtain-drive lever 286B$_2$ is to be in contact, and the bed plate 285 is provided with a stopper 286Bc with which the first rear curtain-drive lever 286B$_1$ is to be in contact.

Here, in a case where the biasing force of the return spring is smaller than the biasing force of the rear curtain-travel spring 287B, the second rear curtain-drive lever 286B$_2$ is not attracted and held by the rear curtain-electromagnet 288B, and a rotational driving force is not transmitted from the charge member 288 in the counterclockwise direction (the state shown in FIG. 5), the first rear curtain-drive lever 286B$_1$ and the second rear curtain-drive lever 286B$_2$ are moved to a rotational movement end (movement end) in the clockwise direction by the biasing force of the rear curtain-travel spring 287B.

Further, the first rear curtain-drive lever 286B$_1$ is provided with a drive pin 286Be (FIG. 8) that is connected to the rear curtain-drive arm 284B$_1$ through a long hole 285B formed in the bed plate 285, and the rear curtain 283B can be opened and closed by the drive pin 286Be and the rear curtain-drive arm 284B$_1$ in a case where the first rear curtain-drive lever 286B$_1$ is rotationally moved. Since the first rear curtain-drive lever 286B$_1$ is moved to the rotational movement end in the clockwise direction in the state shown in FIG. 5, the rear curtain 283B is in a fully closed state.

The charge member 288 is formed of a cam member that is rotated about a support shaft 288a, and a cam face 288Aa that is to be in contact with a cam follower 286Ad provided on the second front curtain-drive lever 286A$_2$ and a cam face 288Bb that is to be in contact with a cam follower 286Bd provided on the second rear curtain-drive lever 286B$_2$ are formed on the charge member 288.

Figure 6:
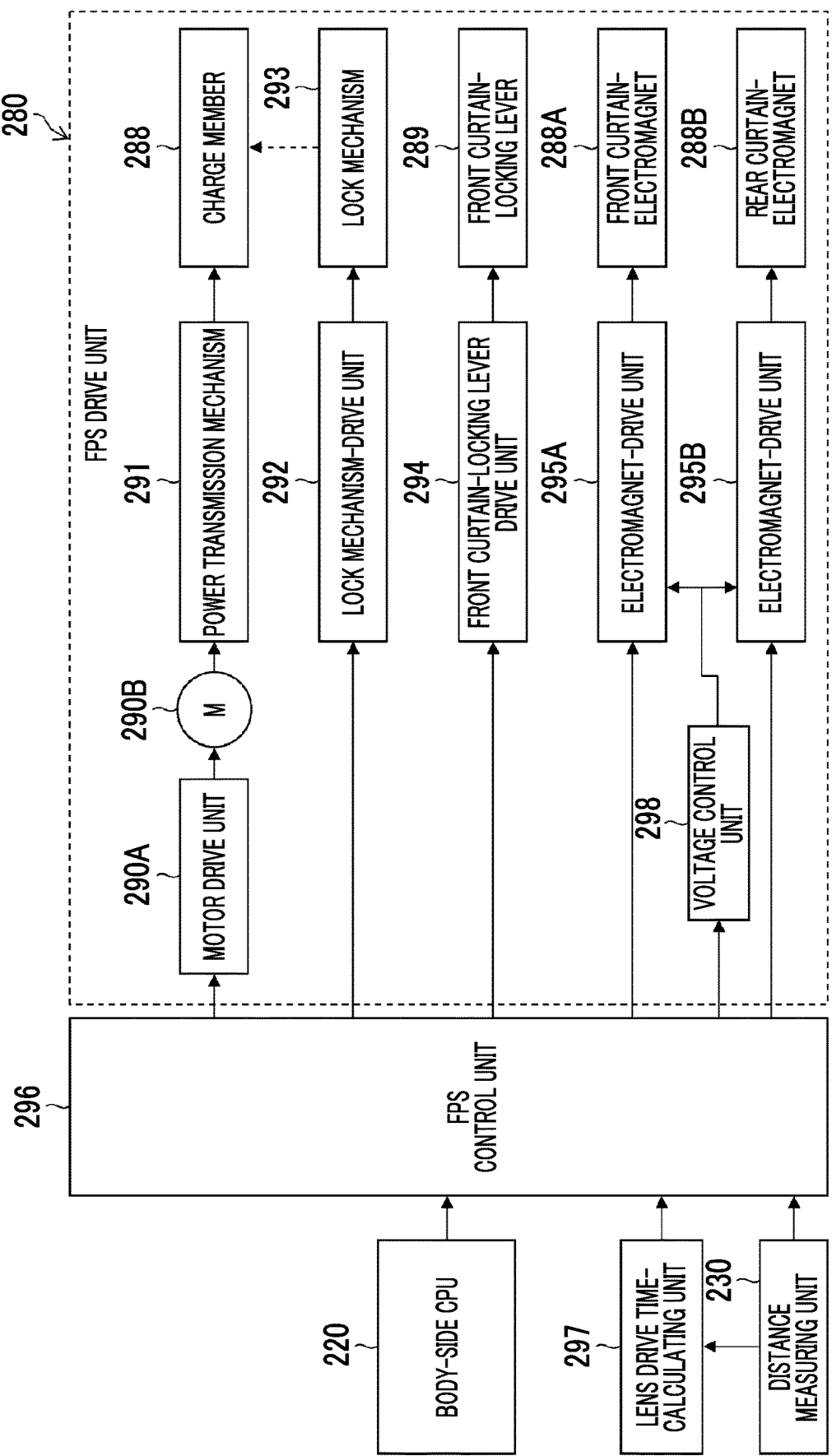
FIG. 6 is a block diagram mainly showing an FPS drive unit, an FPS control unit, and the like of the focal-plane shutter.

A rotational driving force is transmitted to the charge member 288 from a charge motor 290B shown in FIG. 6 through a power transmission mechanism 291, such as a reduction gear, so that the charge member 288 is rotationally moved in the counterclockwise direction or the clockwise direction in FIG. 5. In a case where the charge member 288 is rotationally moved in the counterclockwise direction, the second front curtain-drive lever 286A$_2$ and the second rear curtain-drive lever 286B$_2$ can be rotationally moved in the counterclockwise direction against the biasing forces of the front curtain-travel spring 287A and the rear curtain-travel spring 287B. Accordingly, the second front curtain-drive lever 286A$_2$ and the second rear curtain-drive lever 286B$_2$ can be moved to charge positions on the movement end side in the counterclockwise direction (positions where the magnetic pieces 286Aa and 286Ba of the second front curtain-drive lever 286A$_2$ and the second rear curtain-drive lever 286B$_2$ are in contact with the front curtain-electromagnet 288A and the rear curtain-electromagnet 288B, respectively).

In a case where the second front curtain-drive lever 286A$_2$ and the second rear curtain-drive lever 286B$_2$ are positioned at the charge positions, respectively, and current is supplied to the front curtain-electromagnet 288A and the rear curtain-electromagnet 288B, the front curtain-electromagnet 288A and the rear curtain-electromagnet 288B attract the magnetic piece 286Aa of the second front curtain-drive lever 286A$_2$ and the magnetic piece 286Ba of the second rear curtain-drive lever 286B$_2$ and hold the second front curtain-drive lever 286A$_2$ and the second rear curtain-drive lever 286B$_2$ against the biasing forces of the front curtain-travel spring 287A and the rear curtain-travel spring 287B.

The front curtain-electromagnet 288A and the rear curtain-electromagnet 288B of this example have a direct type structure that attracts and holds the magnetic piece 286Aa of the second front curtain-drive lever 286A$_2$ and the magnetic piece 286Ba of the second rear curtain-drive lever 286B$_2$ by an electromagnetic force, but are not limited thereto. The front curtain-electromagnet 288A and the rear curtain-electromagnet 288B may have a locking type structure that holds the second front curtain-drive lever 286A$_2$ and the second rear curtain-drive lever 286B$_2$ at the charge positions by causing locking members, which are driven by a front curtain-electromagnetic actuator and a rear curtain-electromagnetic actuator, to be engaged with the second front curtain-drive lever 286A$_2$ and the second rear curtain-drive lever 286B$_2$.

Not only in the case of the electromagnetic actuator (electromagnet) to be applied to the direct type structure but also in the case of the electromagnetic actuator (for example, a solenoid or the like) to be applied to the locking type structure, current needs to continue to be supplied to the front curtain-electromagnetic actuator and the rear curtain-electromagnetic actuator in a case where the second front curtain-drive lever $286A_2$ and the second rear curtain-drive lever $286B_2$ are to be held at the charge positions. In short, as long as the front curtain-electromagnetic actuator and the rear curtain-electromagnetic actuator can directly or indirectly hold the second front curtain-drive lever $286A_2$ and the second rear curtain-drive lever $286B_2$ at the charge positions by the supply of current, any electromagnetic actuators may be used as the front curtain-electromagnetic actuator and the rear curtain-electromagnetic actuator.

The front curtain-locking lever 289 is a lever preventing the front curtain 283A from traveling in the closing direction (preventing the first front curtain-drive lever $286A_1$ from being rotationally moved in the counterclockwise direction) in a case where the front curtain 283A is fully opened as shown in FIG. 5 (in a case where the first front curtain-drive lever $286A_1$ is in contact with stopper 286Ac), and is a component that causes the focal-plane shutter 280 to perform a normally open operation.

The front curtain-locking lever 289 of this example is provided so as to be rotationally movable about a support shaft 289a, and can be moved to a position where the front curtain-locking lever 289 is in contact with any one of a stopper 289A or 289B provided on the bed plate 285. Further, in a case where the front curtain-locking lever 289 is positioned at a position where the front curtain-locking lever 289 is in contact with the stopper 289A, the front curtain-locking lever 289 is in contact with the first front curtain-drive lever $286A_1$ and prevents the first front curtain-drive lever $286A_1$ from being rotationally moved in the counterclockwise direction.

Accordingly, a normally open operation for keeping the exposure aperture portion 281 in an open state can be achieved in the charge state of the focal-plane shutter 280.

On the other hand, in a case where the front curtain-locking lever 289 is positioned at a position where the front curtain-locking lever 289 is in contact with the stopper 289B, the prevention of the rotational movement of the first front curtain-drive lever $286A_1$ in the counterclockwise direction, which is performed by the front curtain-locking lever 289, is released.

Accordingly, a normally closed operation for keeping the exposure aperture portion 281 in a closed state can be achieved in the charge state of the focal-plane shutter 280.

The front curtain-locking lever 289 is driven by a front curtain-locking lever drive unit 294 (FIG. 6) to be described later, but it is preferable that the front curtain-locking lever 289 is adapted to be stably held by a click mechanism, a permanent magnet, or the like in two states where the front curtain-locking lever 289 is in contact with the stopper 289A or 289B in a case where the front curtain-locking lever 289 is driven until coming into contact with the stopper 289A or 289B.

FIG. 6 is a block diagram mainly showing an FPS drive unit, the FPS control unit 296, and the like of the focal-plane shutter 280.

The FPS drive unit of the focal-plane shutter 280 comprises a motor drive unit 290A, a charge motor 290B, a power transmission mechanism 291, a lock mechanism-drive unit 292, a lock mechanism 293, a front curtain-locking lever drive unit, electromagnet-drive units 295A and 295B, and a voltage control unit 298 in addition to the charge member 288, the front curtain-locking lever 289, the front curtain-electromagnet 288A, and the rear curtain-electromagnet 288B having been described above.

The FPS control unit 296 is a part that outputs control signals to the respective drive units of the FPS drive unit on the basis of information input from the body-side CPU 220 and a lens drive time-calculating unit 297.

In a case where the FPS control unit 296 is to cause the focal-plane shutter 280 to perform a charge operation, the FPS control unit 296 outputs a control signal, which causes the charge motor 290B to be driven in a normal direction or a reverse direction, to the motor drive unit 290A and drives the charge motor 290B through the motor drive unit 290A. The rotational driving force of the charge motor 290B is transmitted to the charge member 288 through the power transmission mechanism 291, such as a reduction gear, causes the charge member 288 to be rotationally moved against the biasing forces of the front curtain-travel spring 287A and the rear curtain-travel spring 287B, and causes the second front curtain-drive lever $286A_2$ and the second rear curtain-drive lever $286B_2$ to be moved to the charge positions.

The lock mechanism-drive unit 292 and the lock mechanism 293 are parts for fixing (locking) the second front curtain-drive lever $286A_2$ and the second rear curtain-drive lever $286B_2$, which are moved to the charge positions, at the charge position. For example, the lock mechanism 293 is engaged with the charge member 288 or the second front curtain-drive lever $286A_2$ and the second rear curtain-drive lever $286B_2$, and prevents the charge member 288 from being rotationally moved or prevents the second front curtain-drive lever $286A_2$ and the second rear curtain-drive lever $286B_2$ from being rotationally moved to lock the second front curtain-drive lever $286A_2$ and the second rear curtain-drive lever $286B_2$ that are moved to the charge positions.

The lock mechanism-drive unit 292 is a drive unit that drives the lock mechanism 293 on the basis of a control signal from the FPS control unit 296 and makes the lock mechanism 293 be in a locked state or an unlocked state, and consumes electric power only in a case where the lock mechanism-drive unit 292 drives the lock mechanism 293.

Further, the charge motor 290B and the like may be caused to function as a lock mechanism instead of an independent lock mechanism as with the lock mechanism-drive unit 292 and the lock mechanism 293. That is, the motor drive unit 290A, the charge motor 290B, the power transmission mechanism 291, and the charge member, which are in a state where constant torque is generated from the charge motor 290B so that the second front curtain-drive lever $286A_2$ and the second rear curtain-drive lever $286B_2$ are held at the charge positions, function as a lock mechanism that locks the second front curtain-drive lever $286A_2$ and the second rear curtain-drive lever $286B_2$ at the charge positions.

The front curtain-locking lever drive unit 294 and the front curtain-locking lever 289 are controlled to allow a live view image to be taken and displayed in a case where the focal-plane shutter 280 is to be caused to perform a normally open operation. That is, in a case where the focal-plane shutter 280 is to be caused to perform a normally open operation and the front curtain-locking lever 289 is positioned at an unlocked position (a position where the front curtain-locking lever 289 is in contact with the stopper 289B), the FPS control unit 296 outputs a control signal, which causes the front curtain-locking lever 289 to be moved to a locked position (a position where the front curtain-locking lever 289 is in contact with the stopper 289A), to the front curtain-locking lever drive unit 294 and causes the front curtain-locking lever 289 to be moved to the locked position by the front curtain-locking lever drive unit 294. Accordingly, even though the second front curtain-drive lever 286A$_2$ is rotationally moved in the counterclockwise direction and is moved to the charge position in a case where the focal-plane shutter 280 is to be caused to perform a charge operation, the rotational movement of the first front curtain-drive lever 286A$_1$ in the counterclockwise direction (the travel of the front curtain 283A in the closing direction) is prevented by the front curtain-locking lever 289. As a result, the exposure aperture portion 281 can be kept in a fully open state.

Further, in a case where the front curtain-locking lever 289 positioned at the locked position is to be moved to the unlocked position, the FPS control unit 296 outputs a control signal, which causes the front curtain-locking lever 289 to be moved to the unlocked position, to the front curtain-locking lever drive unit 294 and causes the front curtain-locking lever 289 to be moved to the unlocked position by the front curtain-locking lever drive unit 294. As a result, the prevention of the rotational movement of the first front curtain-drive lever 286A$_1$ in the counterclockwise direction, which is performed by the front curtain-locking lever 289, is released. Accordingly, in a case where the contact pin 286Ab of the first front curtain-drive lever 286A$_1$ is not in contact with the second front curtain-drive lever 286A$_2$ (a case where the second front curtain-drive lever 286A$_2$ is moved to the charge position), the first front curtain-drive lever 286A$_1$ is rotationally moved in the counterclockwise direction by the biasing force of the return spring and the contact pin 286Ab of the first front curtain-drive lever 286A$_1$ is in contact with the second front curtain-drive lever 286A$_2$ and is stopped. The front curtain 283A is caused to travel in the closing direction by the rotational movement operation of the first front curtain-drive lever 286A$_1$, so that the exposure aperture portion 281 can be fully closed by the front curtain 283A.

In a case where the second front curtain-drive lever 286A$_2$ and the second rear curtain-drive lever 286B$_2$ are held at the charge positions by the charge member 288, current is supplied to the front curtain-electromagnet 288A and the rear curtain-electromagnet 288B through the electromagnet-drive units 295A and 295B and the front curtain-electromagnet 288A and the rear curtain-electromagnet 288B attract the magnetic piece 136A of the second front curtain-drive lever 286A$_2$ and the magnetic piece 136B of the second rear curtain-drive lever 286B$_2$ by an electromagnetic force and hold the second front curtain-drive lever 286A$_2$ and the second rear curtain-drive lever 286B$_2$ at the charge positions.

After the second front curtain-drive lever 286A$_2$ and the second rear curtain-drive lever 286B$_2$ are held at the charge positions by the front curtain-electromagnet 288A and the rear curtain-electromagnet 288B, the holding of the second front curtain-drive lever 286A$_2$ and the second rear curtain-drive lever 286B$_2$ at the charge positions performed by the charge member 288 is released so that curtain travel preparation (first curtain travel preparation) can be performed.

That is, the first curtain travel preparation means processing for exciting the front curtain-electromagnet 288A and the rear curtain-electromagnet 288B to hold the second front curtain-drive lever 286A$_2$ and the second rear curtain-drive lever 286B$_2$ at the charge positions (to prevent the rotational movement in the first direction) and releasing the holding of the second front curtain-drive lever 286A$_2$ and the second rear curtain-drive lever 286B$_2$ at the charge positions performed by the lock mechanism 293 (the charge member 288 that can function as a lock mechanism) after the shift of the focal-plane shutter 280 to the normally open state.

Further, as described above, the FPS control unit 296 can perform curtain travel preparation (second curtain travel preparation) for releasing the prevention of the travel of the front curtain 283A in the closing direction by the movement of the front curtain-locking lever 289 to the unlocked position and causing the front curtain 283A to travel in the closing direction by the biasing force of the return spring to fully close the exposure aperture portion 281.

In a case where the first curtain travel preparation and the second curtain travel preparation end after the shift of the focal-plane shutter 280 to the normally open state, the front curtain 283A can travel in the opening direction and the rear curtain 283B can travel in the closing direction to start the exposure of a static image.

Then, in a case where the supply of current to the front curtain-electromagnet 288A is stopped (the front curtain-electromagnet 288A is demagnetized) according to a control signal from the FPS control unit 296 after the first curtain travel preparation and the second curtain travel preparation end, the second front curtain-drive lever 286A$_2$ is rotationally moved in the clockwise direction by the biasing force of the front curtain-travel spring 287A. In a case where the contact pin 286Ab of the first front curtain-drive lever 286A$_1$ is in contact with the second front curtain-drive lever 286A$_2$ at this time, the first front curtain-drive lever 286A$_1$ is rotationally moved in the clockwise direction together with the second front curtain-drive lever 286A$_2$ and causes the front curtain 283A to travel in the opening direction. Accordingly, the exposure of the static image can be started.

In a case where the supply of current to the rear curtain-electromagnet 288B is stopped (the rear curtain-electromagnet 288B is demagnetized) according to a control signal from the FPS control unit 296 when exposure time corresponding to a shutter speed has passed after the start of the exposure of the static image, the second rear curtain-drive lever 286B$_2$ is rotationally moved in the clockwise direction by the biasing force of the rear curtain-travel spring 287B and the first rear curtain-drive lever 286B$_1$ being in contact with the second rear curtain-drive lever 286B$_2$ is rotationally moved in the clockwise direction together with the second rear curtain-drive lever 286B$_2$ and causes the rear curtain 283B to travel in the closing direction. Accordingly, the exposure of the static image can be ended.

The voltage control unit 298 is a part that controls curtain-holding excitation voltage to be supplied to the front curtain-electromagnet 288A and the rear curtain-electromagnet 288B. In this example, curtain-holding excitation voltage used in the normal imaging mode where a single static image is to be taken is set to be different from curtain-holding excitation voltage used in the continuous shooting mode. The detail of the curtain-holding excitation voltage to be controlled by the voltage control unit 298 will be described later.

The body-side CPU 220 outputs mode information that represents the normal imaging mode or the continuous shooting mode, a shutter speed signal that represents a shutter speed at the time of taking of a static image in the normal imaging mode or the continuous shooting mode, a signal that represents the operation of the shutter release switch 22, and the like to the FPS control unit 296.

The lens drive time-calculating unit 297 is a part calculating a lens drive time required for the driving of the focus lens 106 on the basis of the numerical value (distance measurement information) that is calculated by the distance measuring unit 230 and required for the AF control; and outputs information, which represents the calculated lens drive time, to the FPS control unit 296. Since the moving speed of the focus lens and the moving distance of the focus lens corresponding to the distance measurement information vary depending on the type of the interchangeable lens 100, it is preferable that the lens drive time-calculating unit 297 acquires information about the interchangeable lens 100 in advance.

Further, a charge position detector (not shown) that detects the movement of the charge member 288 to a charge position and a non-charge position and a front curtain-position detector (not shown) that detects the open position and closed position (fully open position and fully closed position) of the front curtain 283A are provided, and a charge position-detection signal detected by the charge position detector and a front curtain-position detection signal detected by the front curtain-position detector are added to the FPS control unit 296.

The FPS control unit 296 is a part that outputs control signals to the respective drive units of the FPS drive unit on the basis of information input from the body-side CPU 220 and the lens drive time-calculating unit 297, a charge position-detection signal input from the charge position detector, and a front curtain-position detection signal input from the front curtain-position detector and controls the focal-plane shutter 280; and the detailed operation of the FPS control unit 296 will be described later.

[Method of Controlling Focal-Plane Shutter]

Next, a method of controlling the focal-plane shutter 280 in a case where the focal-plane shutter 280 having the above-mentioned structure is used to continuously take static images (continuous shooting) in the continuous shooting mode will be described.

First Embodiment

Figure 7:
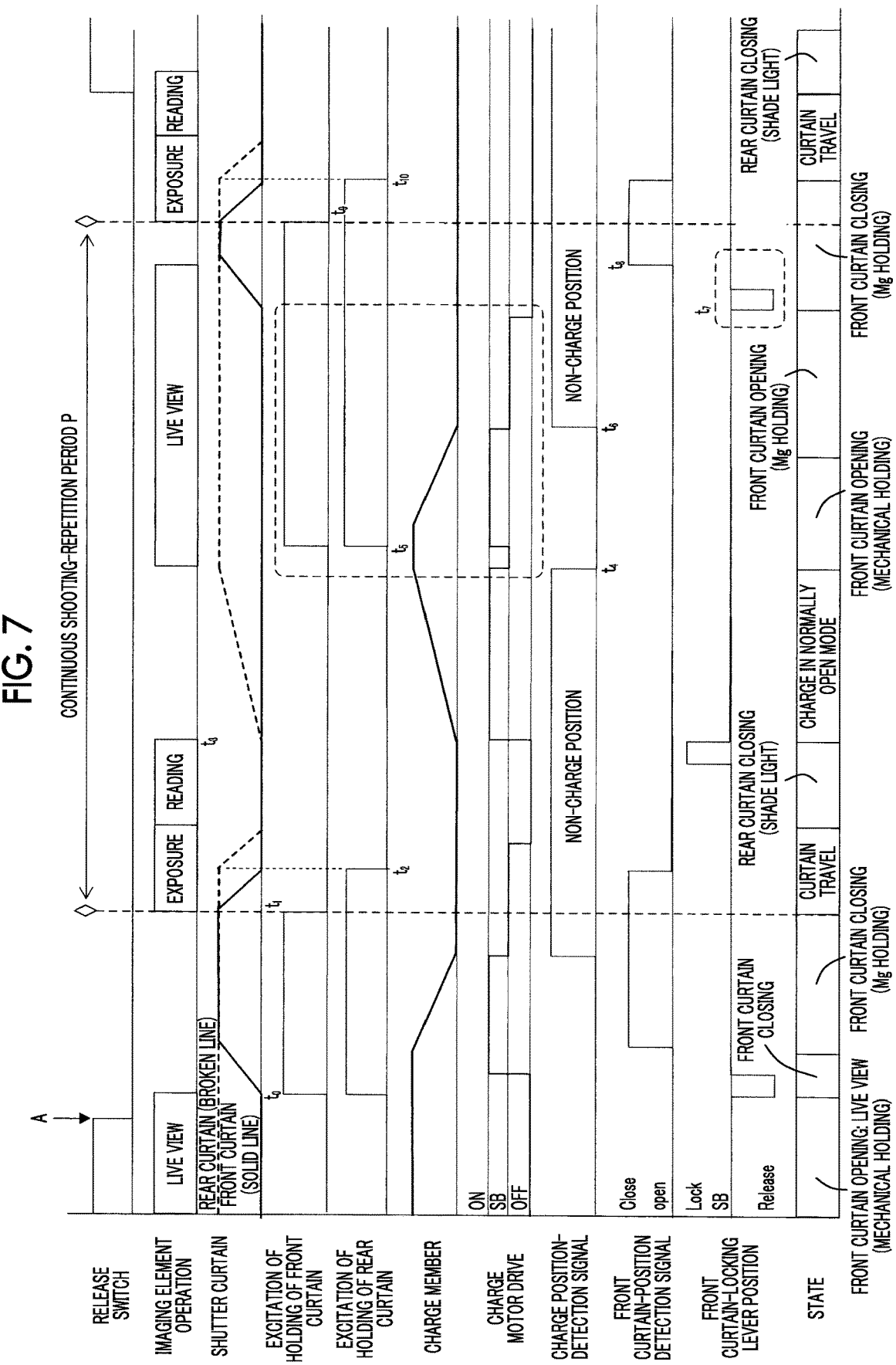
FIG. 7 is a timing chart showing a first embodiment of the invention and is a timing chart showing the operation timing of each part of the focal-plane shutter in a case where, particularly, continuous shooting is performed.

FIG. 7 is a timing chart showing a first embodiment of the invention and is a timing chart showing the operation timing of each part of the focal-plane shutter 280 in a case where, particularly, continuous shooting is performed.

[Normally Open Control]

First, the normally open control of the focal-plane shutter 280 will be described.

In a case where the power lever 25 is operated and the power supply of the imaging device 10 is turned on, the body-side CPU 220 outputs a normally normally open control signal to the FPS control unit 296 to make the focal-plane shutter 280 be in the normally open state. In a case where the open control signal is input to the FPS control unit 296 from the body-side CPU 220, the FPS control unit 296 causes the charge member 288 to be rotationally moved in the counterclockwise direction first and causes the second front curtain-drive lever 286A$_2$ and the second rear curtain-drive lever 286B$_2$ to be moved to the charge positions.

FIG. 5 shows the state (initial state) of each part of the focal-plane shutter 280 in a case where the power supply of the imaging device 10 is not yet turned on. In a case where the charge member 288 is rotationally moved from this initial state in the counterclockwise direction, the second front curtain-drive lever 286A$_2$ and the second rear curtain-drive lever 286B$_2$ are rotationally moved in the counterclockwise direction as shown in FIG. 8 and can be moved to the charge positions.

Figure 8:
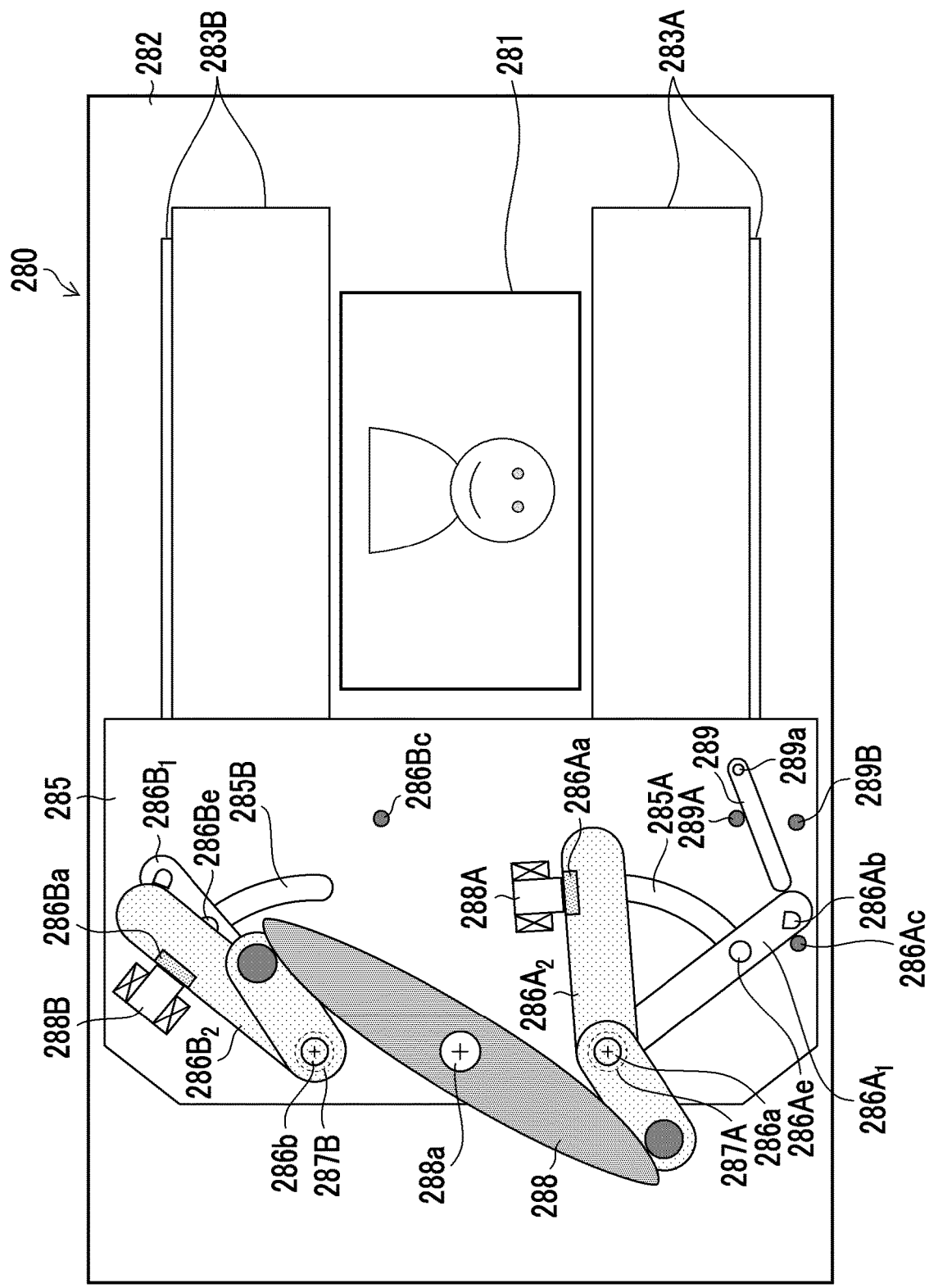
FIG. 8 is a front view of the focal-plane shutter showing the operating state of each part of the focal-plane shutter that is in a normally open state.

FIG. 8 is the normally open state where the second front curtain-drive lever 286A$_2$ and the second rear curtain-drive lever 286B$_2$ are moved to the charge positions. Since the front curtain-locking lever 289 is positioned at the locked position in the initial state shown in FIG. 5, the rotational movement of the first front curtain-drive lever 286A$_1$ in the counterclockwise direction is prevented by the front curtain-locking lever 289 even though the second front curtain-drive lever 286A$_2$ is rotationally moved in the counterclockwise direction. As a result, since the front curtain-drive arm 284A$_1$ to which the drive pin 286Ae provided on the first front curtain-drive lever 286A$_1$ is connected through the long hole 285A is held in the state of FIG. 4, the travel of the front curtain 283A in the closing direction, which causes the exposure aperture portion 281 to be fully closed, is prevented. Further, the rotational movement position of the charge member 288 shown in FIG. 8 corresponds to the charge position.

Subsequently, the FPS control unit 296 causes the lock mechanism 293 to operate through the lock mechanism-drive unit 292 to prevent the rotational movement of the charge member 288 by the lock mechanism 293. Accordingly, the second front curtain-drive lever 286A$_2$ and the second rear curtain-drive lever 286B$_2$, which are moved to the charge positions, are held at the charge positions. It is preferable that the lock mechanism 293 preventing the rotational movement of the charge member 288 is mechanically locked during a locking period without requiring a driving force (electric power) from the lock mechanism-drive unit 292.

The exposure aperture portion 281 is kept in the open state in the charge state as shown in FIG. 8 by the normally open control in this way, so that the focal-plane shutter 280 is made to be in the normally open state. The body-side CPU 220 performs control to take a live view image by the imaging element 201 and performs control to cause the monitor 216 to display the taken live view image in a case where the focal-plane shutter 280 is in the normally open state.

Composition and the like are determined depending on the live view image. In a case where the shutter release switch 22 is fully pressed (an instruction to start a continuous shooting operation is input), the body-side CPU 220 causes the imaging element control unit 202 and the FPS control unit 296 to perform exposure control that is required to take a static image in the continuous shooting mode.

The FPS control unit 296 performs the exposure preparation (first curtain travel preparation and second curtain travel preparation) of the focal-plane shutter 280 in a case where an instruction to start the continuous shooting operation is input at the point of time of an arrow A shown in FIG. 7.

In a case where the first static image in the continuous shooting mode is to be taken, the FPS control unit 296 performs the first curtain travel preparation to be described below. First, the front curtain-electromagnet 288A and the rear curtain-electromagnet 288B are excited (the supply of current is started from time to of FIG. 7), the front curtain-electromagnet 288A and the rear curtain-electromagnet 288B attract the magnetic piece 136A of the second front curtain-drive lever 286A$_2$ and the magnetic piece 136B of the second rear curtain-drive lever 286B$_2$ by an electromagnetic force, and the second front curtain-drive lever 286A$_2$ and the second rear curtain-drive lever 286B$_2$ are held at the charge positions. Subsequently, the charge motor 290B is driven, and locking performed by the lock mechanism 293 is released to cause the charge member 288 to be rotationally moved in the clockwise direction and to retreat from the second front curtain-drive lever 286A$_2$ and the second rear curtain-drive lever 286B$_2$. Accordingly, the mechanical holding of the second front curtain-drive lever 286A$_2$ and the second rear curtain-drive lever 286B$_2$ positioned at the charge positions is released and is switched to holding using a magnetic force (Mg holding). The rotational movement position of the charge member 288 shown in FIG. 9 corresponds to the non-charge position.

Further, in a case where the first static image in the continuous shooting mode is to be taken, the FPS control unit 296 performs the second curtain travel preparation to be described below simultaneously with the start of the first curtain travel preparation in this example.

Figure 9:
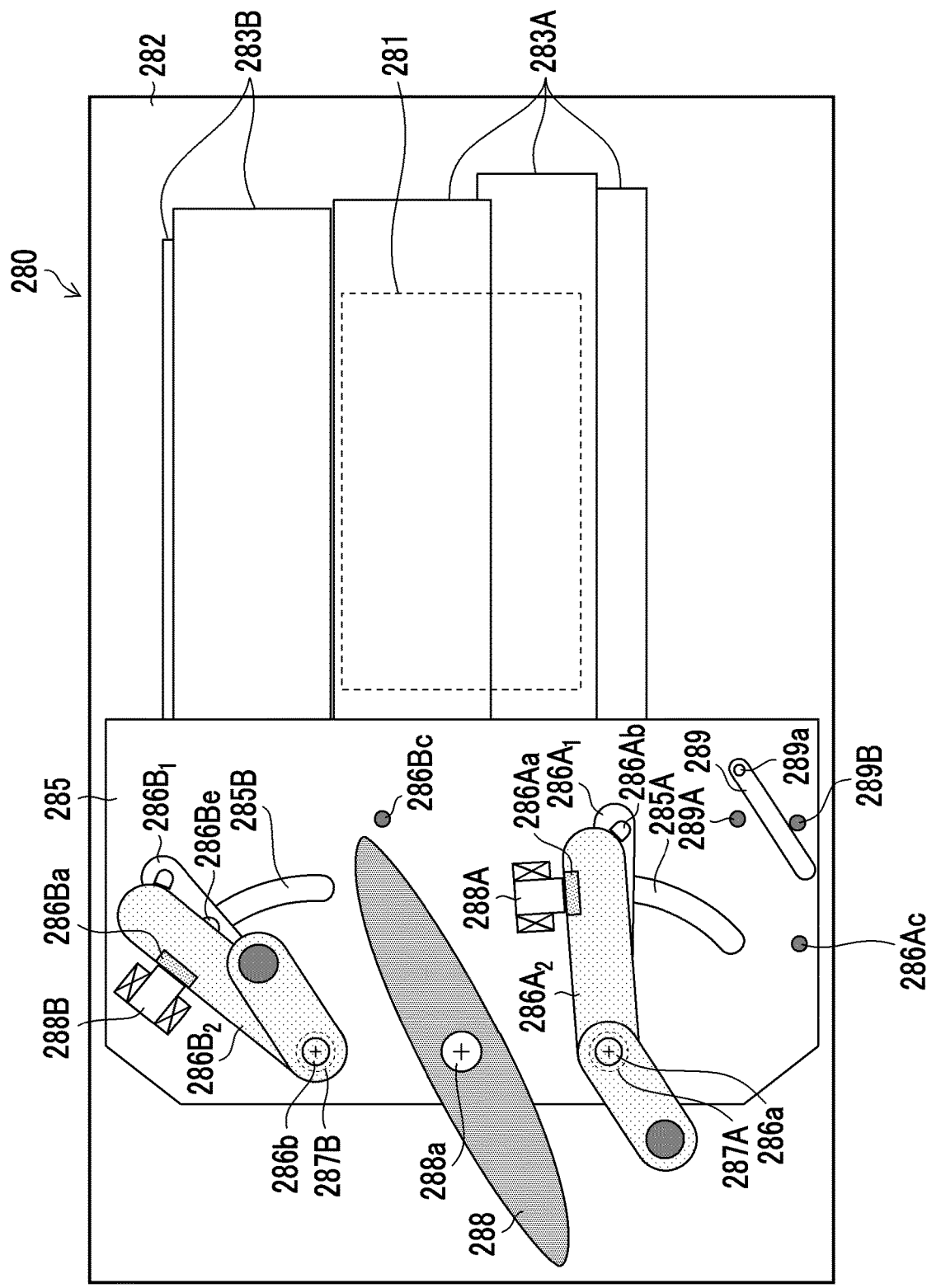
FIG. 9 is a front view of the focal-plane shutter showing a state where first curtain travel preparation and second curtain travel preparation of the focal-plane shutter have ended.

The FPS control unit 296 causes the front curtain-locking lever 289, which is positioned at the locked position, to be moved to the unlocked position to release the prevention of the rotational movement of the first front curtain-drive lever 286A$_1$ in the counterclockwise direction that is performed by the front curtain-locking lever 289 (the release of the holding of the front curtain) (see FIGS. 8 and 9).

In a case where the release of the holding of the front curtain is performed, the first front curtain-drive lever 286A$_1$ is rotationally moved in the counterclockwise direction by the biasing force of the return spring. As a result, since the front curtain-drive arm 284A$_1$ to which the drive pin 286Ae provided on the first front curtain-drive lever 286A$_1$ is connected through the long hole 285A is rotationally moved in the counterclockwise direction, the front curtain 283A travels in the closing direction and fully closes the exposure aperture portion 281 (FIG. 9).

The FPS control unit 296 drives the charge motor 290B to release the mechanical holding after the magnetic holding of the second front curtain-drive lever 286A$_2$ and the second rear curtain-drive lever 286B$_2$ performed by the front curtain-electromagnet 288A and the rear curtain-electromagnet 288B. However, in a case where a charge position-detection signal (a signal representing the movement of the charge member 288 to the non-charge position) is input to the FPS control unit 296 from the charge position detector, the FPS control unit 296 puts a brake (a short brake (SB) causing the coil of the motor to short-circuit) on the charge motor 290B. Further, the FPS control unit 296 can confirm the end of the second curtain travel preparation (the fully closed state of the front curtain 283A) according to a front curtain-position detection signal that is input from the front curtain-position detector.

FIG. 9 shows a state where the first curtain travel preparation and the second curtain travel preparation of the focal-plane shutter 280 have ended.

In a case where the first curtain travel preparation and the second curtain travel preparation end, the second front curtain-drive lever 286A$_2$ or the second rear curtain-drive lever 286B$_2$ can be rotationally moved in the clockwise direction by the biasing force of the front curtain-travel spring 287A or the rear curtain-travel spring 287B at a timing when the front curtain-electromagnet 288A or the rear curtain-electromagnet 288B is demagnetized.

[Travel of Front Curtain]

In a case where the first curtain travel preparation and the second curtain travel preparation end, the FPS control unit 296 demagnetizes the front curtain-electromagnet 288A (time t$_1$ of FIG. 7) and causes the second front curtain-drive lever 286A$_2$ to be rotationally moved in the clockwise direction by the biasing force of the front curtain-travel spring 287A. The first front curtain-drive lever 286A$_1$ of which the contact pin 286Ab is in contact with the second front curtain-drive lever 286A$_2$ is rotationally moved in the clockwise direction together with the second front curtain-drive lever 286A$_2$, and causes the front curtain 283A to travel in the opening direction (the travel of the front curtain) to open the exposure aperture portion 281.

Accordingly, exposure required to take a static image is started. It goes without saying that electric charges accumulated in the imaging element 201 before the start of exposure are discharged.

Figure 10:
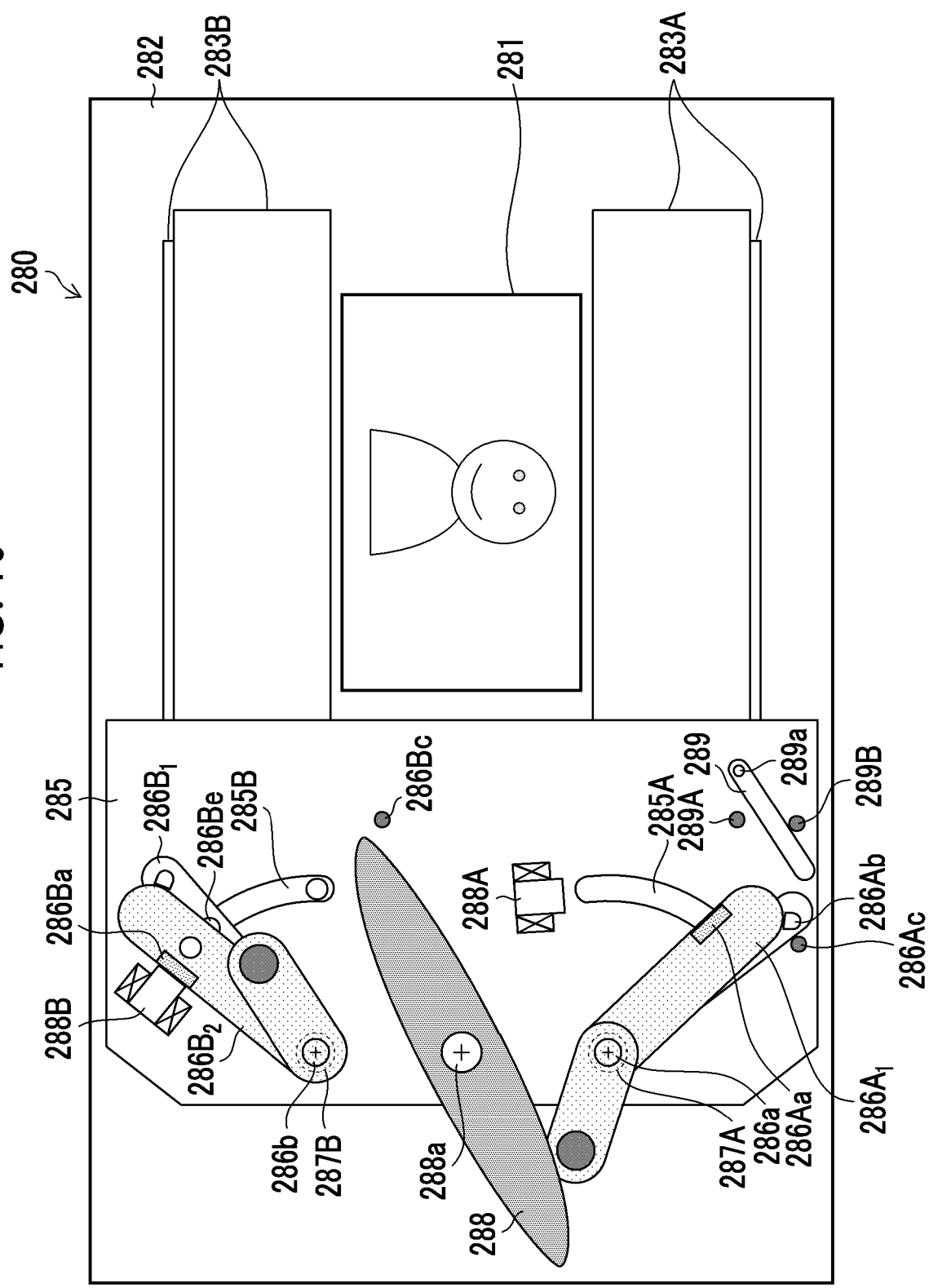
FIG. 10 is a front view of the focal-plane shutter showing a state where the travel of a front curtain in an opening direction has ended and an exposure aperture portion is fully opened.

FIG. 10 shows a state where the travel of the front curtain 283A in the opening direction has ended and the exposure aperture portion 281 is fully opened.

[Travel of Rear Curtain]

When predetermined exposure time (a shutter speed instructed from the body-side CPU 220) has passed after the travel of the front curtain 283A in the opening direction is started due to the demagnetization of the front curtain-electromagnet 288A, the FPS control unit 296 demagnetizes the rear curtain-electromagnet 288B (time t2 of FIG. 7) and causes the second rear curtain-drive lever 286B$_2$ to be rotationally moved in the clockwise direction by the biasing force of the rear curtain-travel spring 287B. The first rear curtain-drive lever 286B$_1$ of which the contact pin 286Bb is in contact with the second rear curtain-drive lever 286B$_2$ is rotationally moved in the clockwise direction together with the second rear curtain-drive lever 286B$_2$, and causes the rear curtain 283B to travel in the closing direction (the travel of the rear curtain) to close the exposure aperture portion 281. Accordingly, the exposure required to take the static image ends.

Figure 11:
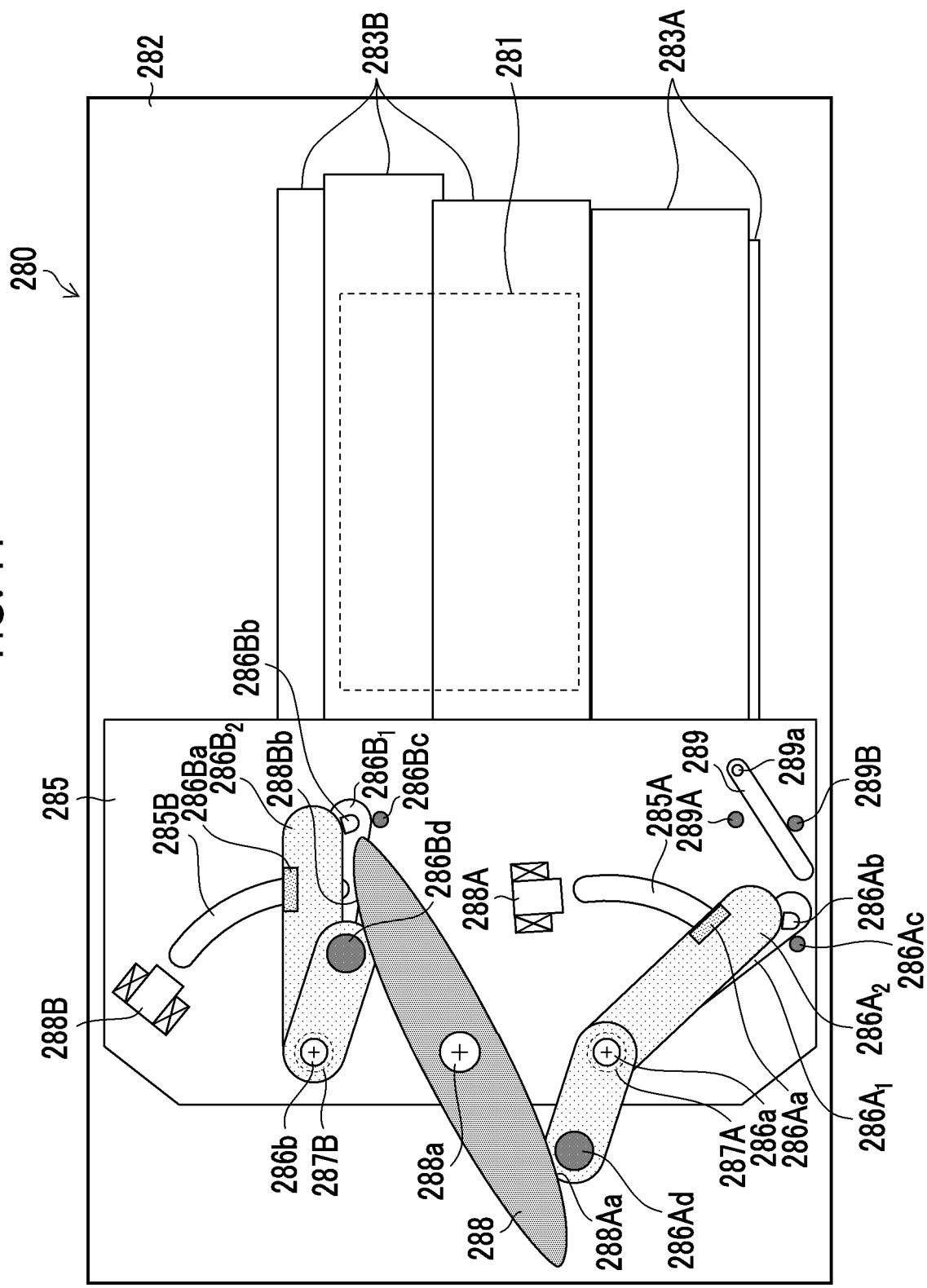
FIG. 11 is a front view of the focal-plane shutter showing a state where the travel of a rear curtain in a closing direction has ended and the exposure aperture portion is fully closed.

FIG. 11 shows a state where the travel of the rear curtain 283B in the closing direction has ended and the exposure aperture portion 281 is fully closed.

In a period where the travel of the rear curtain 283B in the closing direction has ended and the exposure aperture portion 281 has been fully closed in FIG. 7, the body-side CPU 220 reads signals (image signals) corresponding to the electric charges, which are accumulated in the imaging element 201, by the imaging element control unit 202.

Then, after reading the image signals representing a static image, the body-side CPU 220 makes the focal-plane shutter 280 be in the normally open state to prepare the taking of the next static image (each of second and later static images in continuous shooting).

Figure 12:
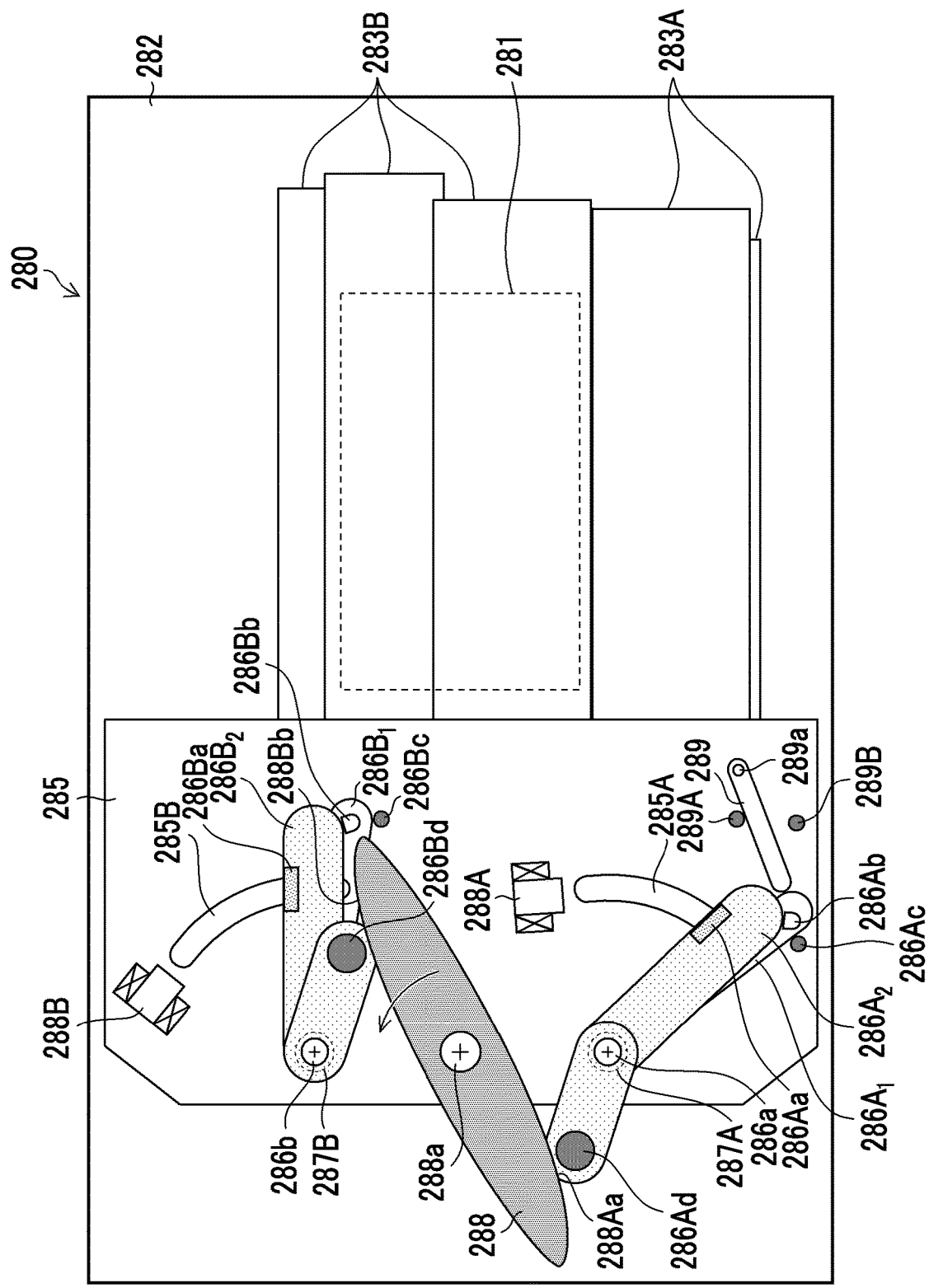
FIG. 12 is a front view of the focal-plane shutter showing a state where a front curtain-locking lever is moved to a locked position from the state shown in FIG. 11 and charge is not yet performed by a charge member.

That is, the FPS control unit 296 causes the front curtain-locking lever 289, which is positioned at the unlocked position shown in FIG. 11, to be moved to the locked position as shown in FIG. 12 (FIG. 7), drives the charge motor 290B after the end of the reading of the image signals (time t3 of FIG. 7), and causes the charge member 288 to be rotationally moved in the counterclockwise direction. In a case where a charge position-detection signal (a signal representing the movement of the charge member 288 to the charge position) is input to the FPS control unit 296 from the charge position detector (time t$_4$ of FIG. 7), the FPS control unit 296 puts a short brake on the charge motor 290B.

Accordingly, the focal-plane shutter 280 is shifted to the normally open state as shown in FIG. 8.

Subsequently, the first curtain travel preparation is started. That is, the front curtain-electromagnet 288A and the rear curtain-electromagnet 288B are excited (the supply of current is started from time t$_5$ of FIG. 7), the second front curtain-drive lever 286A$_2$ and the second rear curtain-drive lever 286B$_2$ are held at the charge positions (electromagnetic holding), the charge motor 290B is driven, and locking performed by the lock mechanism 293 is released to cause the charge member 288 to be rotationally moved in the clockwise direction and to retreat from the second front curtain-drive lever 286A$_2$ and the second rear curtain-drive lever 286B$_2$.

In a case where a charge position-detection signal (a signal representing the movement of the charge member 288 to the non-charge position) is input to the FPS control unit 296 from the charge position detector (time t6 of FIG. 7), the FPS control unit 296 stops the driving of the charge motor 290B after putting a short brake on the charge motor 290B.

Next, the FPS control unit 296 performs the second curtain travel preparation from a point of time (in this example, time t$_7$ of FIG. 7) later than the point of time when the first curtain travel preparation is to be started (in this example, time t$_5$ of FIG. 7). That is, the FPS control unit 296 causes the front curtain-locking lever 289 to be moved to the unlocked position at the time t$_7$ of FIG. 7 to release the prevention of the rotational movement of the first front curtain-drive lever 286A$_1$ in the counterclockwise direction that is performed by the front curtain-locking lever 289 (to release the holding of the front curtain). In a case where the release of the holding of the front curtain is performed, the first front curtain-drive lever 286A$_1$ is rotationally moved in the counterclockwise direction by the biasing force of the return spring and the front curtain 283A travels in the closing direction and fully closes the exposure aperture portion 281. The FPS control unit 296 can confirm the end of the second curtain travel preparation (the fully closed state of the front curtain 283A) at a time t$_8$ of FIG. 7 according to a front curtain-position detection signal that is input from the front curtain-position detector.

Then, the FPS control unit 296 demagnetizes the front curtain-electromagnet 288A at a time t$_9$ (FIG. 7) that is an imaging timing when the exposure control of the second static image during continuous shooting is to be started, causes the front curtain 283A to travel in the opening direction (the travel of the front curtain) to open the exposure aperture portion 281, demagnetizes the rear curtain-electromagnet 288B when predetermined exposure time has passed after the travel of the front curtain 283A in the opening direction is started (time t$_{10}$ of FIG. 7), and causes the rear curtain 283B to travel in the closing direction (the travel of the rear curtain) to close the exposure aperture portion 281. Accordingly, the exposure required to take the second static image during continuous shooting ends.

Here, a time between the time t$_7$ of FIG. 7 when the second curtain travel preparation is to be started and the time t$_8$ when the full closure of the front curtain 283A is detected is a time until the full closure of the front curtain 283A from the release of the holding of the front curtain performed by the front curtain-locking lever 289, and a time between the time t$_8$ and the imaging timing (time t$_9$) is a waiting time for stabilization having passed until the stop of vibration that is generated in a case where the first front curtain-drive lever 286A$_1$ causing the front curtain 283A to travel in the closing direction collides with the electromagnetically held second front curtain-drive lever 286A$_2$.

That is, a time required for the second curtain travel preparation is the sum of a time until the full closure of the front curtain from the release of the locking of the front curtain and the waiting time for stabilization.

In the first embodiment shown in FIG. 7, the second curtain travel preparation is started at the time t$_7$ (the time t$_7$ ahead of the imaging timing (time t$_9$) by a time required for the second curtain travel preparation) that is the point of time later than the point of time when the first curtain travel preparation is to be started (time t$_5$ of FIG. 7).

Accordingly, the imaging device 10 reads image signals for the display of a live view image from the imaging element 201 in a period (hereinafter, referred to as a "live view operation period") until the point of time (time t$_8$) when the front curtain 283A is fully closed and the exposure aperture portion 281 is closed from the point of time (time t$_4$) when the focal-plane shutter 280 is shifted to the normally open state as shown in FIG. 7 and the exposure aperture portion 281 is opened; and can cause the monitor 216 to display a live view image on the basis of the read image signals.

Particularly, in a case where the point of time when the second curtain travel preparation is to be started is delayed as much as possible (preferably, the point of time when the second curtain travel preparation is to be started is set to a point of time ahead of the next imaging timing in continuous shooting by a time required for the second curtain travel preparation), the live view operation period is lengthened. Accordingly, a blackout period where a live view image cannot be displayed during continuous shooting is shortened.

Incidentally, since the charge motor 290B needs to be driven and the charge member 288 needs to be moved to the non-charge position from the charge position in the first curtain travel preparation, a time required for the first curtain travel preparation is longer than a time required for the second curtain travel preparation and a time equal to or longer than a time required to take one frame of a live view image is required as the time required for the first curtain travel preparation.

Accordingly, in a case where the first curtain travel preparation and the second curtain travel preparation are simultaneously started, the blackout of a live view image occurs for a time that is equal to or longer than a time required for the first curtain travel preparation.

In the continuous shooting mode, the taking of a static image is repeated at a set continuous shooting speed (a continuous shooting-repetition period P between the time t$_1$ and the time t$_9$ shown in FIG. 7) while the shutter release switch 22 is fully pressed. Further, the continuous shooting-repetition period P during continuous shooting is not necessarily limited to a fixed period, and the continuous shooting-repetition period P is also lengthened in a case where the time of AF control is lengthened or an exposure time is lengthened as described later.

Second Embodiment

Figure 13:
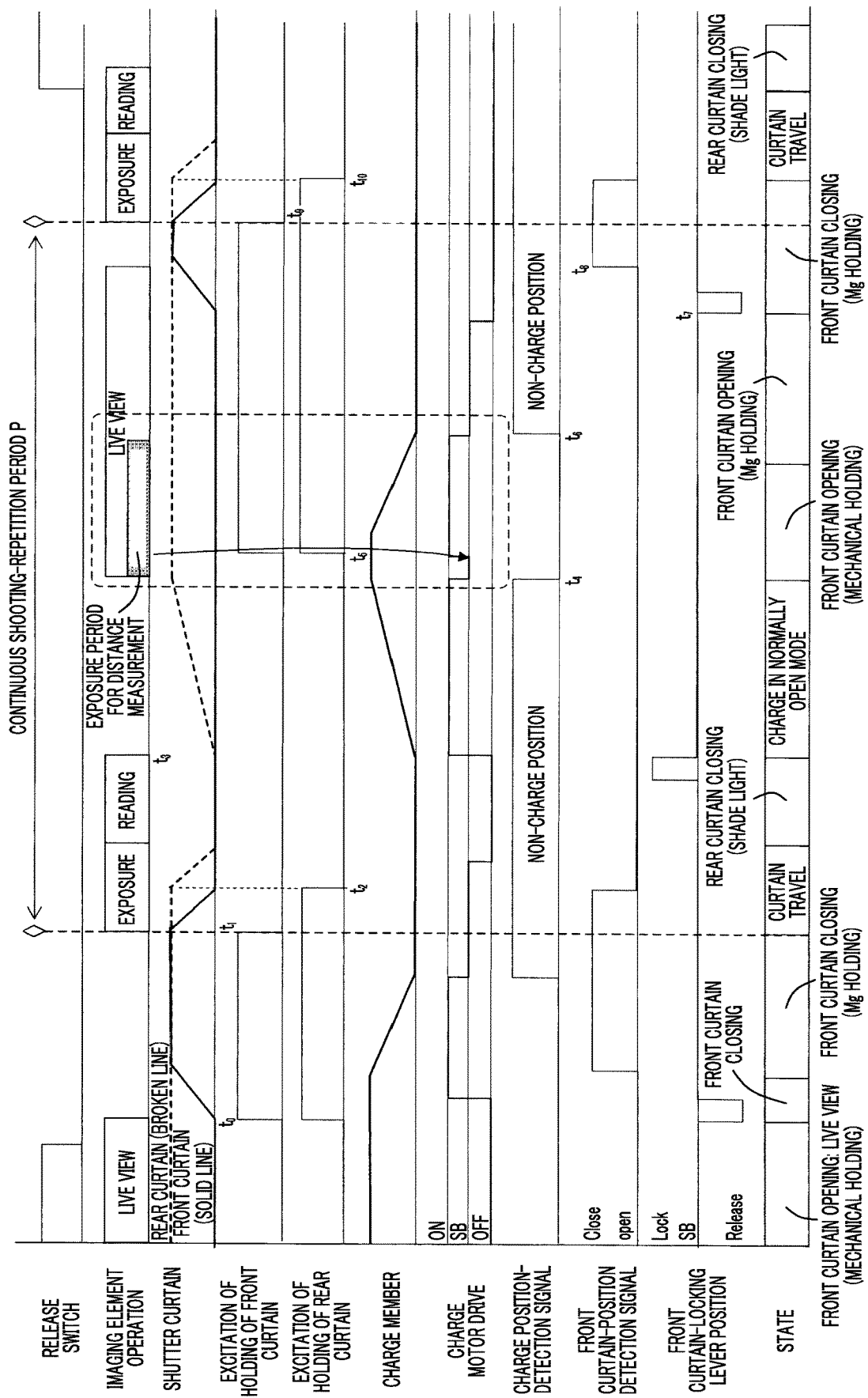
FIG. 13 is a timing chart showing a second embodiment of the invention.

FIG. 13 is a timing chart showing a second embodiment of the invention. The description of portions of FIG. 13 common to the first embodiment shown in FIG. 7 will be omitted.

In the second embodiment shown in FIG. 13, image signals for the display of a live view image, which are read from the imaging element 201 in the continuous shooting-repetition period P, include image signals for distance measurement.

In the second embodiment shown in FIG. 13, the exposure period of image signals for distance measurement of one or a plurality of frames is set as the exposure period of image signals for distance measurement (the exposure period for distance measurement) in the live view operation period, and the exposure period for distance measurement is started together with the start of the live view operation period.

The distance measuring unit 230 shown in FIGS. 3 and 7 acquires image signals for distance measurement, which are exposed in the exposure period for distance measurement, from the imaging element 201, and calculates distance measurement information on the basis of the acquired image signals for distance measurement. The distance measurement information, which is calculated by the distance measuring unit 230, is output to the body-side CPU 220, and the body-side CPU 220 causes the focus lens 106 to a focusing position on the basis of the input distance measurement information.

Further, in the second embodiment, the FPS control unit 296 performs the first curtain travel preparation in the exposure period for distance measurement (during the exposure of the image signals for distance measurement).

Accordingly, the first curtain travel preparation is early completed and a continuous shooting speed is improved. The first curtain travel preparation does not necessarily need to be completed during the exposure of the image signals for distance measurement, and a part of the exposure period of the image signals for distance measurement and a part of the operation period of the first curtain travel preparation may overlap with each other.

Third Embodiment

Figure 14:
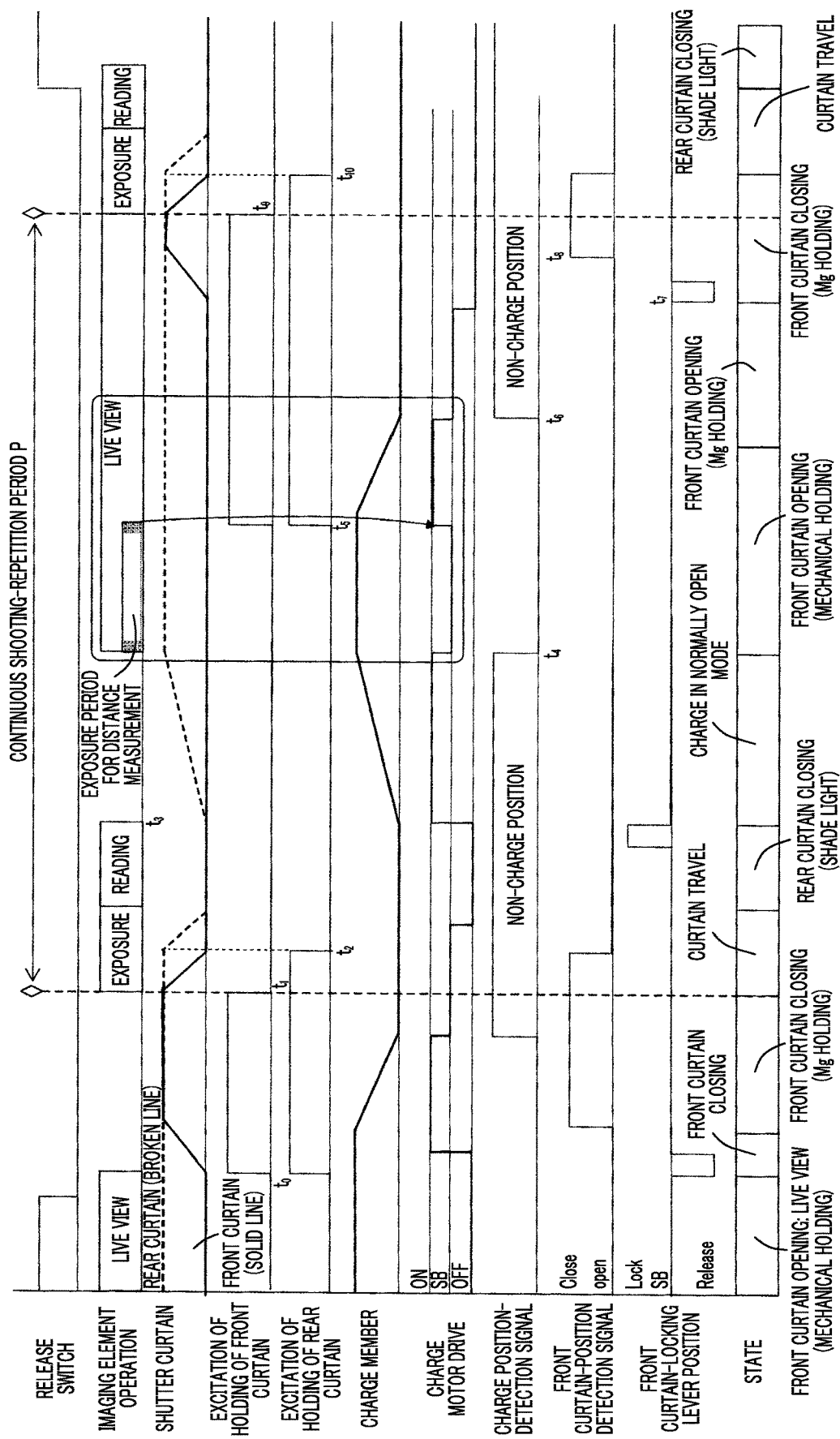
FIG. 14 is a timing chart showing a third embodiment of the invention.

FIG. 14 is a timing chart showing a third embodiment of the invention. The description of portions of FIG. 14 common to the second embodiment shown in FIG. 13 will be omitted.

The third embodiment shown in FIG. 14 is different from the second embodiment in terms of a timing when the first curtain travel preparation is to be started.

The body-side CPU 220 starts the exposure period for distance measurement together with the start of the live view operation period in the continuous shooting-repetition period P, but the FPS control unit 296 performs the first curtain travel preparation after the end of the exposure period for distance measurement (after the completion of the exposure of the image signals for distance measurement).

That is, after the exposure period for distance measurement ends, the FPS control unit 296 excites the front curtain-electromagnet 288A and the rear curtain-electromagnet 288B and drives the charge motor 290B to cause the charge member 288 to be moved to the non-charge position from the charge position.

In a case where the first curtain travel preparation is performed in the exposure period for distance measurement, vibration caused by the operation of the charge motor 290B is generated and the image signals for distance measurement deteriorate due to this vibration. For this reason, there is a concern that distance measurement accuracy may not be ensured. However, according to the third embodiment of the invention, since the first curtain travel preparation is performed after the exposure period for distance measurement, vibration is not generated during the exposure period for distance measurement. Accordingly, distance measurement accuracy can be ensured.

Fourth Embodiment

Figure 15:
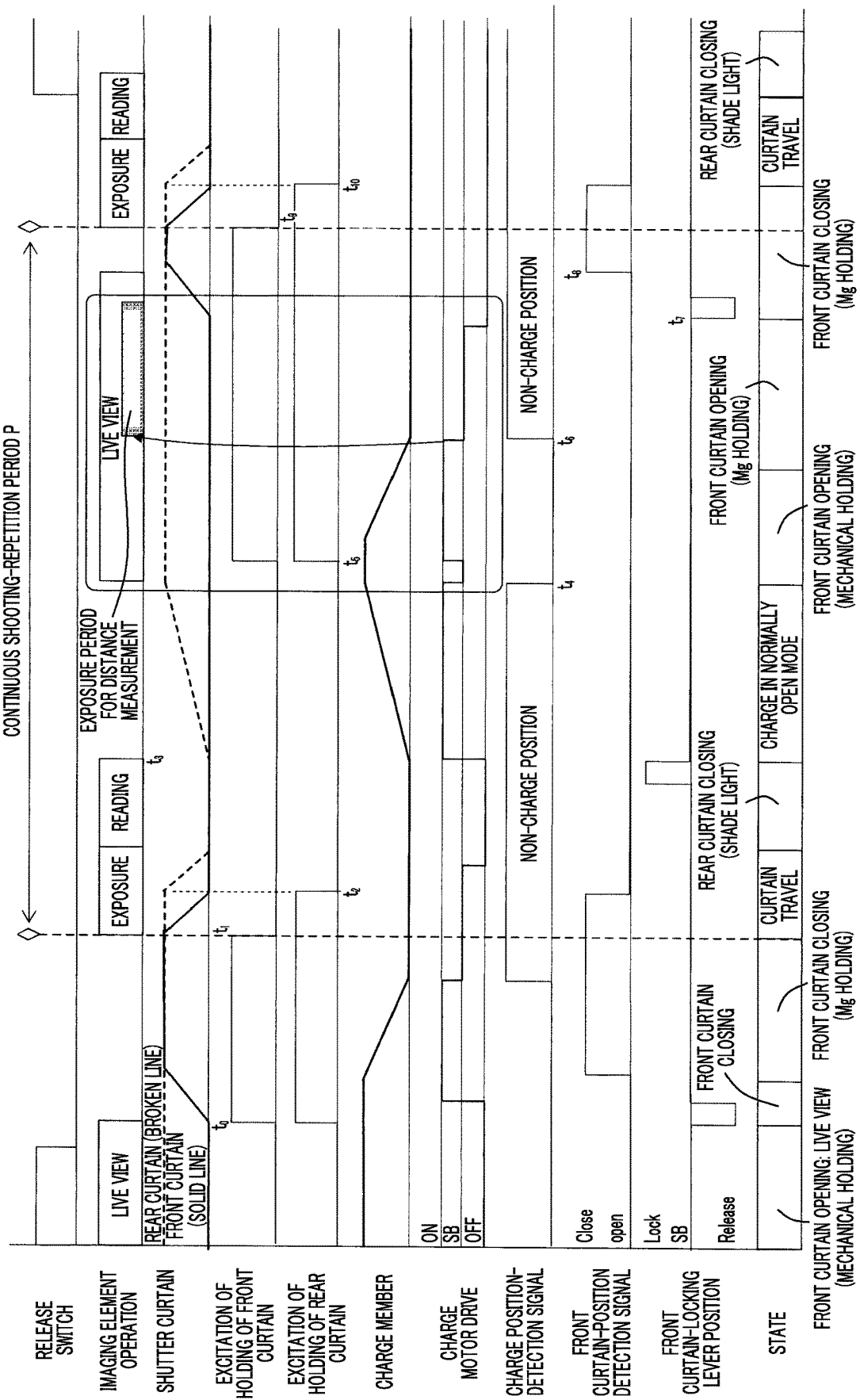
FIG. 15 is a timing chart showing a fourth embodiment of the invention.

FIG. 15 is a timing chart showing a fourth embodiment of the invention. The description of portions of FIG. 15 common to the second embodiment shown in FIG. 13 will be omitted.

The fourth embodiment shown in FIG. 15 is different from the second embodiment in terms of a timing when the exposure period for distance measurement in the live view operation period is to be started.

The FPS control unit 296 performs the first curtain travel preparation in a case where the focal-plane shutter 280 is shifted to the normally open state and the live view operation period is started in the continuous shooting-repetition period P. That is, the FPS control unit 296 excites the front curtain-electromagnet 288A and the rear curtain-electromagnet 288B and drives the charge motor 290B to cause the charge member 288 to be moved to the non-charge position from the charge position.

In a case where a charge position-detection signal representing the non-charge position is input to the body-side CPU 220 from the charge position detector (the first curtain travel preparation is completed), the body-side CPU 220 starts the exposure period for distance measurement and the distance measuring unit 230 calculates distance measurement information on the basis of the image signals for distance measurement that are acquired in the exposure period for distance measurement.

According to the fourth embodiment, a time until a point of time when the exposure of a static image is to be started from a point of time when the distance measurement information is acquired can be shortened. Accordingly, since the movement of a subject from a focusing position can be reduced, a focusing state can be maintained.

Further, since the image signals for distance measurement are acquired from the imaging element after the completion of the first curtain travel preparation, vibration is not generated during the exposure of the image signals for distance measurement as in the third embodiment. Accordingly, distance measurement accuracy can be ensured.

Fifth Embodiment

Figure 16:
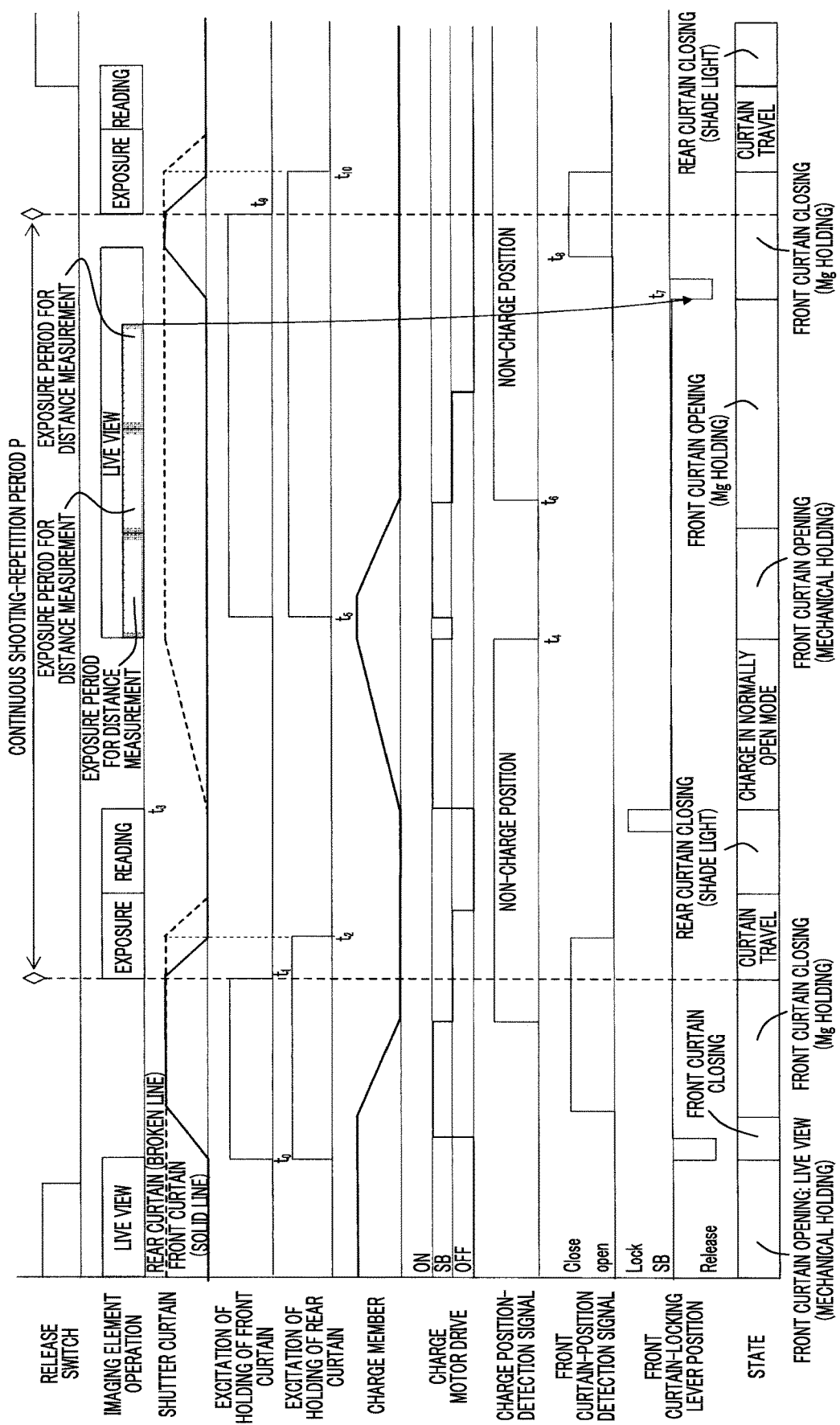
FIG. 16 is a timing chart showing a fifth embodiment of the invention.

FIG. 16 is a timing chart showing a fifth embodiment of the invention. The description of portions of FIG. 16 common to the second embodiment shown in FIG. 13 will be omitted.

The fifth embodiment shown in FIG. 16 is different from the second embodiment in terms of a method of acquiring the image signals for distance measurement to be acquired in the exposure period for distance measurement in the live view operation period.

The FPS control unit 296 performs the first curtain travel preparation in a case where the focal-plane shutter 280 is shifted to the normally open state and the live view operation period is started in the continuous shooting-repetition period P. The body-side CPU 220 starts the exposure period for distance measurement simultaneously with the start of the live view operation period in the continuous shooting-repetition period P, and the distance measuring unit 230 calculates distance measurement information on the basis of the image signals for distance measurement that are acquired in the exposure period for distance measurement. Processing having been performed this far is common to the second embodiment shown in FIG. 13.

The distance measuring unit 230 calculates distance measurement information on the basis of the image signals for distance measurement of the first frame that are acquired in the exposure period for distance measurement. The distance measuring unit 230 determines whether or not the calculated distance measurement information exceeds a reliability-determination value, and calculates distance measurement information on the basis of the image signals for distance measurement of the second frame, which are acquired in the next exposure period for distance measurement, in a case where the calculated distance measurement information does not exceed the reliability-determination value.

The distance measuring unit 230 acquires image signals for distance measurement of one or a plurality of frames in a time-series order until distance measurement information exceeding the reliability-determination value is acquired, and calculates distance measurement information. In a case where the distance measuring unit 230 calculates distance measurement information corresponding to phase-difference AF, the distance measuring unit 230 determines whether or not the peak value of a cross-correlation of a plurality of pairs of pixel values, which are obtained from phase difference-detection pixels of an AF area, exceeds a threshold value (reliability-determination value). In a case where the distance measuring unit 230 calculates distance measurement information corresponding to contrast AF, the distance measuring unit 230 can determine whether or not the contrast of an image of the AF area (focus evaluation value) exceeds the threshold value (reliability-determination value).

In a case where the distance measuring unit 230 acquires distance measurement information exceeding the reliability-determination value, the FPS control unit 296 starts the second curtain travel preparation. That is, the FPS control unit 296 causes the front curtain-locking lever 289 to be moved to the unlocked position to release the prevention of the rotational movement of the first front curtain-drive lever 286A₁ in the counterclockwise direction that is performed by the front curtain-locking lever 289 (to release the holding of the front curtain), and causes the front curtain 283A to travel in the closing direction.

Although not clearly shown in FIG. 16, the image signals for distance measurement of the first frame are read and subjected to distance-measuring calculation in the exposure period of the image signals for distance measurement of the second frame. Accordingly, in the example shown in FIG. 16, it is determined that the distance measurement information calculated on the basis of the image signals for distance measurement of the second frame exceeds the reliability-determination value, and the release of the holding of the front curtain is performed after the exposure period for distance measurement of the image signals for distance measurement of the third frame.

According to the fifth embodiment, additional distance measurement is performed in a case where the distance measurement information calculated on the basis of the image signals for distance measurement does not exceed the reliability-determination value. Accordingly, it is possible to perform continuous shooting while ensuring distance measurement accuracy.

In a case where all distance measurement information calculated on the basis of the image signals for distance measurement of a plurality of frames does not exceed the reliability-determination value, the continuous shooting-repetition period P is unexpectedly lengthened or continuous shooting is interrupted. To solve this problem, the number of frames of which the image signals for distance measurement are to be acquired may be limited, and, in a case where distance measurement information exceeding the reliability-determination value cannot be acquired within the limited number of frames, the next imaging may be performed (priority may be given to the taking of a static image) or a determination threshold value of the reliability-determination value may be changed even though distance measurement information does not exceed the reliability-determination value.

Sixth Embodiment

Figure 17:
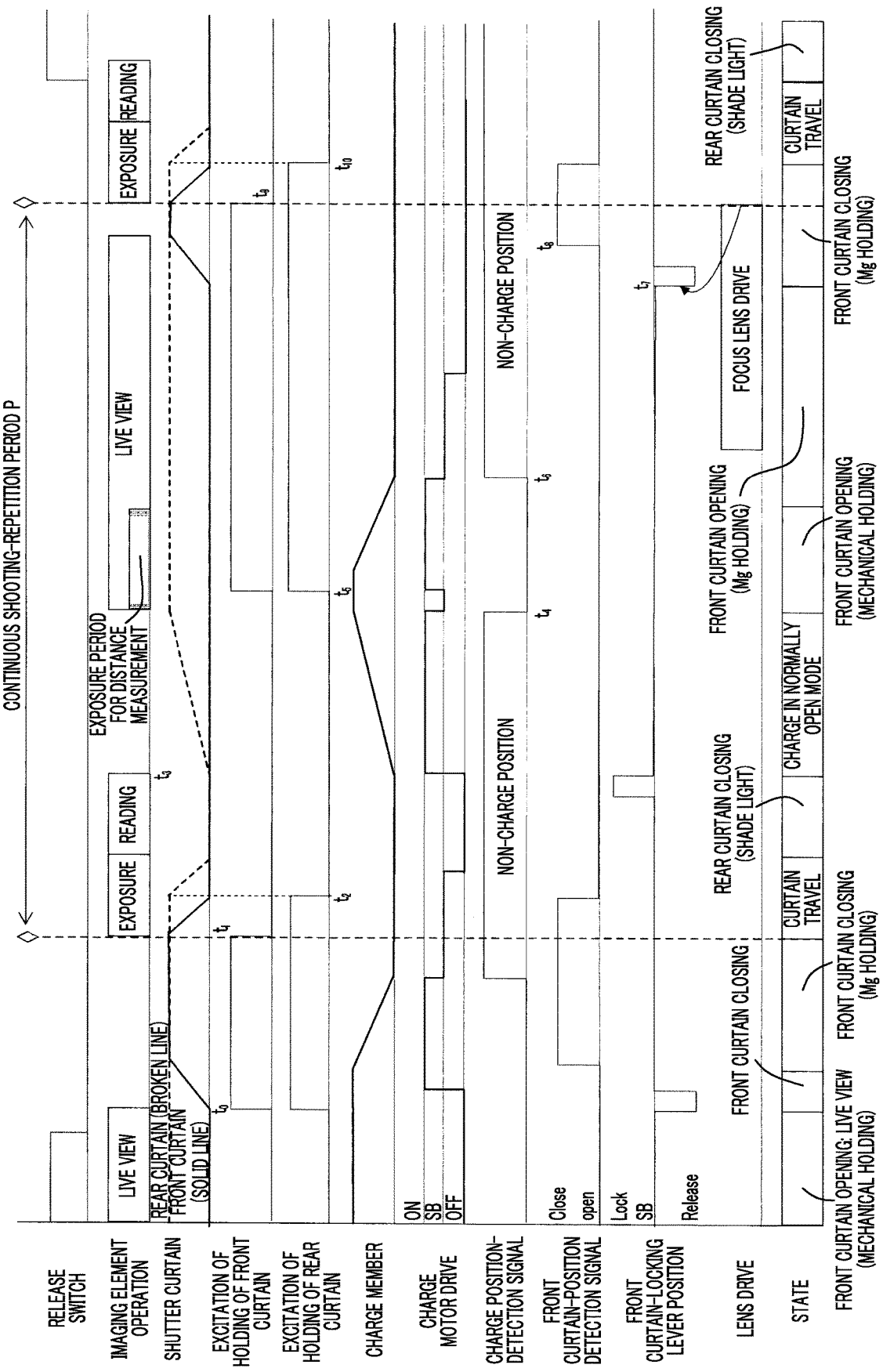
FIG. 17 is a timing chart showing a sixth embodiment of the invention.

FIG. 17 is a timing chart showing a sixth embodiment of the invention. The description of portions of FIG. 17 common to the second embodiment shown in FIG. 13 will be omitted.

The sixth embodiment shown in FIG. 17 is different from the second embodiment in that the control of the focal-plane shutter 280 is performed in consideration of continuous shooting.

The distance measuring unit 230 shown in FIGS. 3 and 7 acquires image signals for distance measurement, which are exposed in the exposure period for distance measurement, from the imaging element 201, and calculates distance measurement information on the basis of the acquired image signals for distance measurement. The distance measurement information, which is calculated by the distance measuring unit 230, is output to the body-side CPU 220, and the body-side CPU 220 causes the focus lens 106 to a focusing position on the basis of the input distance measurement information.

The lens drive time-calculating unit 297 shown in FIG. 6 calculates a lens drive time required for the driving of the focus lens 106 on the basis of the distance measurement information that is calculated by the distance measuring unit 230. For example, in the case of phase-difference AF, the distance measuring unit 230 calculates a distance (defocus distance) between the focus position of the imaging optical system 102 and the imaging surface of the imaging element 201, but the lens drive time-calculating unit 297 can calculate the lens moving distance of the focus lens 106, which is required to reduce the defocus distance to zero, from the defocus distance calculated by the distance measuring unit 230 and can calculates (estimate) a lens drive time required for the driving of the focus lens 106 on the basis of the calculated lens moving distance. Generally, the lens drive time is lengthened in proportion to the lens moving distance. Since the moving speed of the focus lens varies depending on the type of the interchangeable lens 100, it is preferable that the lens drive time-calculating unit 297 acquires information about the interchangeable lens 100 in advance.

The driving of the focus lens 106 can be started from a point of time when the distance measurement information is calculated by the distance measuring unit 230, and is stopped after a lapse of the lens drive time calculated by the lens drive time-calculating unit 297. Then, in a case where the focus lens 106 is stopped (AF control is completed) after a lapse of the lens drive time, the exposure required to take the next static image in continuous shooting can be performed.

That is, even though continuous shooting in which AF control based on the distance measurement information is reflected is shortest, the continuous shooting is performed after a lapse of the estimated lens drive time.

The second curtain travel preparation needs to be completed before the next imaging timing in continuous shooting.

Then, the FPS control unit 296 compares the lens drive time, which is calculated by the lens drive time-calculating unit 297, with a time that is required for the second curtain travel preparation; calculates an imaging timing when the exposure control of the static image is to be started on the basis of the lens drive time in a case where the lens drive time is equal to or longer than the time required for the second curtain travel preparation; and starts the second curtain travel preparation at a time ahead of the calculated imaging timing by the time required for the second curtain travel preparation.

In the case of the sixth embodiment shown in FIG. 17, since the lens drive time is longer than the time required for the second curtain travel preparation (a time until the time $t_9$ from the time $t_7$), the FPS control unit 296 calculates an imaging timing (time $t_9$) when the exposure control of the static image is to be started on the basis of the lens drive time and starts the second curtain travel preparation at a time (time $t_7$) ahead of the calculated imaging timing (time $t_9$) by the time required for the second curtain travel preparation.

Accordingly, since the FPS control unit 296 can complete the second curtain travel preparation and complete the driving of the focus lens 106 by the imaging timing (time $t_9$) for the next static image in continuous shooting, a continuous shooting speed can be more improved than that in a case where the second curtain travel preparation is to be started after the completion of the driving of the focus lens.

Seventh Embodiment

Figure 18:
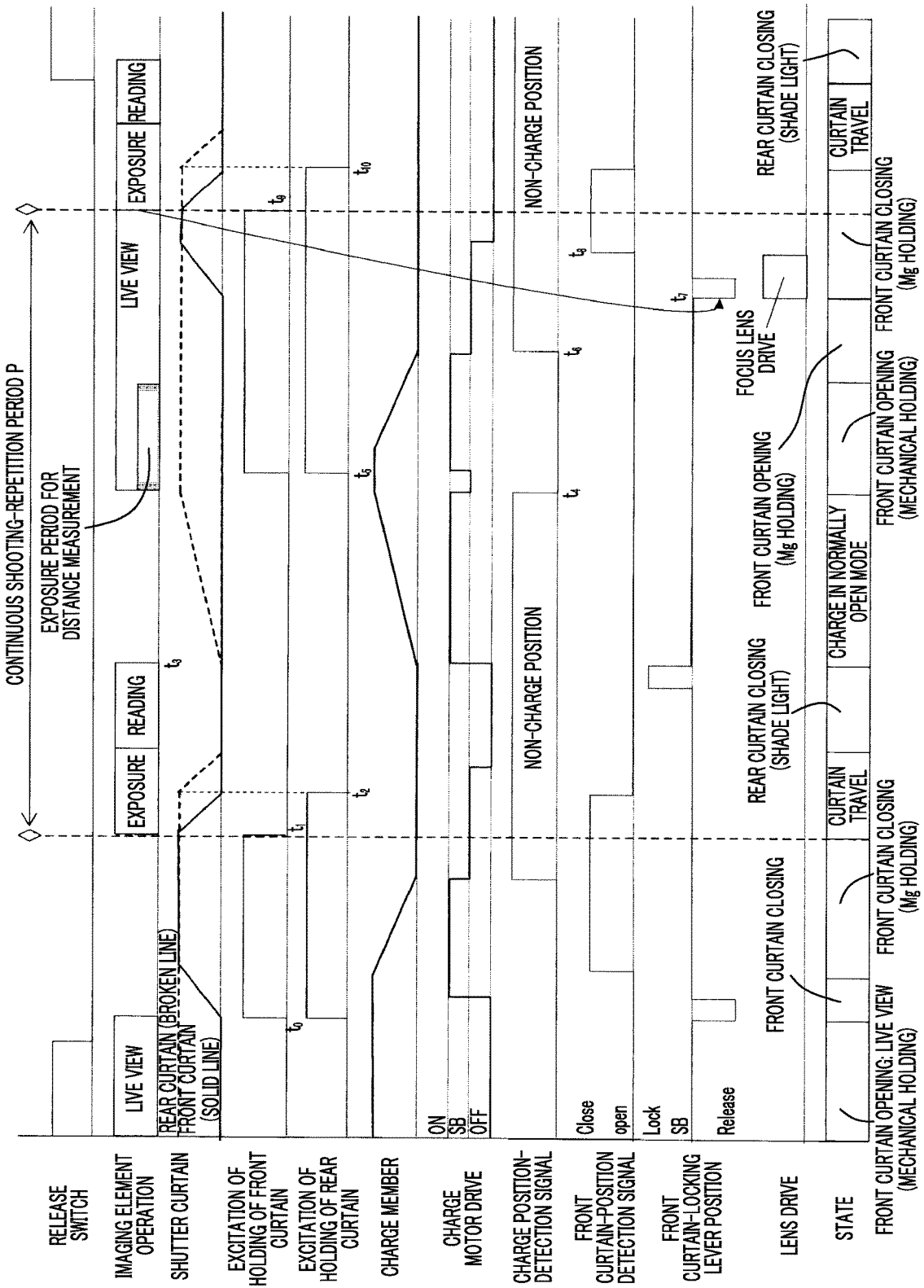
FIG. 18 is a timing chart showing a seventh embodiment of the invention.

FIG. 18 is a timing chart showing a seventh embodiment of the invention. The description of portions of FIG. 18 common to the sixth embodiment shown in FIG. 17 will be omitted.

The seventh embodiment shown in FIG. 18 is different from the sixth embodiment in that the lens drive time for the focus lens 106 is short.

The FPS control unit 296 compares the lens drive time, which is calculated by the lens drive time-calculating unit 297, with a time that is required for the second curtain travel preparation; calculates an imaging timing when the exposure control of the static image is to be started on the basis of the time required for the second curtain travel preparation in a case where the time required for the second curtain travel preparation is equal to or longer than the lens drive time; and starts the second curtain travel preparation at a time ahead of the calculated imaging timing by the time required for the second curtain travel preparation.

In the case of the seventh embodiment shown in FIG. 18, since the time required for the second curtain travel preparation (a time until the time $t_9$ from the time $t_7$) is longer than the lens drive time, the FPS control unit 296 calculates an imaging timing (time $t_9$) when the exposure control of the static image is to be started on the basis of the time required for the second curtain travel preparation and starts the second curtain travel preparation at a time (time $t_7$) ahead of the calculated imaging timing (time $t_9$) by the time required for the second curtain travel preparation.

Further, the driving of the focus lens 106 is started simultaneously with the point of time (time $t_7$) when the second curtain travel preparation is to be started. Even though the FPS control unit 296 starts the driving of the focus lens 106 simultaneously with the point of time when the second curtain travel preparation is to be started, the FPS control unit 296 can complete the driving of the focus lens by the time that the second curtain travel preparation is completed.

Accordingly, since the FPS control unit 296 can complete the second curtain travel preparation and complete the driving of the focus lens 106 by the imaging timing (time $t_9$) for the next static image in continuous shooting, a continuous shooting speed can be more improved than that in a case where the second curtain travel preparation is to be started after the completion of the driving of the focus lens.

The point of time when the driving of the focus lens 106 is to be started is not limited to the example shown in FIG. 18. The driving of the focus lens 106 may be started at any time as long as the driving of the focus lens 106 is completed ahead of the imaging timing. It is preferable that the driving of the focus lens 106 is performed in a blackout period so as not to affect a live view image.

Eighth Embodiment

Figure 19:
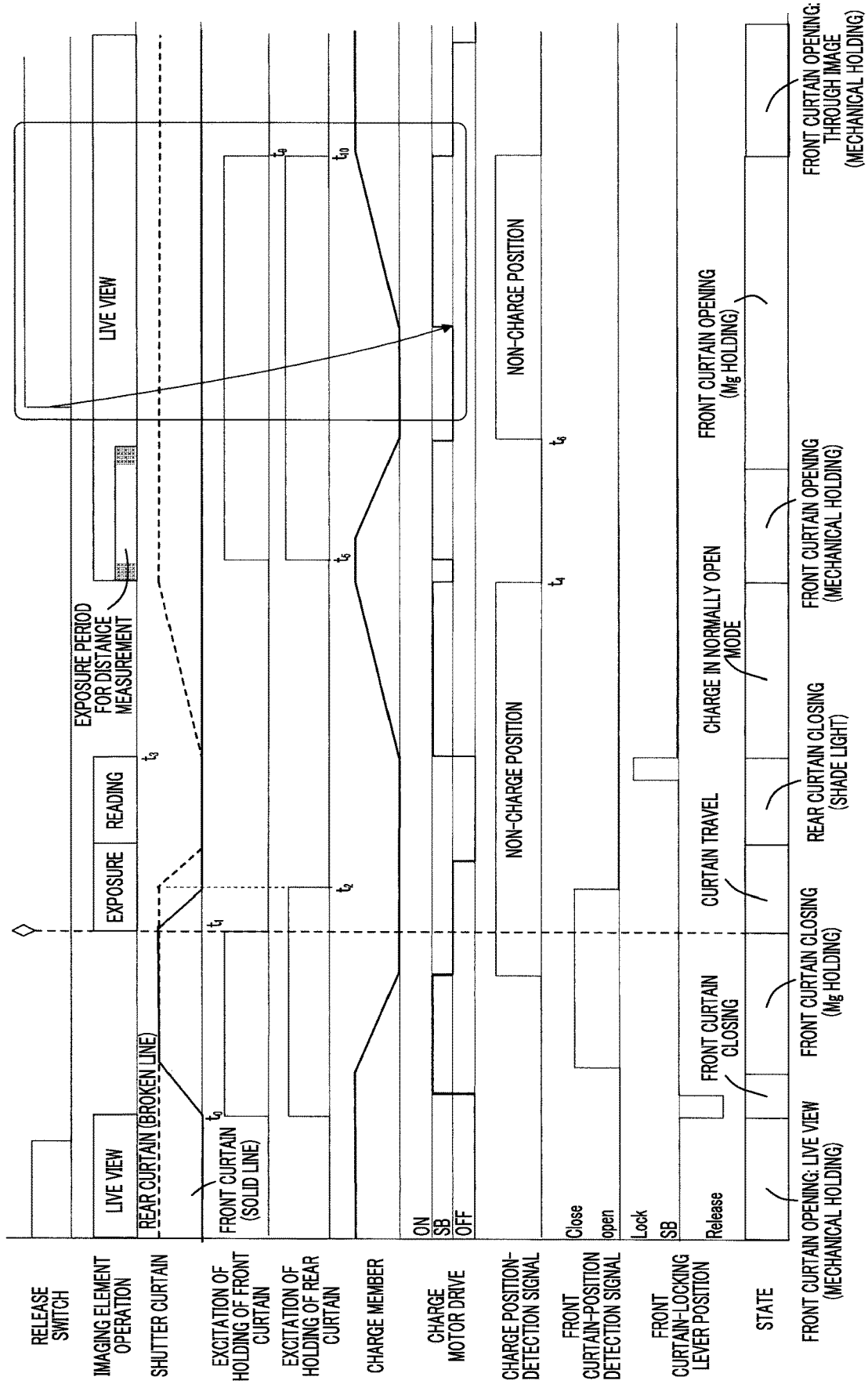
FIG. 19 is a timing chart showing an eighth embodiment of the invention.

FIG. 19 is a timing chart showing an eighth embodiment of the invention. The description of portions of FIG. 19 common to the first embodiment shown in FIG. 7 will be omitted.

In the invention, the second curtain travel preparation is performed from a point of time later than the point of time when the first curtain travel preparation is to be started. Accordingly, there is a case where the input of an instruction to end the continuous shooting in the continuous shooting mode is received before the start of the second curtain travel preparation after the start of the first curtain travel preparation.

In the eighth embodiment shown in FIG. 19, in a case where the FPS control unit 296 receives the input of an instruction to end the continuous shooting in the continuous shooting mode before the start of the second curtain travel preparation after the start of the first curtain travel preparation, the FPS control unit 296 drives the charge motor 290B to cause the charge member 288 to be moved to the charge position from the non-charge position in a state where the excitation of the front curtain-electromagnet 288A and the rear curtain-electromagnet 288B is maintained.

In a case where a charge position-detection signal representing the non-charge position is input to the FPS control unit 296 from the charge position detector, the FPS control unit 296 puts a brake on the charge motor 290B to cause the charge member 288 to stop and demagnetizes the excited front curtain-electromagnet 288A and the excited rear curtain-electromagnet 288B.

Accordingly, even after the first curtain travel preparation is started, it is possible to make the focal-plane shutter 280 to return to the normally open state without performing the travel of the front and rear curtains 283A and 283B. Therefore, it is possible to make the blackout of a live view image not occur after the input of an instruction to end continuous shooting is received.

Ninth Embodiment

Figure 20:
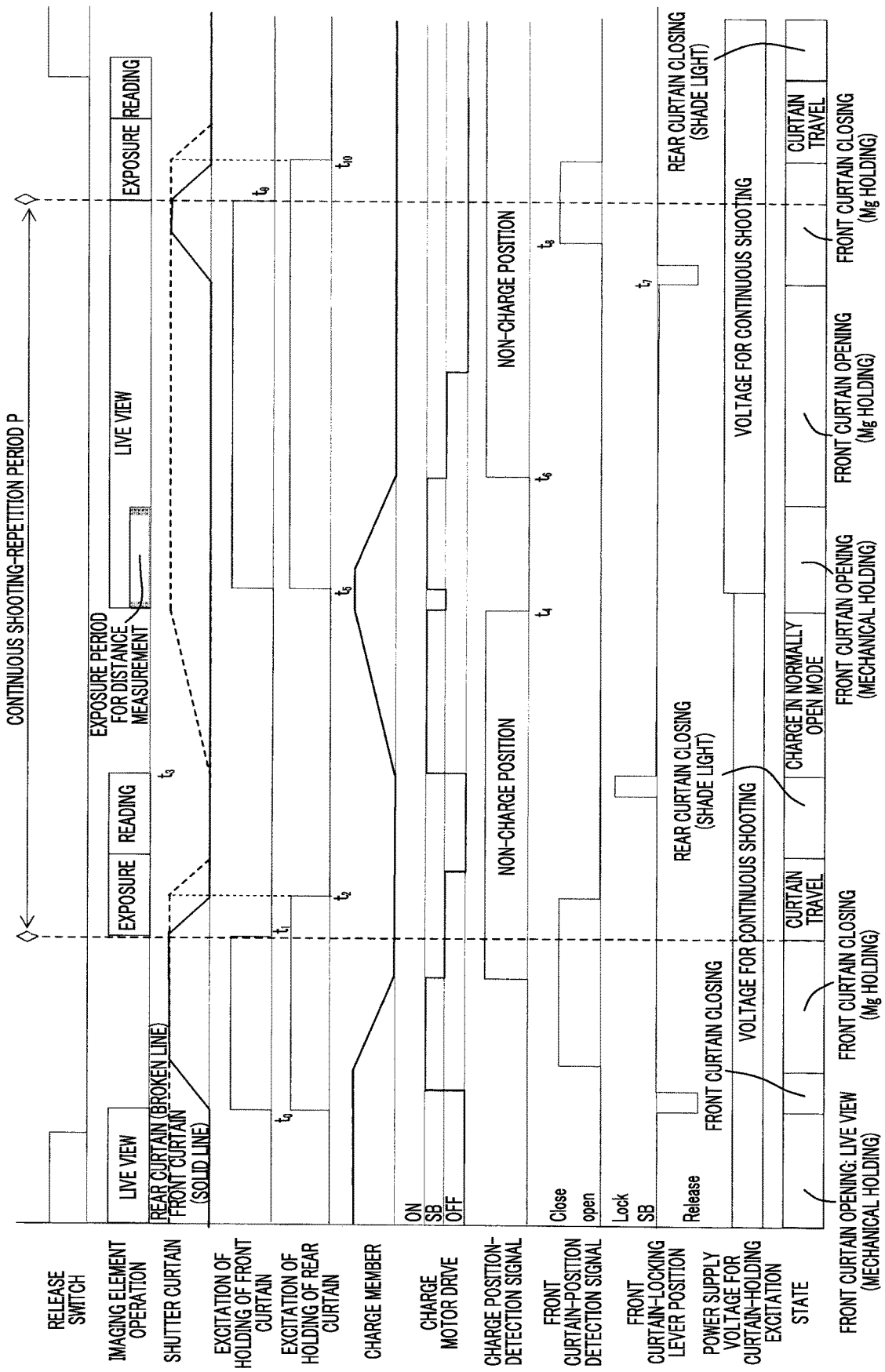
FIG. 20 is a timing chart showing a ninth embodiment of the invention.

FIG. 20 is a timing chart showing a ninth embodiment of the invention. The description of portions of FIG. 20 common to the second embodiment shown in FIG. 13 will be omitted.

The voltage control unit 298 shown in FIG. 6 is a part controlling curtain-holding excitation voltage that is to be supplied to the front curtain-electromagnet 288A and the rear curtain-electromagnet 288B by the electromagnet-drive units 295A and 295B, and makes the curtain-holding excitation voltage, which is used in the continuous shooting mode, be higher than normal voltage that is used as the curtain-holding excitation voltage in the normal imaging mode where a single static image is to be taken.

In the invention, the second curtain travel preparation is performed from a point of time later than the point of time when the first curtain travel preparation is to be started during continuous shooting. In this case, the first front curtain-drive lever 286A$_1$, which causes the front curtain 283A to travel in the closing direction, collides with the second front curtain-drive lever $286A_2$ that is electromagnetically held by the front curtain-electromagnet 288A (that is not held mechanically). There is a case where the holding position of the second front curtain-drive lever $286A_2$ electromagnetically held by the front curtain-electromagnet 288A is shifted from a normal holding position due to this collision. In this case, exposure accuracy deteriorates.

Further, in the continuous shooting mode, the voltage control unit 298 makes curtain-holding excitation voltage, which is supplied to the front curtain-electromagnet 288A and the rear curtain-electromagnet 288B through the electromagnet-drive units 295A and 295B, be higher than the curtain-holding excitation voltage that is supplied in the normal imaging mode.

In the ninth embodiment shown in FIG. 20, the curtain-holding excitation voltage is made higher than that in the normal voltage from a point of time (time $t_5$ of FIG. 20) when the first curtain travel preparation for the second static image in the continuous shooting mode is to be started.

In this example, in a case where the first static image in the continuous shooting mode is to be taken and the FPS control unit 296 receives the input of an instruction to start the continuous shooting in the continuous shooting mode after the shift of the focal-plane shutter to the normally open state, the FPS control unit 296 simultaneously starts the first curtain travel preparation and the second curtain travel preparation. Accordingly, in a case where the first front curtain-drive lever $286A_1$ collides with the second front curtain-drive lever $286A_2$ electromagnetically held by the front curtain-electromagnet 288A, the second front curtain-drive lever $286A_2$ is also mechanically held. Therefore, in a case where the first static image in the continuous shooting mode is to be taken, the voltage control unit 298 makes the curtain-holding excitation voltage be equal to than the curtain-holding excitation voltage that is supplied in the normal imaging mode.

Even in a case where the first static image in the continuous shooting mode is to be taken, the second curtain travel preparation may be performed from a point of time later than the point of time when the first curtain travel preparation is to be started. In this case, in a case where the continuous shooting mode is set or a case where the input of an instruction to start the continuous shooting is received, the voltage control unit 298 may make curtain-holding excitation voltage, which is supplied to the front curtain-electromagnet 288A and the rear curtain-electromagnet 288B through the electromagnet-drive units 295A and 295B, be higher than the curtain-holding excitation voltage that is supplied in the normal imaging mode.

According to the ninth embodiment, the curtain-holding excitation voltage used in the continuous shooting mode is made higher than the normal voltage used as the curtain-holding excitation voltage in the normal imaging mode so that an electromagnetic force for holding the second front curtain-drive member is increased. Accordingly, even though the first front curtain-drive member collides, the holding position of the second front curtain-drive member is not changed. As a result, exposure accuracy does not deteriorate.

Tenth Embodiment

Figure 21:
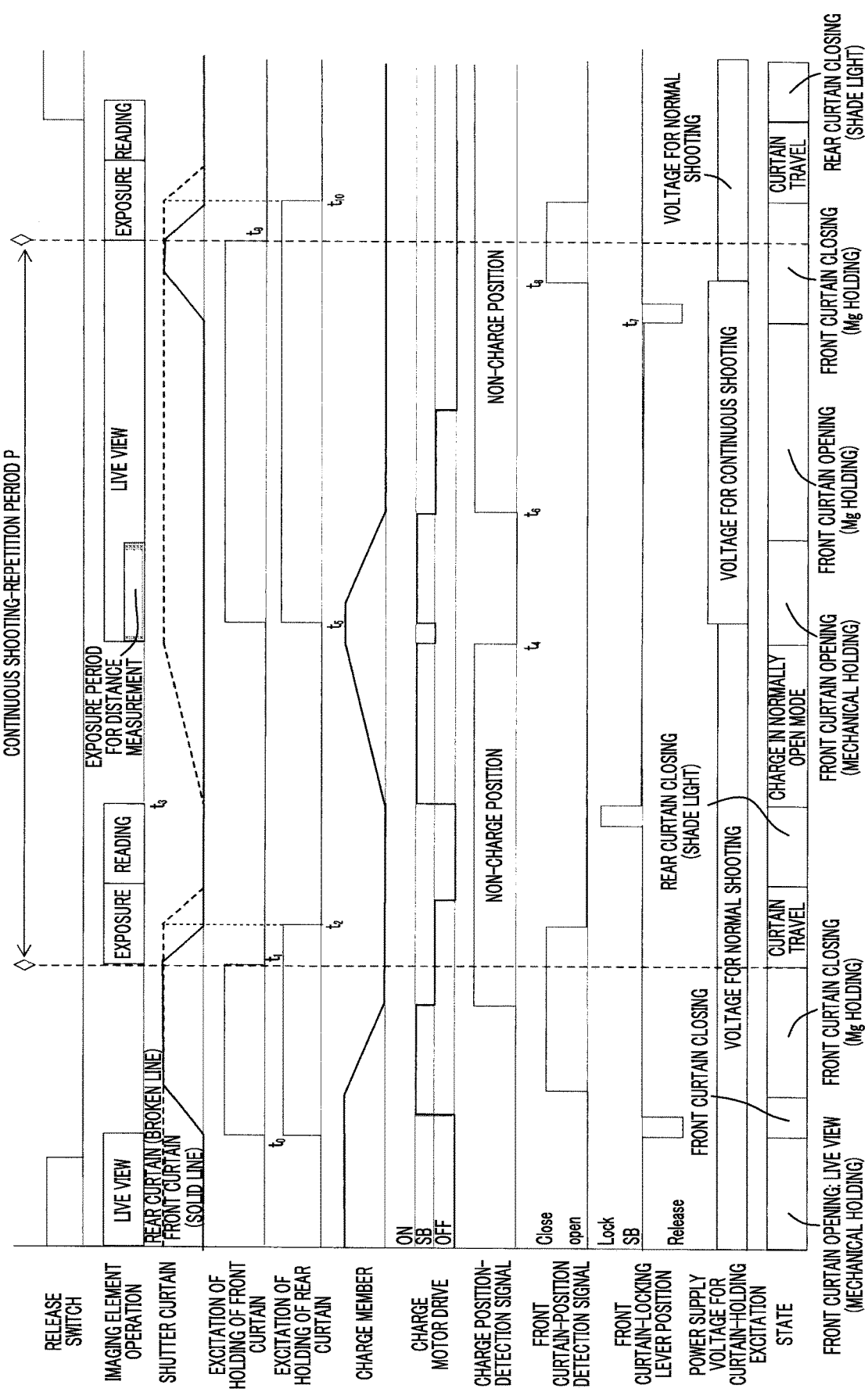
FIG. 21 is a timing chart showing a tenth embodiment of the invention.

FIG. 21 is a timing chart showing a tenth embodiment of the invention. The description of portions of FIG. 21 common to the ninth embodiment shown in FIG. 20 will be omitted.

In the ninth embodiment shown in FIG. 20, the curtain-holding excitation voltage used in the continuous shooting mode is made higher than the normal voltage used as the curtain-holding excitation voltage in the normal imaging mode. However, in a case where the travel of the curtain using demagnetization is performed from a state where the curtain-holding excitation voltage is higher than the normal voltage, curtain travel characteristics are changed from those in a case where the second front curtain-drive lever is held using the normal voltage. As a result, exposure accuracy deteriorates.

The voltage control unit 298 of the tenth embodiment shown in FIG. 21 makes the curtain-holding excitation voltage, which is used in the continuous shooting mode, be higher than the normal voltage, which is used as the curtain-holding excitation voltage in the normal imaging mode, as in the ninth embodiment shown in FIG. 20, but is adapted to return (lower) the curtain-holding excitation voltage, which has been made high, to the normal voltage before the start of exposure control after the second curtain travel preparation is completed (after the first front curtain-drive lever $286A_1$ collides with the second front curtain-drive lever $286A_2$).

According to the tenth embodiment, the curtain-holding excitation voltage, which has been made high, is lowered to the normal voltage before exposure, so that exposure accuracy is improved. Further, electric power consumption can be reduced.

The voltage control unit 298 can change practical excitation voltage by, for example, pulse width modulation (PWM) control, but it is preferable that the voltage control unit 298 continuously changes the duty ratio of PWM control to avoid the sudden change of a holding force at the time of change.

Further, in the ninth and tenth embodiments, the voltage control unit 298 is adapted to change the curtain-holding excitation voltage that is supplied to the front curtain-electromagnet 288A and the rear curtain-electromagnet 288B through the electromagnet-drive units 295A and 295B. However, the voltage control unit 298 may be adapted not to change the curtain-holding excitation voltage to be supplied to the rear curtain-electromagnet 288B (to set curtain-holding excitation voltage to be supplied to the rear curtain-electromagnet 288B to the normal voltage) and to change only the curtain-holding excitation voltage to be supplied to the front curtain-electromagnet 288A.

[Method of Controlling Imaging Device]

Next, a method of controlling the imaging device according to the embodiment of the invention will be described.

Figure 22:
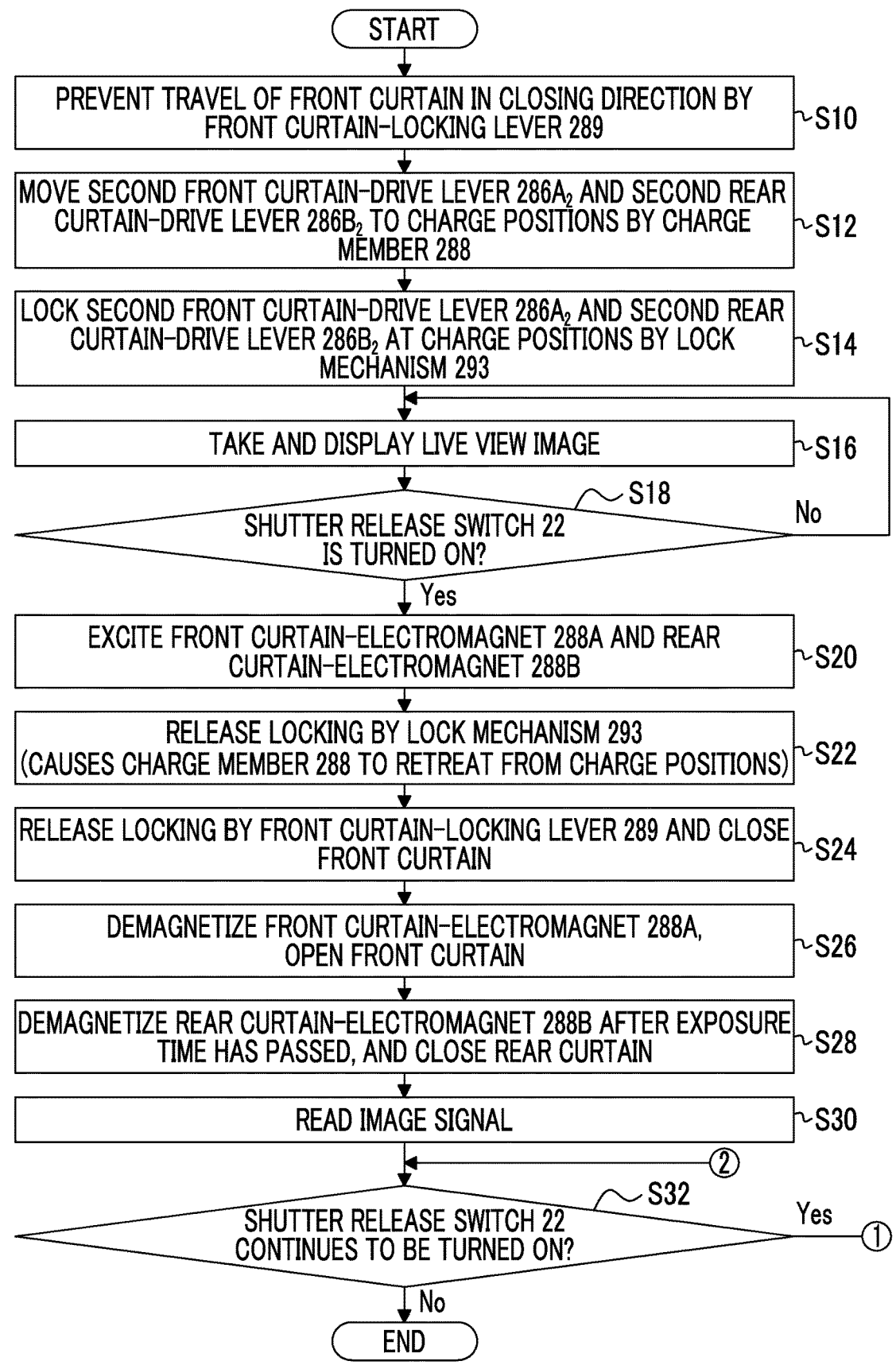
FIG. 22 is a flowchart showing a part of an embodiment of a method of controlling the imaging device according to the invention.
Figure 23:
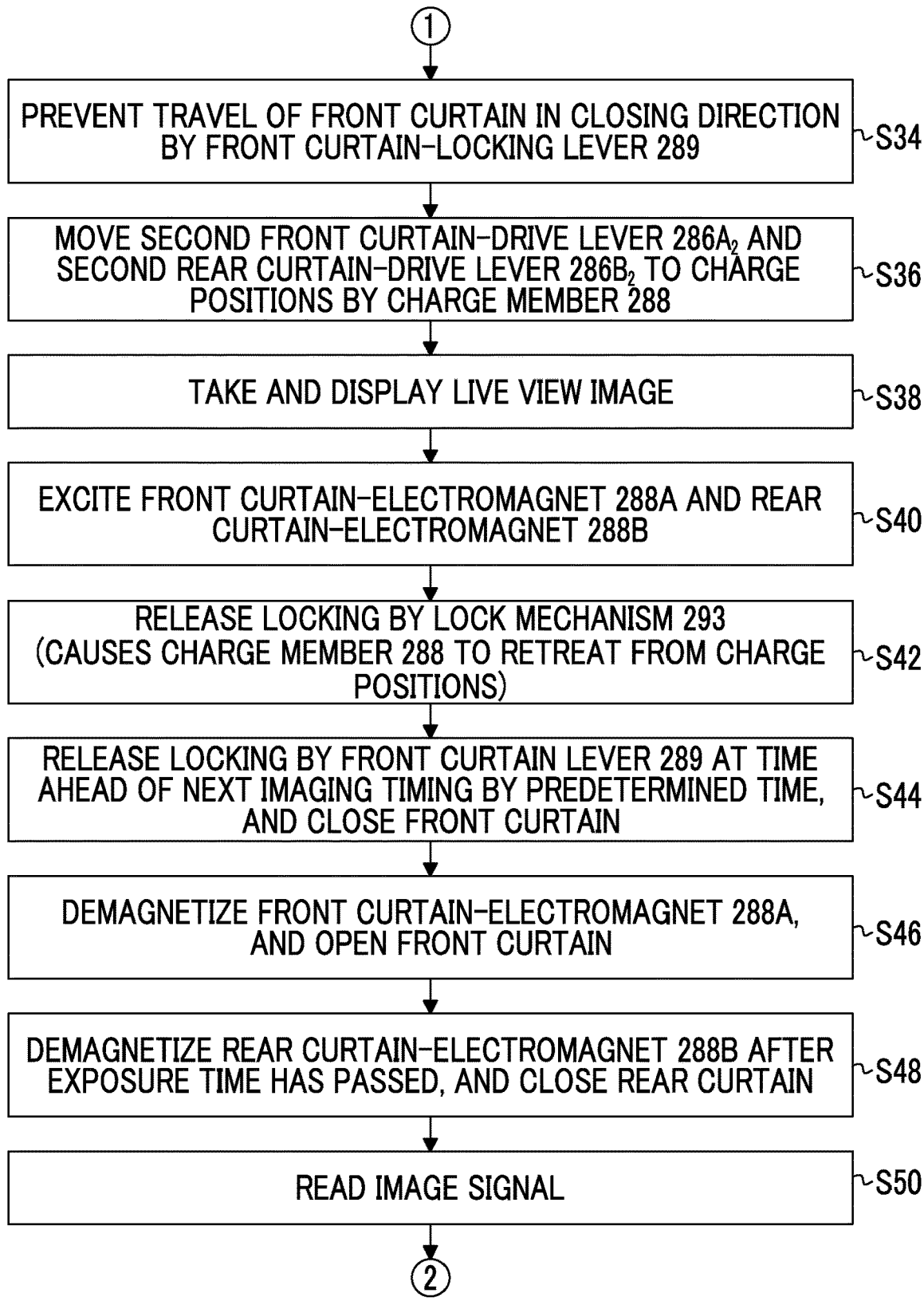
FIG. 23 is a flowchart showing the other part of the embodiment of the method of controlling the imaging device according to the invention.

FIGS. 22 and 23 are flowcharts showing an embodiment of a method of controlling the imaging device according to the invention, and particularly show a method of controlling the focal-plane shutter in the continuous shooting mode.

In FIG. 22, the FPS control unit 296 causes the front curtain-locking lever 289 to be moved to the locked position to prevent the travel of the front curtain in the closing direction and allows the focal-plane shutter 280 to be normally opened (Step S10).

Subsequently, the FPS control unit 296 drives the charge member 288 and causes the second front curtain-drive lever $286A_2$ and the second rear curtain-drive lever $286B_2$ to be moved to the charge positions (Step S12).

Then, the FPS control unit 296 causes the lock mechanism 293 to operate to mechanically lock the second front curtain-drive lever $286A_2$ and the second rear curtain-drive lever $286B_2$, which are moved to the charge positions, at the charge positions (Step S14).

The focal-plane shutter 280 is made to be in a normally open state by the control performed in Steps S10 to S14.

In a case where the focal-plane shutter 280 is made to be in the normally open state, a live view image is taken and displayed according to the command of the body-side CPU 220 (Step S16). Accordingly, framing for continuous shooting can be performed.

After that, it is determined whether or not the shutter release switch 22 is turned on (Step S18). If it is determined that the shutter release switch 22 is turned on (the case of "YES"), the FPS control unit 296 excites the front curtain-electromagnet 288A and the rear curtain-electromagnet 288B, attracts and holds the second front curtain-drive lever $286A_2$ and the second rear curtain-drive lever $286B_2$ at the charge positions (Step S20), and releases the locking of the second front curtain-drive lever $286A_2$ and the second rear curtain-drive lever $286B_2$ that is performed by the lock mechanism 293 (causes the charge member 288 to retreat from the charge positions) (Step S22). The FPS control unit 296 performs the first curtain travel preparation by the control performed in these Steps S20 and S22.

The FPS control unit 296 causes the front curtain-locking lever 289, which is positioned at the locked position, to be moved to the unlocked position simultaneously with the first curtain travel preparation to release the prevention of the rotational movement of the first front curtain-drive lever $286A_1$ in the counterclockwise direction performed by the front curtain-locking lever 289, and causes the front curtain 283A to travel in the closing direction by the biasing force of the return spring to perform the second curtain travel preparation (Step S24, the release of the holding of the front curtain).

In a case where the second curtain travel preparation is completed, the FPS control unit 296 demagnetizes the front curtain-electromagnet 288A, opens the front curtain to start exposure (Step S26), demagnetizes the rear curtain-electromagnet 288B when an exposure time corresponding to a shutter speed has passed after the start of the exposure, and closes the rear curtain to complete the exposure (Step S28).

Then, after the exposure of the first static image in the continuous shooting ends, image signals are read from the imaging element 201 (Step S30).

Subsequently, it is determined whether or not the shutter release switch 22 continues to be turned on (Step S32). If it is determined that the shutter release switch 22 is turned on (the case of "Yes"), processing proceeds to Step S34 shown in FIG. 23. If it is determined that the shutter release switch 22 is turned off (the case of "No"), the continuous shooting ends.

FIG. 23 is a flowchart showing the embodiment of a method of controlling the imaging device according to the invention, and particularly shows a method of controlling the focal-plane shutter in a case where the second and later static images in the continuous shooting mode are to be taken.

In FIG. 23, the FPS control unit 296 causes the front curtain-locking lever 289 to be moved to the locked position to prevent the travel of the front curtain in the closing direction (Step S34, first step).

Subsequently, the FPS control unit 296 drives the charge member 288 and causes the second front curtain-drive lever $286A_2$ and the second rear curtain-drive lever $286B_2$ to be moved to the charge positions (Step S36, second step).

In a case where the focal-plane shutter 280 is made to be in the normally open state by Steps S34 and S36, a live view image is taken and displayed according to the command of the body-side CPU 220 (Step S38).

Further, in a case where the focal-plane shutter 280 is made to be in the normally open state, the FPS control unit 296 excites the front curtain-electromagnet 288A and the rear curtain-electromagnet 288B, attracts and holds the second front curtain-drive lever $286A_2$ and the second rear curtain-drive lever $286B_2$ at the charge positions (Step S40, third step), and releases the locking of the second front curtain-drive lever $286A_2$ and the second rear curtain-drive lever $286B_2$ that is performed by the lock mechanism 293 (causes the charge member 288 to retreat from the charge positions) (Step S42, fourth step). The FPS control unit 296 performs the first curtain travel preparation by the control performed in these Steps S40 and S42.

The FPS control unit 296 causes the front curtain-locking lever 289, which is positioned at the locked position, to be moved to the unlocked position at a time ahead of the next imaging timing after the end of the display of the live view image by a predetermined time (a time required for the second curtain travel preparation) to release the prevention of the rotational movement of the first front curtain-drive lever $286A_1$ in the counterclockwise direction performed by the front curtain-locking lever 289, and causes the front curtain 283A to travel in the closing direction by the biasing force of the return spring to perform the second curtain travel preparation (Step S44, fifth step).

In a case where the second curtain travel preparation is completed, the FPS control unit 296 demagnetizes the front curtain-electromagnet 288A, opens the front curtain to start exposure (Step S46), demagnetizes the rear curtain-electromagnet 288B when an exposure time corresponding to a shutter speed has passed after the start of the exposure, and closes the rear curtain to complete the exposure (Step S48, sixth step).

Then, after the exposure of the second and later static images in the continuous shooting ends, image signals are read from the imaging element 201 (Step S50, seventh step).

Subsequently, processing returns to Step S32 shown in FIG. 22, and it is determined whether or not the shutter release switch 22 continues to be turned on (Step S32). If it is determined that the shutter release switch 22 is turned on (the case of "Yes"), processing proceeds to Step S34 shown in FIG. 23. If it is determined that the shutter release switch 22 is turned off (the case of "No"), the continuous shooting ends.

Accordingly, processing of Steps S32 to S50 is repeated in a period where the shutter release switch 22 is turned on, so that continuous shooting is performed.

[Others]

The focal-plane shutter to which the invention is applied is not limited to a focal-plane shutter that can switch a normally open operation and a normally closed operation, and may be a focal-plane shutter that performs only a normally open operation. In short, the focal-plane shutter to which the invention is applied has only to be a focal-plane shutter that can perform a normally open operation.

Further, the charge member 288 of this embodiment is formed of a cam member that can be rotationally moved about the support shaft 288a in the clockwise direction and the counterclockwise direction, but is not limited thereto. The charge member 288 of this embodiment may be adapted to be rotated only in one direction to move each of the second front curtain-drive lever $286A_2$ and the second rear curtain-drive lever $286B_2$ to the charge position and the non-charge position, and the charge motor 290B may be rotationally driven only in one direction in this case.

Furthermore, the first rear curtain-drive lever $286B_1$ and the second rear curtain-drive lever $286B_2$ form the rear curtain-drive member in this embodiment, but one rear curtain-drive lever may form the rear curtain-drive member. In this case, one rear curtain-drive lever needs to be provided with drive pins to which the rear curtain-travel spring and the rear curtain-drive arm are to be connected.

Moreover, it goes without saying that the invention is not limited to the above-mentioned embodiments and has various modifications without departing from the scope of the invention.

EXPLANATION OF REFERENCES

10: imaging device
20: finder window
22: shutter release switch
23: shutter speed dial
24: exposure correction dial
25: power lever
26: eyepiece part
27: OK key
28: cross key
29: play button
30: built-in flash
100: interchangeable lens
102: imaging optical system
104: zoom lens
106: focus lens
108: stop
114: zoom lens control unit
116: focus lens control unit
118: stop control unit
120: lens-side CPU
122: RAM
124: ROM
126: flash ROM
136A: magnetic piece
136B: magnetic piece
150: lens-side communication unit
160: lens mount
200: camera body
201: imaging element
202: imaging element control unit
203: analog signal processing unit
204: A/D converter
205: image input controller
206: digital signal processing unit
207: RAM
208: compression/decompression processing unit
210: media control unit
212: memory card
214: display control unit
216: monitor
220: body-side CPU
222: operation unit
224: clock unit
226: flash ROM
228: ROM
230: distance measuring unit
232: brightness detection unit
234: white balance correction unit
236: wireless communication unit
238: GPS receiver
240: power control unit
242: battery
244: lens power switch
250: body-side communication unit
260: body mount
260A: terminal
270: flash light-emitting unit
272: flash control unit
280: focal-plane shutter
281: exposure aperture portion
282: shutter base plate
283A: front curtain
283B: rear curtain
$284A_1$, $284A_2$: front curtain-drive arm
$284B_1$, $284B_2$: rear curtain-drive arm
$284a_1$, $284a_2$, $284b_1$, $284b_2$, $286a$, $286b$: support shaft
285: bed plate
285A, 285B: long hole
$286A_1$: first front curtain-drive lever
$286A_2$: second front curtain-drive lever
286Aa, 286Ba: magnetic piece
286Ab, 286Bb: contact pin
286Ac, 286Bc: stopper
286Ad, 286Bd: cam follower
286Ae, 286Be: drive pin
$286B_1$: first rear curtain-drive lever
$286B_2$: second rear curtain-drive lever
287A: front curtain-travel spring
287B: rear curtain-travel spring
288: charge member
288A: front curtain-electromagnet
288Aa, 288Bb: cam face
288B: rear curtain-electromagnet
$288a$, $289a$: support shaft
289: front curtain-locking lever
289A, 289B: stopper
290A: motor drive unit
290B: charge motor
291: power transmission mechanism
292: lock mechanism-drive unit
293: lock mechanism
294: front curtain-locking lever drive unit
295A, 295B: electromagnet-drive unit
296: FPS control unit
297: lens drive time-calculating unit
298: voltage control unit
S10 to S50: step

What is claimed is:

1. An imaging device comprising:
a focal-plane shutter;
an imaging element; and
a control unit that controls the focal-plane shutter and the imaging element,
wherein the focal-plane shutter includes a front curtain, a front curtain-drive member, a rear curtain, a rear curtain-drive member, a charge member, a lock mechanism that holds the front curtain-drive member and the rear curtain-drive member at charge positions, a front curtain-locking member that prevents travel of the front curtain in a closing direction, and a front curtain-electromagnetic actuator and a rear curtain-electromagnetic actuator that directly or indirectly prevent drive of the front curtain-drive member and drive of the rear curtain-drive member, by excitation,
in a case where second and later static images in a continuous shooting mode are to be taken, the control unit performs:
normally open control that makes the focal-plane shutter be in a normally open state, after reading of an image signal corresponding to the static image from the imaging element ends;

first curtain travel preparation that excites the front curtain-electromagnetic actuator and the rear curtain-electromagnetic actuator and releases holding by the lock mechanism, after shifting to the normally open state;
second curtain travel preparation that releases lock of the front curtain by the front curtain-locking member, and causes the front curtain to travel in the closing direction to fully close an exposure aperture portion, after the first curtain travel preparation; and
exposure control that causes the front curtain to travel in an opening direction after completion of the second curtain travel preparation, and causes the rear curtain to travel in the closing direction after a lapse of an exposure time corresponding to a shutter speed, to perform exposure corresponding to the static image, and
the image signal is read from the imaging element in a period until the exposure aperture portion is closed by the second curtain travel preparation after the exposure aperture portion is opened by the shift of the focal-plane shutter to the normally open state, and a live view image is allowed to be displayed during a continuous shooting-repetition period until a point of time when exposure of the next static image is started from a point of time when exposure of each of the static images continuously taken in the continuous shooting mode is started.

2. The imaging device according to claim 1,
wherein the image signal for the display of the live view image, which is read from the imaging element during the continuous shooting-repetition period in the continuous shooting mode, includes an image signal for distance measurement,
the imaging device further comprises a distance measuring unit that acquires the image signal for distance measurement from the imaging element and calculates distance measurement information on the basis of the acquired image signal for distance measurement, and
the control unit performs the first curtain travel preparation during exposure of the image signal for distance measurement.

3. The imaging device according to claim 1,
wherein the image signal for the display of the live view image, which is read from the imaging element during the continuous shooting-repetition period in the continuous shooting mode, includes an image signal for distance measurement that is to be exposed for distance measurement,
the imaging device further comprises a distance measuring unit that acquires the image signal for distance measurement from the imaging element and calculates distance measurement information on the basis of the acquired image signal for distance measurement, and
the control unit performs the first curtain travel preparation after the completion of exposure of the image signal for distance measurement.

4. The imaging device according to claim 1,
wherein the image signal for the display of the live view image, which is read from the imaging element during the continuous shooting-repetition period in the continuous shooting mode, includes an image signal for distance measurement that is to be exposed for distance measurement, and
the imaging device further comprises a distance measuring unit that acquires the image signal for distance measurement from the imaging element after the completion of the first curtain travel preparation and calculates distance measurement information on the basis of the acquired image signal for distance measurement.

5. The imaging device according to claim 1,
wherein the image signal for the display of the live view image, which is read from the imaging element during the continuous shooting-repetition period in the continuous shooting mode, includes image signals for distance measurement of a plurality of frames that are to be exposed for distance measurement,
the imaging device further comprises a distance measuring unit that acquires the image signal for distance measurement from the imaging element, calculates distance measurement information on the basis of the acquired image signal for distance measurement, and acquires the image signals for distance measurement of the plurality of frames in a time-series order until distance measurement information exceeding a reliability-determination value is acquired, and
the control unit performs the second curtain travel preparation in a case where the distance measuring unit acquires the distance measurement information exceeding the reliability-determination value.

6. The imaging device according to claim 1,
wherein the image signal for the display of the live view image, which is read from the imaging element during the continuous shooting-repetition period in the continuous shooting mode, includes an image signal for distance measurement that is to be exposed for distance measurement,
the imaging device further comprises a distance measuring unit that acquires the image signal for distance measurement from the imaging element and calculates distance measurement information on the basis of the acquired image signal for distance measurement, and a lens drive time-calculating unit that calculates a lens drive time required for driving of a focus lens on the basis of the calculated distance measurement information, and
the control unit compares the calculated lens drive time with a time required for the second curtain travel preparation, calculates an imaging timing when the exposure control of the static image is to be started on the basis of the lens drive time in a case where the lens drive time is equal to or longer than the time required for the second curtain travel preparation, and starts the second curtain travel preparation at a time ahead of the calculated imaging timing by the time required for the second curtain travel preparation.

7. The imaging device according to claim 1,
wherein the image signal for the display of the live view image, which is read from the imaging element during the continuous shooting-repetition period in the continuous shooting mode, includes an image signal for distance measurement that is to be exposed for distance measurement,
the imaging device further comprises a distance measuring unit that acquires the image signal for distance measurement from the imaging element and calculates distance measurement information on the basis of the acquired image signal for distance measurement, and a lens drive time-calculating unit that calculates a lens drive time required for driving of a focus lens on the basis of the calculated distance measurement information, and
the control unit compares the calculated lens drive time with a time required for the second curtain travel preparation, calculates an imaging timing when the exposure control of the static image is to be started on the basis of the time required for the second curtain travel preparation in a case where the time required for the second curtain travel preparation is equal to or longer than the lens drive time, and starts the second curtain travel preparation at a time ahead of the calculated imaging timing by the time required for the second curtain travel preparation.

8. The imaging device according to claim 1,
wherein in a case where the control unit receives an input of an instruction to end continuous shooting in the continuous shooting mode before the start of the second curtain travel preparation after the start of the first curtain travel preparation, the control unit causes the front curtain-drive member and the rear curtain-drive member to be moved to the charge positions by the charge member and holds the front curtain-drive member and the rear curtain-drive member at the charge positions by the lock mechanism in a state where the excitation of the front curtain-electromagnetic actuator and the rear curtain-electromagnetic actuator is maintained, and then demagnetizes the excited front curtain-electromagnetic actuator and the excited rear curtain-electromagnetic actuator.

9. The imaging device according to claim 1, further comprising:
a voltage control unit that controls curtain-holding excitation voltage to be supplied to the front curtain-electromagnetic actuator and the rear curtain-electromagnetic actuator,
wherein the voltage control unit makes the curtain-holding excitation voltage, which is used in the continuous shooting mode, be higher than normal voltage that is used as curtain-holding excitation voltage in a normal imaging mode where a single static image is to be taken.

10. The imaging device according to claim 9,
wherein the voltage control unit lowers the curtain-holding excitation voltage, which has been made high, to the normal voltage before the start of the exposure control after the completion of the second curtain travel preparation.

11. A method of controlling an imaging device including a focal-plane shutter, an imaging element, and a control unit controlling the focal-plane shutter and the imaging element, the focal-plane shutter including a front curtain, a first front curtain-drive member, a rear curtain, a rear curtain-drive-member, a charge member, a lock mechanism that holds the front curtain-drive member and the rear curtain-drive member at charge positions, a front curtain-locking member that prevents travel of the front curtain in a closing direction, and a front curtain-electromagnetic actuator and a rear curtain-electromagnetic actuator that directly or indirectly prevent drive of the front curtain-drive member and drive of the rear curtain-drive member, by excitation, the method comprising:
a first step of causing the front curtain-locking member to be moved by the control unit to prevent the travel of the front curtain in the closing direction;
a second step of causing the front curtain-drive member and the rear curtain-drive member to be moved to charge positions by the charge member in a state where the travel of the front curtain in the closing direction is prevented and holding the front curtain-drive member and the rear curtain-drive member at the charge positions by the lock mechanism to fully open an exposure aperture portion;
a third step of exciting the front curtain-electromagnetic actuator and the rear curtain-electromagnetic actuator after the exposure aperture portion is fully opened by the second step;
a fourth step of releasing holding of the front curtain-drive member and the rear curtain-drive member at the charge positions, which is performed by the lock mechanism, by the control unit after the movement of the front curtain-drive member and the rear curtain-drive member is prevented by the third step;
a fifth step of being performed after the fourth step, the fifth step of releasing lock of the front curtain by the front curtain-locking member, and causing the front curtain to travel in the closing direction to fully close the exposure aperture portion;
a sixth step of demagnetizing the front curtain-electromagnetic actuator after the exposure aperture portion is fully closed, causing the front curtain to travel in an opening direction through the front curtain-drive member, demagnetizing the rear curtain-electromagnetic actuator after a lapse of an exposure time corresponding to a shutter speed, and causing the rear curtain to travel in the closing direction through the rear curtain-drive member, to perform exposure corresponding to a static image; and
a seventh step of reading an image signal corresponding to the static image from the imaging element after completion of the exposure,
wherein the processing of the first to seventh steps is repeated to take second and later static images in a continuous shooting mode, and
the image signal is read from the imaging element in a period until the exposure aperture portion is closed by the fifth step after the exposure aperture portion is opened by the second step, and a live view image is allowed to be displayed during a continuous shooting-repetition period until a point of time when exposure of the next static image is started from a point of time when exposure of each of the static images continuously taken in the continuous shooting mode is started.

12. The method of controlling an imaging device according to claim 11,
wherein the image signal for the display of the live view image, which is read from the imaging element during the continuous shooting-repetition period in the continuous shooting mode, includes an image signal for distance measurement,
the image signal for distance measurement is acquired from the imaging element and distance measurement information is calculated on the basis of the acquired image signal for distance measurement, and
the processing of the fourth step is performed during exposure of the image signal for distance measurement.

13. The method of controlling an imaging device according to claim 11,
wherein the image signal for the display of the live view image, which is read from the imaging element during the continuous shooting-repetition period in the continuous shooting mode, includes an image signal for distance measurement that is to be exposed for distance measurement,
the image signal for distance measurement is acquired from the imaging element and distance measurement information is calculated on the basis of the acquired image signal for distance measurement, and the processing of the fourth step is performed after completion of exposure of the image signal for distance measurement.

14. The method of controlling an imaging device according to claim 11, wherein the image signal for the display of the live view image, which is read from the imaging element during the continuous shooting-repetition period in the continuous shooting mode, includes an image signal for distance measurement that is to be exposed for distance measurement, and the image signal for distance measurement is acquired from the imaging element after completion of the processing of the fourth step, and distance measurement information is calculated on the basis of the acquired image signal for distance measurement.

15. The method of controlling an imaging device according to claim 11, wherein the image signal for the display of the live view image, which is read from the imaging element during the continuous shooting-repetition period in the continuous shooting mode, includes image signals for distance measurement of a plurality of frames that are to be exposed for distance measurement, the image signals for distance measurement of the plurality of frames are acquired in a time-series order until distance measurement information exceeding a reliability-determination value is acquired in a case where the image signal for distance measurement is to be acquired from the imaging element and distance measurement information is to be acquired on the basis of the acquired image signal for distance measurement, and the processing of the fifth step is started in a case where the distance measurement information exceeding the reliability-determination value is acquired.

16. The method of controlling an imaging device according to claim 11, wherein the image signal for the display of the live view image, which is read from the imaging element during the continuous shooting-repetition period in the continuous shooting mode, includes an image signal for distance measurement that is to be exposed for distance measurement, the method further comprises a step of acquiring the image signal for distance measurement from the imaging element and calculating distance measurement information on the basis of the acquired image signal for distance measurement, and a step of calculating a lens drive time required for driving of a focus lens on the basis of the calculated distance measurement information, and the calculated lens drive time is compared with a time required for the processing of the fifth step, an imaging timing when the exposure control of the static image is to be started is calculated on the basis of the lens drive time in a case where the lens drive time is equal to or longer than the time required for the processing of the fifth step, and the processing of the fifth step is started at a time ahead of the calculated imaging timing by the time required for the processing of the fifth step.

17. The method of controlling an imaging device according to claim 11, wherein the image signal for the display of the live view image, which is read from the imaging element during the continuous shooting-repetition period in the continuous shooting mode, includes an image signal for distance measurement that is to be exposed for distance measurement, the method further comprises a step of acquiring the image signal for distance measurement from the imaging element and calculating distance measurement information on the basis of the acquired image signal for distance measurement, and a step of calculating a lens drive time required for driving of a focus lens on the basis of the calculated distance measurement information, and the calculated lens drive time is compared with a time required for the processing of the fifth step, an imaging timing when the exposure control of the static image is to be started is calculated on the basis of the time required for the processing of the fifth step in a case where the time required for the processing of the fifth step is equal to or longer than the lens drive time, and the processing of the fifth step is started at a time ahead of the calculated imaging timing by the time required for the processing of the fifth step.

18. The method of controlling an imaging device according to claim 11, wherein in a case where an input of an instruction to end continuous shooting in the continuous shooting mode is received before the start of the processing of the fifth step after the start of the processing of the fourth step, the front curtain-drive member and the rear curtain-drive member are moved to the charge positions by the charge member and are held at the charge positions by the lock mechanism in a state where the excitation of the front curtain-electromagnetic actuator and the rear curtain-electromagnetic actuator is maintained, and the excited front curtain-electromagnetic actuator and the excited rear curtain-electromagnetic actuator are demagnetized.

* * * * *